(12) United States Patent
Faccin et al.

(10) Patent No.: US 9,398,517 B2
(45) Date of Patent: *Jul. 19, 2016

(54) SYSTEM AND METHOD FOR ENABLING DISCOVERY OF LOCAL SERVICE AVAILABILITY IN LOCAL CELLULAR COVERAGE

(75) Inventors: Stefano Faccin, Irving, TX (US); Jan Hendrik Lucas Bakker, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 626 days.

This patent is subject to a terminal disclaimer.

(21) Appl. No.: 12/685,651

(22) Filed: Jan. 11, 2010

(65) Prior Publication Data

US 2011/0171953 A1    Jul. 14, 2011

(51) Int. Cl.
*H04W 76/02* (2009.01)
*H04W 48/08* (2009.01)
*H04W 80/04* (2009.01)
*H04W 84/04* (2009.01)

(52) U.S. Cl.
CPC .............. *H04W 48/08* (2013.01); *H04W 76/02* (2013.01); *H04W 80/04* (2013.01); *H04W 84/045* (2013.01)

(58) Field of Classification Search
CPC .................................................... H04W 40/24
USPC .............. 455/426.1, 438, 445, 411, 436, 466; 370/338, 310, 401
See application file for complete search history.

(56) References Cited

U.S. PATENT DOCUMENTS

| 6,987,779 | B1 * | 1/2006 | Sevanto et al. | 370/469 |
| 8,023,944 | B2 * | 9/2011 | Huang | 455/435.1 |
| 8,072,953 | B2 * | 12/2011 | Mukherjee et al. | 370/338 |
| 2004/0170191 | A1 | 9/2004 | Guo et al. | |
| 2008/0285492 | A1 | 11/2008 | Vesterinen | |

(Continued)

FOREIGN PATENT DOCUMENTS

| JP | 2008-541670 | 11/2008 |
| JP | 2009-531972 | 9/2009 |

(Continued)

OTHER PUBLICATIONS

Invitation to Pay Additional Fees and Partial International Search Report for related PCT Application No. PCT/US2011/020838, Apr. 11, 2011, 5 pages.

(Continued)

*Primary Examiner* — Michael T Vu
(74) *Attorney, Agent, or Firm* — Fish & Richardson P.C.

(57) ABSTRACT

Local IP Access (LIPA) allows an IP-capable user equipment (UE) connected via a femto cell direct access to other IP-capable devices in the local IP network. Selected IP Traffic Offload (SIPTO) is used to offload selected types of IP traffic towards a defined IP network close to the UE's point of attachment to the access network. LIPA PDN Connectivity indicates a PDP Context or a PDN Connection that gives access to services located in the local IP network of the femto cell subsystem. SIPTO PDN Connectivity indicates a PDP Context or PDN Connection that allows offload of selected types of IP traffic towards a defined IP network close to the UE's point of attachment to the access network. Systems, devices and methods are described herein that enable the identification of the type of connectivity available to a UE and enable session continuity for local cellular coverage.

18 Claims, 27 Drawing Sheets

(56) References Cited

U.S. PATENT DOCUMENTS

| | | | |
|---|---|---|---|
| 2009/0073933 A1 | 3/2009 | Madour et al. | |
| 2009/0156208 A1* | 6/2009 | Vesterinen et al. | 455/435.1 |
| 2009/0232002 A1* | 9/2009 | Foore et al. | 370/236 |
| 2009/0232022 A1 | 9/2009 | Savolainen et al. | |
| 2010/0128697 A1* | 5/2010 | Choi-Grogan | H04W 36/0044 370/332 |
| 2010/0210288 A1 | 8/2010 | Kim et al. | |
| 2010/0260141 A1 | 10/2010 | Chowdhury et al. | |
| 2011/0012284 A1 | 1/2011 | Dehennau et al. | |
| 2011/0045826 A1* | 2/2011 | Kim et al. | 455/426.1 |
| 2011/0116469 A1 | 5/2011 | Bi et al. | |
| 2011/0122845 A1 | 5/2011 | Meirosu et al. | |
| 2011/0170469 A1* | 7/2011 | Watfa et al. | 370/312 |
| 2012/0039304 A1* | 2/2012 | Kim et al. | 370/332 |

FOREIGN PATENT DOCUMENTS

| | | |
|---|---|---|
| WO | 2006/124950 | 11/2006 |
| WO | 2007/111860 | 10/2007 |
| WO | 2008/125729 A1 | 10/2008 |
| WO | 2009/068561 | 6/2009 |
| WO | 2009068561 | 6/2009 |
| WO | 2010/123643 A1 | 10/2010 |

OTHER PUBLICATIONS

Panasonic, "Open Issue for UE initiating LIPA/SIPTO in Solution 1", 3GPP Draft; S2-097234_LIPA-UE-INITIATE-FOR-SOL1_R2, 3rd Generation Partnership Project (3GPP), Mobile Competence Centre, vol. SA WG2, No. Cabo, Nov. 21, 2009, 2 pages.

3rd Generation Partnership Project—3GPP: "Technical Specification Group Services and System Aspects; Local IP Access and Selected IP Traffic Offload; (Release 10) VO.3.1", 3rd Generation Partnership Project (3GPP), Nov. 2009, http://www.3gpp.org/ftp/Specs/archive/23_series/23.829/23829-031.zip, 26 pages.

International Search Report and Written Opinion for corresponding PCT Patent Application No. PCT/US2011/020844, Jun. 30, 2011, 15 pages.

3rd Generation Partnership Project—3GPP: "Technical Specification Group Services and System Aspects; General Packet Radio Service (GPRS) enhancements for Evolved Universal Terrestrial Radio Access Network (E-UTRAN) access (Release 10)", 3rd Generation Partnership Project (3GPP), V10.2.0, Dec. 20, 2010, 245 pages.

Qualcomm Europe, "LIPA solution for H(e)NB using a local PDN connection", 3GPP Draft; S2-095089, 3rd Generation Partnership Project (3GPP), Aug. 28, 2009-Sep. 2, 2009, 6 pages.

Qualcomm Europe, "Key aspects: P-GW/GGSN location principles for LIPA and SIPTO traffic", 3GPP Draft; S2-095088, 3rd Generation Partnership Project (3GPP), Aug. 28, 2009-Sep. 2, 2009, 12 pages.

ETSI, "TS 123401 V9.2.0: LTE; General Packet Radio Service (GPRS) enhancements for Evolved Universal Terrestrial Radia Access network (E-UTRAN) access(3GPP TS 23.401 version 9.2.0 Release)", Oct. 1, 2009, http://www.etsi.org/deliver/etsi_ts/123400_123499/123401/09.02.00_60/ts_123401v090200p.pdf, 276 pages.

International Search Report and Written Opinion for related PCT Application No. PCT/US2011/020838, Jul. 7, 2011, 21 pages.

Panasonic: "Open Issue for UE Initiating LIPA/SIPTO in Solution 1"; 3GPP Draft; Nov. 21, 2009; vol. SA WG2, No. Cabo, XP050432433; 3rd Generation Partnership Project (3GPP); Sophia-Antipolis Cedex, France.

3rd Generation Partnership Project (3GPP); "Technical Specification Group Services and System Aspects"; Local IP Access and Selected IP Traffic Offload; Nov. 2009; Release 10, vol. 3.1, XP002630511; 3rd Generation Partnership Project (3GPP); Sophia-Antipolis Cedex, France.

Office Action including Notice of References for related U.S. Appl. No. 12/685,662, Jun. 12, 2012, 23 pages.

Office Action mailed Nov. 11, 2013, in Japanese patent application No. 2012-548228.

English translation of the Office Action mailed Nov. 11, 2013, in Japanese patent application No. 2012-548228.

Panasonic, Open Issue for UE Initiating LIPA/SIPTO in Solution 1, 3GPP TSG SA WG2 Meeting #76 (TD S2-096598), Mobile Competence Centre, Nov. 16-20, 2009.

Samsung, LIPA/SIPTO TNL considerations, 3GPP TSG SA WG2 Meeting #76 TD S2-096644, Nov. 16- 20, 2009.

English abstract for JP2008541670; published on Nov. 20, 2008 and retrieved on Jan. 29, 2014.

English abstract for JP2009531972; published on Sep. 3, 2009 and retrieved on Jan. 29, 2014.

Office Action mailed Dec. 24, 2013; in corresponding Korean patent application No. 10-2012-7021138.

English language of the Office Action mailed Dec. 24, 2013; in corresponding Korean patent application No. 10-2012-7021138.

Final Office Action mailed Oct. 18, 2013, in corresponding U.S. Appl. No. 13/428,660.

Non-Final Office Action mailed Sep. 10, 2014; in U.S. Appl. No. 13/428,660.

Non-Final Office Action mailed Sep. 10, 2010; in U.S. Appl. No. 13/428,660.

Office Action issued in Chinese Application No. 201180013408.7 on Mar. 27, 2015; 11 pages.

Communication Pursuant to Article 94(3) EPC issued in EP Application No. 11701325.0 on Feb. 6, 2015; 6 pages.

"3rd Generation Partnership Project; Technical SpecificationGroup Services and System Aspects; General Packet RadioService (GPRS) enhancements for Evolved Universal Terrestrial Radio Access Network (E-UTRAN) access (Release 9)"", 3GPP Standard; 3GPP TS 23.401 , 3rd Generation Partnership Project (3GPP), Mobile Competence Centre ; 650, Route Des Lucioles ; F-06921 Sophia-Antipolis Cedex ; France, No. V9.3.0, Dec. 10, 2009, pp. 1-254, XP050400610".

Office Action issued in Canadian Application No. 2,786,702 on Sep. 15, 2015; 3 pages.

Non-Final Office Action mailed Nov. 30, 2012, in corresponding U.S. Appl. No. 13/428,660.

Provisional U.S. Appl. No. 61/175,773, filed May 5, 2009, "Local IP Bearer Establishment Via Home(e) NodeB."

Provisional U.S. Appl. No. 61/236,545, filed Aug. 25, 2009, "Selected IP Traffic Offload Via Home(e) NodeB or Marco Cell".

* cited by examiner

SYSTEM AND METHOD FOR ENABLING DISCOVERY OF LOCAL SERVICE AVAILABILITY IN LOCAL CELLULAR COVERAGE

TECHNICAL FIELD

The application relates to enabling discovery of local service availability in local cellular coverage.

BACKGROUND

Home NodeB (HNB), Home eNB (HeNB) and femto cell are concepts introduced for UMTS and LTE (E-UTRAN) to improve indoor and micro-cell coverage as well as to leverage wireline backhaul to the 'home'. "Femto" cell is widely used outside of 3GPP to mean any cell with a very small coverage, and typically installed in a private premises (either private or corporate or residential/enterprise). The Home NodeB (HNB), Home eNB (HeNB) and femto cell can have a residential or enterprise IP network. The terms HeNB/HNB are used in 3GPP with specific meanings i.e. that the cell is a closed subscriber group (CSG). A CSG identifies subscribers of an operator who are permitted to access one or more cells of the public land mobile network (PLMN) but which have restricted access. A H(e)NB subsystem supports Local IP Access in order to provide access for IP capable UEs connected via a H(e)NB subsystem (i.e. using H(e)NB radio access) to other IP capable entities in the same residential IP network or enterprise IP network.

The term "macro" cell, while not having significance in 3GPP specifications, is widely used to mean a cell other than a CSG cell.

An important aspect of HeNB/HNB functionality is the ability to restrict access to particular users. For example, to employees of the company on whose site the HeNB is deployed, to customers of a particular coffee shop chain, or (in the case of HeNBs deployed in private homes) to individuals.

To achieve this functionality, 3GPP has defined the concept of the CSG. The CSG cell is one which indicates that it is a CSG cell (by means of 1 bit broadcast in the system information) and broadcasts a CSG ID (also in system information). A cell can only indicate one (or none) CSG IDs, however multiple cells may share a CSG ID. A user equipment (UE) device may be subscribed to multiple CSGs. The UE may for example may be a mobile terminal such as, but not limited to a cellular telephone, a personal data assistant (PDA), or a wirelessly enabled computer. A subscription may be temporary in nature (e.g. a coffee shop allows a customer one hour's access to its CSG).

3GPP is also introducing the concept of selective IP traffic offloading, for which an introduction is provided below.

Local IP Access (LIPA) allows an IP-capable UE connected via a femto cell direct access to other IP-capable devices in the local residential/corporate IP network.

Selected IP Traffic Offload (SIPTO) is used to offload selected types of IP traffic (e.g. internet traffic) towards a defined IP network close to the UE's point of attachment to the access network. SIPTO is applicable to traffic offload for the macro-cellular access network and for the femto cell subsystem.

LIPA PDN Connectivity indicates a PDP Context (in the case of a GERAN or UTRAN femto cell connected to a GPRS core network) or a PDN Connection (in the case of an E-UTRAN femto cell connected to a GPRS core network) that gives access to services located in the local residential/corporate IP network of the femto cell subsystem.

SIPTO PDN Connectivity indicates a PDP Context or PDN Connection that allows offload of selected types of IP traffic (e.g. internet traffic) towards a defined IP network close to the UE's point of attachment to the access network. SIPTO is applicable to traffic offload for the macro-cellular access network and for the femto cell subsystem.

Remote PDN Connectivity indicates a regular PDP Context or PDN Connection established neither according to LIPA PDN Connectivity nor SIPTO PDN Connectivity.

BRIEF DESCRIPTION OF THE DRAWINGS

Embodiments of the application will now be described with reference to the attached drawings in which.

DETAILED DESCRIPTION

Figure 1:
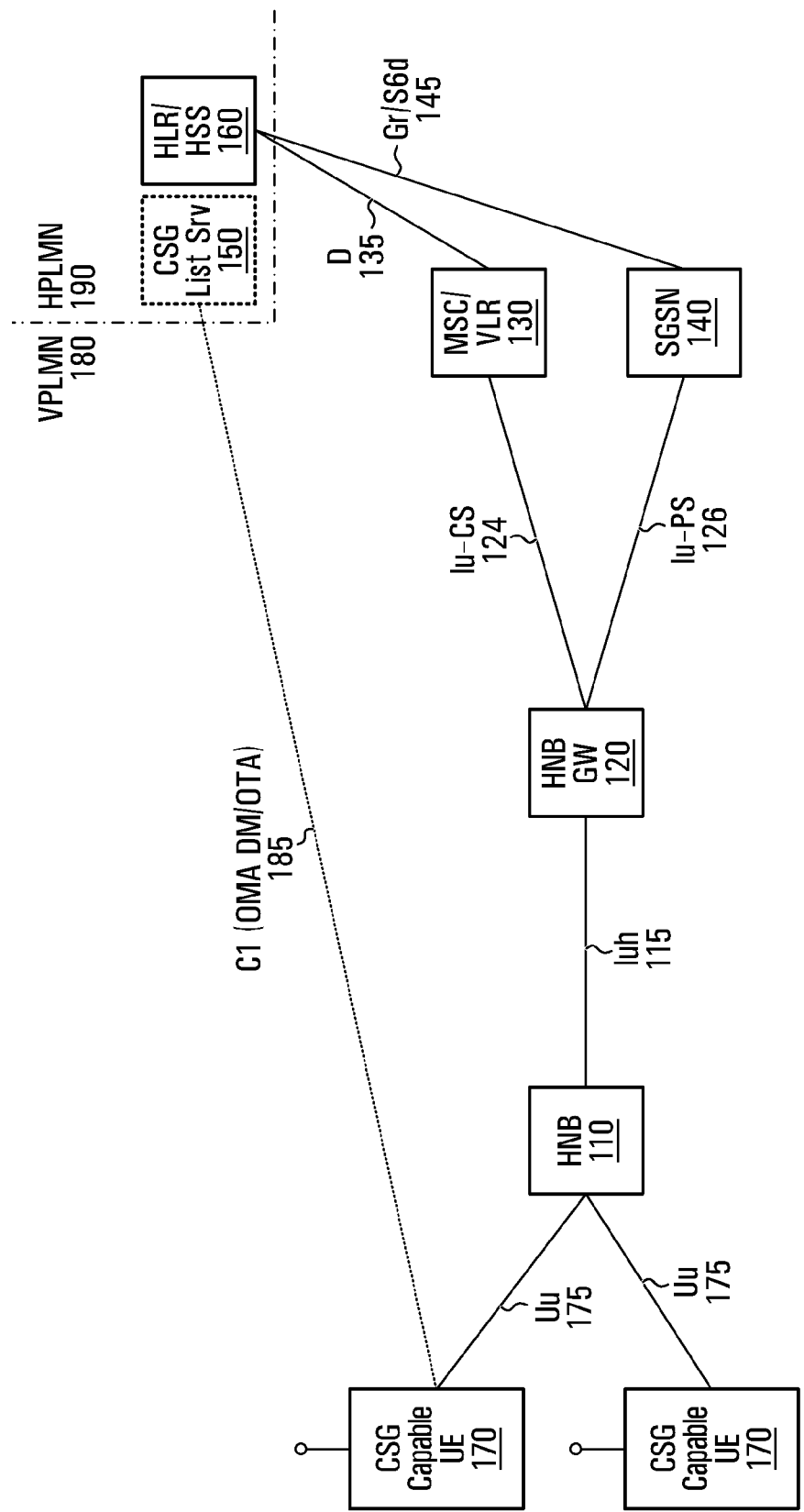
FIG. 1 is a schematic diagram of an example logical architecture for use in a HNB cell on which aspects of the application may be implemented.

In the following detailed description of sample embodiments, reference is made to the accompanying drawings, which form a part hereof, and in which is shown by way of illustration specific sample embodiments. These embodiments are described in sufficient detail to enable those skilled in the art to practice the embodiments, and it is to be understood that other embodiments may be utilized and that logical, mechanical, electrical, and other changes may be made without departing from the scope of what is described in the application. The following detailed description is, therefore, not to be taken in a limiting sense, and the scope is defined by the appended claims.

According to an aspect of the present application, there is provided a method for use in an user equipment (UE) comprising: receiving an indication of a type of connectivity available in a telecommunication cell; wherein an indication of the type of connectivity available is one or more of: local internet protocol access (LIPA) connectivity; selected internet protocol traffic offload (SIPTO) connectivity; and remote connectivity.

In some embodiments, receiving an indication of a type of connectivity available in a telecommunication cell comprises receiving an indication of a type of connectivity available in any one of: a GERAN/UTRAN femto cell; a GERAN/UTRAN macro cell; an E-UTRAN femto cell; an E-UTRAN macro cell; WLAN cells; and non-3GPP cells.

In some embodiments, receiving an indication comprises receiving at least one of: an indication of whether specific types of connectivity are available; and an indication of whether specific types of connectivity are not available.

In some embodiments, receiving an indication of the availability comprises receiving at least one of: LIPA connectivity supported; LIPA connectivity not supported; SIPTO connectivity supported; SIPTO connectivity not supported; remote connectivity supported; and remote connectivity not supported.

In some embodiments, receiving the indication of a type of connectivity available occurs in the non-access stratum (NAS) functional layer.

In some embodiments, receiving the indication of a type of connectivity occurs during one of: attachment; when requesting an additional packet data protocol (PDP) context; at packet data network (PDN) connection.

In some embodiments, receiving the indication of a type of connectivity occurs within one of: an ATTACH REQUEST message; a CREATE PDP CONTEXT REQUEST message; and a PDN CONNECTIVITY REQUEST message.

In some embodiments, requesting a type of connectivity occurs within one of: an ATTACH REQUEST message; a CREATE PDP CONTEXT REQUEST message; and a PDN CONNECTIVITY REQUEST message.

In some embodiments, the method further comprises when the indication of a type of connectivity that is available in a telecommunication cell is undesirable is received; or disconnecting a particular connection for which connectivity is desirable.

In some embodiments, if one of a handover or a cell reselection occurs, from a first telecommunication cell to a second telecommunication cell, said type of connectivity available changes.

In some embodiments, the UE provides an indication to the upper layers responsive to said changes of the type of connectivity due to one of: receiving an indication of a type of connectivity available in the second telecommunication cell; determining the characteristics of the second telecommunication cell absence of a CSG identifier of the second telecommunication cell; the cell identifier information of the second telecommunication cell.

According to another aspect of the present application, there is provided a method for use in an user equipment (UE) comprising: requesting a type of connectivity in a telecommunication cell; wherein the type of connectivity comprises: one or more of: local internet protocol access (LIPA) connectivity; and remote connectivity.

In some embodiments, requesting a type of connectivity in a telecommunication cell is made on an access point name (APN) basis.

In some embodiments, the method further comprises in response to a request for a type of connectivity receiving one of: an indication of a requested type of connectivity available in a telecommunication cell; an indication of a type of connectivity other than that which was requested that is available in a telecommunication cell; and an indication that a requested type of connectivity is not available in a telecommunication cell.

In some embodiments, requesting a type of connectivity in a telecommunication cell is performed during one of: attachment; when requesting an additional packet data protocol (PDP) context; at packet data network (PDN) connection.

In some embodiments, requesting a type of connectivity occurs within one of: an ATTACH REQUEST message; a CREATE PDP CONTEXT REQUEST message; and a PDN CONNECTIVITY REQUEST message.

In some embodiments, the method further comprises in response to a request for a type of connectivity receiving one of: an indication of a supported type of connectivity available in a telecommunication cell; an indication of a requested type of connectivity available in a telecommunication cell; an indication of a type of connectivity other than that which was requested that is available in a telecommunication cell; and an indication that a requested type of connectivity is not available in a telecommunication cell.

In some embodiments, the method further comprises receiving an indication of whether restrictions of availability for a type of connectivity apply only to the current telecommunication cell or to all telecommunication cells with a same closed subscriber group identity (CSG ID).

In some embodiments, the method further comprises: when the indication of a type of connectivity that is available in a telecommunication cell is other than that which was requested is received; or when the indication that a requested type of connectivity is not available: disconnecting a particular connection for which the type of connectivity was requested.

According to yet another aspect of the present application, there is provided a method for use in a first node of a network comprising: receiving a request from a second node in the network for a type of connectivity; validating the request based on the request and information stored in the first node regarding the second node.

In some embodiments, GPRS includes one or more of: Generic Packet Radio Service (GPRS) GERAN, GPRS UTRAN, Evolved Packet System (EPS) GERAN, EPS UTRAN, EPS E-UTRAN, EPS WLAN and other non-3GPP systems.

According to a further aspect of the present application, there is provided a method for use in an user equipment (UE) comprising: receiving application connectivity policies in a functional layer above a non-access stratum (NAS) layer; receiving an indication of at least one mobility event in the functional layer above the NAS layer from a functional layer below the NAS layer; determining whether a specific type of connectivity is available based upon the application connectivity policies and the indication of the at least one mobility event.

In some embodiments, receiving application connectivity policies comprises receiving policies that define one or more of: whether a particular access is preferable for an application with respect to other accesses; whether a particular access is forbidden for an application; whether one or more of: local internet protocol access (LIPA) connectivity; selected internet protocol traffic offload (SIPTO) connectivity; and remote connectivity are preferable for an application when the UE is connected to a closed subscriber group (CSG) cell; whether one or more of: LIPA connectivity; SIPTO connectivity; and remote connectivity are forbidden for an application when the UE is connected to a CSG cell; whether one or more of: LIPA connectivity; SIPTO connectivity; and remote connectivity are the only type of connectivity that an application can use when the UE is connected to a CSG cell; whether an application can use a certain type of connectivity in a specific CSG cell or set of CSG cells; and whether, if LIPA connectivity is available, an application should request LIPA connectivity and remote connectivity simultaneously.

In some embodiments, providing an indication of at least one mobility event comprises providing an indication of one or more of: an active handover to a closed subscriber group (CSG) cell; an active handover from a CSG cell; a Tracking Area Update (TAU)/Routing Area Update (RAU) in a CSG cell; an active handover to a different radio access technology (RAT).

In some embodiments, the method comprises: providing an indication of an active handover to, or from, a CSG cell further comprises at least one of: providing a closed subscriber group identifier (CSG ID) of the CSG cell; and providing an indication of the type of connectivity available in the CSG cell.

In some embodiments, determining whether a specific type of connectivity is available comprises determining if the type of connectivity is one or more of: local internet protocol access (LIPA) connectivity; selected internet protocol traffic offload (SIPTO) connectivity; and remote connectivity.

In some embodiments, determining whether a specific type of connectivity is available further comprises at least one of: suspending operation of at least one application that requires a type of connectivity that is determined not to be available; activating operation of at least one application that requires a type of connectivity that is determined to be available.

In some embodiments, the method further comprises at least one of: suspending operation of at least one application comprises placing one or more of the at least one application in a dormant state in which the one or more application remains active, but does not exchange data; and activating operation of at least one application comprises waking one or more of the at least one application that is in a dormant state.

According to yet a further aspect of the present application, there is provided a method comprising: providing an indication of a type of connectivity in telecommunication cell; wherein the indication of the type of connectivity is one or more of: local internet protocol access (LIPA) connectivity; selected internet protocol traffic offload (SIPTO) connectivity; and remote connectivity.

In some embodiments, providing an indication of a type of connectivity is performed in response to receiving a request for a type of connectivity.

In some embodiments, providing an indication of a type of connectivity is performed in response to receiving one of: a PDP CONTEXT ACTIVATION REQUEST message; and a PDN CONNECTION REQUEST message.

In some embodiments, providing an indication of a type of connectivity is performed in response to receiving a request for connectivity.

In some embodiments, receiving a request for a type of connectivity comprises: receiving a request for one or more of: local internet protocol access (LIPA) connectivity; selected internet protocol traffic offload (SIPTO) connectivity; and remote connectivity.

In some embodiments, providing an indication of a type of connectivity comprises providing: an indication of a supported type of connectivity available in a telecommunication cell; an indication of a type of connectivity other than that which was requested that is available in a telecommunication cell; and an indication that a requested type of connectivity is not available in a telecommunication cell.

According to another aspect of the present application, there is provided a method comprising: providing an indication of a type of connectivity in a macro cell wherein the indication of the type of connectivity is one or more of: local internet protocol access (LIPA) connectivity; and remote connectivity.

In some embodiments, providing an indication of a type of connectivity is performed in response to receiving one of: a PDP CONTEXT ACTIVATION REQUEST message; an ATTACH REQUEST message in E-UTRAN; and a PDN CONNECTION REQUEST message.

In some embodiments, providing an indication of a type of connectivity comprises providing: an indication of a requested type of connectivity available in a macro cell; an indication of a type of connectivity other than that which was requested that is available in a macro cell; and an indication that a requested type of connectivity is not available in a macro cell.

According to still another aspect of the present application, there is provided a user equipment configured to implement a method as described above or below.

According to still yet another aspect of the present application, there is provided a user equipment configured to implement a method as described above or below.

According to another aspect of the present application, there is provided a user equipment configured to implement a method as described above or below.

According to yet another aspect of the present application, there is provided a mobility management entity configured to implement a method as described above or below.

According to a further aspect of the present application, there is provided a mobility management entity configured to implement a method as described above or below.

In the description below the term femto cell is intended to define a cell with a very small coverage, and typically installed in a private premises (either private or corporate or residential/enterprise). Femto cells may include cells such as HNB, HeNB or CSG cells for use in 3GPP systems. Femto cells may also include cells for non-3GPP system and WLAN cells, i.e. a WLAN Access Point.

Also in the description below a PDN connection may be used to describe a connection in E-UTRAN or access of a non-3GPP system such as a wireless LAN.

In the architectures described below with reference to FIGS. 1 to 6 many of the network elements are described "in communication" with other network nodes. The term "in communication with" in not intended to describe that the network nodes are in constant communication or that communication is occurring simultaneously. It is intended to mean that the network nodes are configured in a manner that signalling may occur between the network nodes when appropriate.

An architecture model for a Home NodeB access network will now be described with reference to FIG. 1.

In FIG. 1 two CSG capable UEs 170 are in communication with a HNB 110 over reference point Uu 175. The UEs 170 may for example may be a mobile terminal such as, but not limited to a cellular telephone, a personal data assistant (PDA), or a wirelessly enabled computer. The HNB 110 is in communication with a HNB gateway (HNB GW) 120 over reference point Iuh 115. The HNB GW 120 is in communication with mobile switching center/visitor location center (MSC/VLR) 130 over reference point Iu-CS 124. The HNB GW 120 is in communication with serving GPRS Support Node (SGSN) 140 over reference point Iu-PS 126. A CSG List Server (CSG List Srv) 150 and home location register/home subscriber server (HLR/HSS) 160 are part of a home public land mobile network (HPLMN) 190. Networks that are not the HPLMN 190 on which the UE may operate are a visited public land mobile network (VPLMN) 180. The MSC/VLR 130 and the SGSN 140 are each in communication with the HLR/HSS 160 over respective reference points D 135 and GRs6d 145. One of the CSG enabled UE 170 is in communication with the CSG List Srv 150 over reference point C1 185. A more detailed description of the elements and communication reference points of FIG. 1 are provided below.

HNB 110: The HNB 110 provides the RAN connectivity using the Iuh 115 interface, supports the NodeB and most of the radio network controller (RNC) functions and also HNB authentication, HNB-GW discovery, HNB registration and UE registration over Iuh 115. The HNB 110 secures the communication to/from the SeGW.

HNB GW 120: The HNB GW 120 serves the purpose of a RNC presenting itself to the core network (CN) as a concentrator of HNB connections, i.e. the HNB GW 120 provides concentration function for the control plane and provides concentration function for the user plane. The HNB GW 120 supports Non Access Stratum (NAS) Node Selection Function (NNSF).

Uu 175: Standard Uu interface between the UE 170 and the HNB 110.

Iuh 115: Interface between the HNB 110 and HNB GW 120. For the control plane, Iuh 115 uses HNBAP protocol to support HNB registration, UE registration and error handling functions. For the user plane, Iuh support user plane transport bearer handling.

Iu-CS 124: Standard Iu-CS interface between the HNB GW 120 and the circuit switched (CS) core network.

Iu-PS 126: Standard Iu-PS interface between the HNB GW 120 and the packet switched (PS) core network.

D 135: Standard D interface between mobile switching center/visitor location center (MSC/VLR) 130 and home location register/home subscriber server (HLR/HSS) 160.

Gr 145: Standard Gr interface between serving GPRS Support Node (SGSN) 140 and HLR/HSS 160.

C1 185: Optional interface between the CSG List Server (CSG List Srv) 150 and CSG-capable UEs. Over-the-air (OTA) signalling is used to update the allowed CSG list on a UE 170 with a Rel-8 Universal Subscriber Identity Module (USIM). In some embodiments, Open Mobile Alliance Device Management (OMA DM) is used to update the Allowed CSG list on the UE 170 with a pre-Rel-8 USIM.

UEs that are capable of supporting Release 8 (Rel-8) functionality of the 3GPP standard may support CSG functionality and maintaining a list of allowed CSG identities. This list can be empty in case the UE does not belong to any CSG.

Each cell of a HeNB may belong to, at maximum, one CSG. It is possible for cells of a HeNB to belong to different CSGs and hence have different CSG IDs.

The Allowed CSG List is provided as part of the CSG subscriber's subscription data to the MME.

The Allowed CSG List can be updated in the UE according to the result of the attach procedure, the TAU (Tracking Area Update) procedure, service request and detach procedures or by application level mechanisms such as OMA DM procedures.

The MME performs access control for the UEs accessing through CSG cells during attach, combined attach, detach, service request and TAU procedures.

The UE is notified of the cause of rejection by the network if the UE is not allowed to access a CSG cell.

When a CSG ID which is not included in the UE's Allowed CSG List is manually selected by the user, a TAU procedure via the selected CSG cell may be triggered immediately by the UE to allow MME to perform CSG access control.

Several architectures for HeNB CSG Cells will now be described with reference to FIG. 2, FIG. 3 and FIG. 4.

Figure 2:
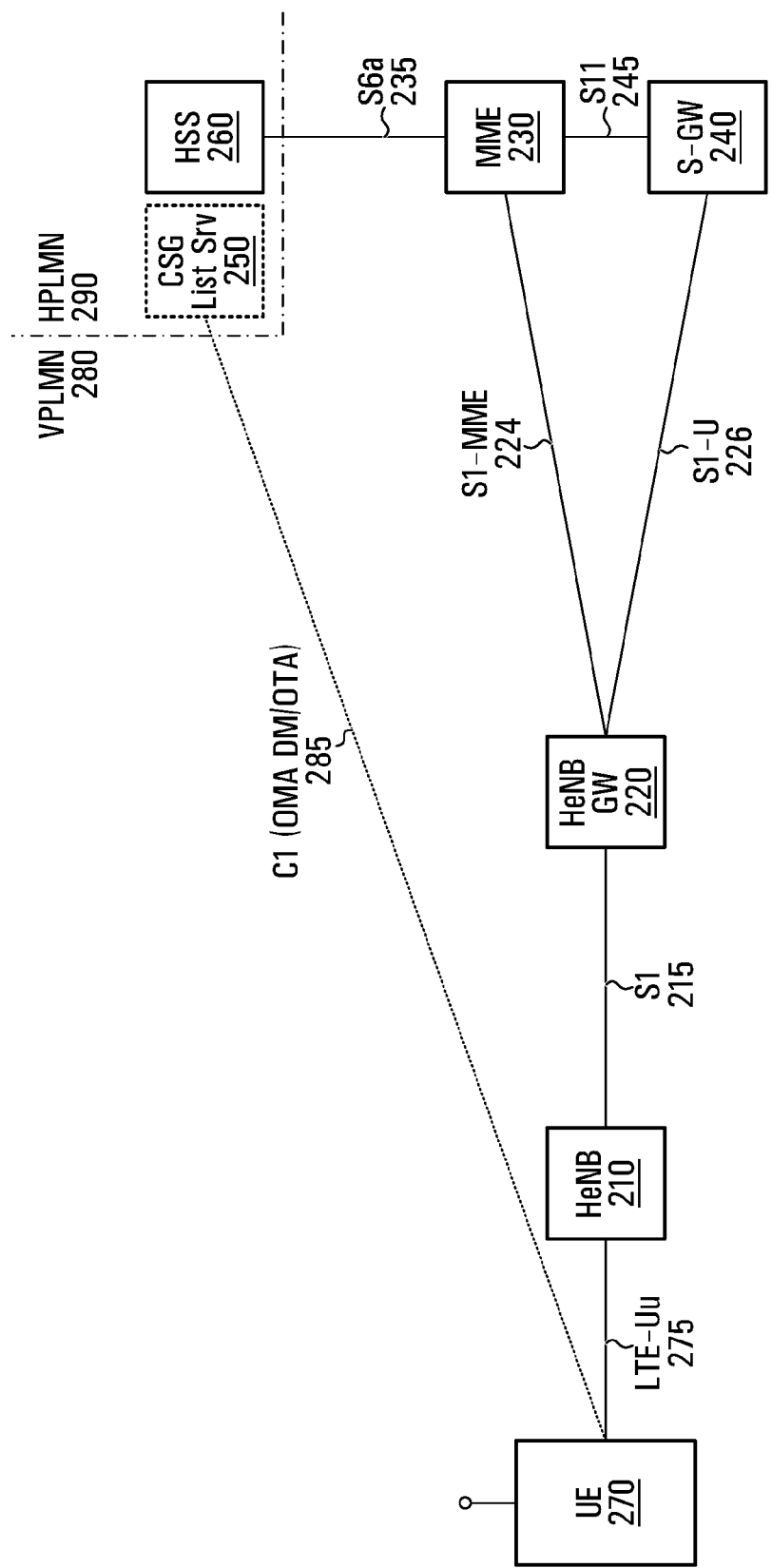
FIG. 2 is a schematic diagram of an example logical architecture for use in a HeNB cell on which aspects of the application may be implemented.

With reference to FIG. 2, a single UE 270 is in communication with a HeNB 210 over reference point LTE-Uu 275. The HeNB 210 is in communication with a HeNB gateway (HeNB GW) 220 over reference point S1 215. The HeNB GW 220 is in communication with mobility management entity (MME) 230 over reference point S1-MME 224. The HeNB GW 220 is in communication with serving gateway (S-GW) 240 over reference point S1-U 226. A CSG List Server (CSG List Srv) 250 and home subscriber server (HSS) 260 are part of a home public land mobile network (HPLMN) 290. Networks that are not the HPLMN 290 on which the UE may operate are a visited public land mobile network (VPLMN) 280. The MME 230 is in communication with the HSS 260 over reference point S6a 235. The S-GW 240 is in communication with the MME 230 over reference point S11 245. The UE 270 is in communication with the CSG List Srv 250 over reference point C1 285. A more detailed description of the elements and communication reference points of FIG. 2 are provided below.

HeNB 210: The functions supported by the HeNB 210 may be the same as those supported by an eNB (with the possible exception of Non Access stratum (NAS) node selection function (NNSF)) and the procedures run between a HeNB and the evolved packet core (EPC) may be the same as those between an eNB and the EPC. The HeNB 210 secures the communication to/from the SeGW 240.

HeNB GW 220: HeNB GW 220 serves as a concentrator for the control plane (C-Plane), specifically the S1-MME interface 224. The HeNB GW may optionally terminate the user plane towards the HeNB 210 and towards the S-GW 240, and provide a relay function for relaying User Plane data between the HeNB 210 and the S-GW 240. In some embodiments, the HeNB GW 220 supports NNSF.

A Security Gateway is a logical function that may be implemented either as a separate physical entity or co-located with an existing entity. The SeGW secures the communication from/to the HeNB 210.

LTE-Uu 275: Standard LTE-Uu interface between the UE 270 and the HeNB 210.

S1-MME 224: The S1-MME 224 interface is defined between HeNB 210 and MME 230 if no HeNB GW 220 is used. If HeNB GW 220 is present, as HeNB GW 420 in FIG. 4, it may use an S1-MME interface towards both HeNB and MME.

S1-U 226: The S1-U data plane is defined between the HeNB 210, HeNB GW 220 and the Serving Gateway (S-GW) 240, depending upon the arrangement of network elements. The S1-U 226 interface from the HeNB 210 may be terminated at the HeNB GW 220, or a direct logical U-Plane connection between HeNB and S-GW may be used.

S11 245: Standard interface between MME 230 and S-GW 240.

S6a 235: Standard interface between MME 230 and HSS 260.

C1 285: Optional interface between the CSG List Srv 250 and CSG-capable UEs 270. OTA is used to update the allowed CSG list on a UE 270 with a Rel-8 USIM. OMA DM is used to update the Allowed CSG list on a UE with a pre-Rel-8 USIM.

Figure 3:
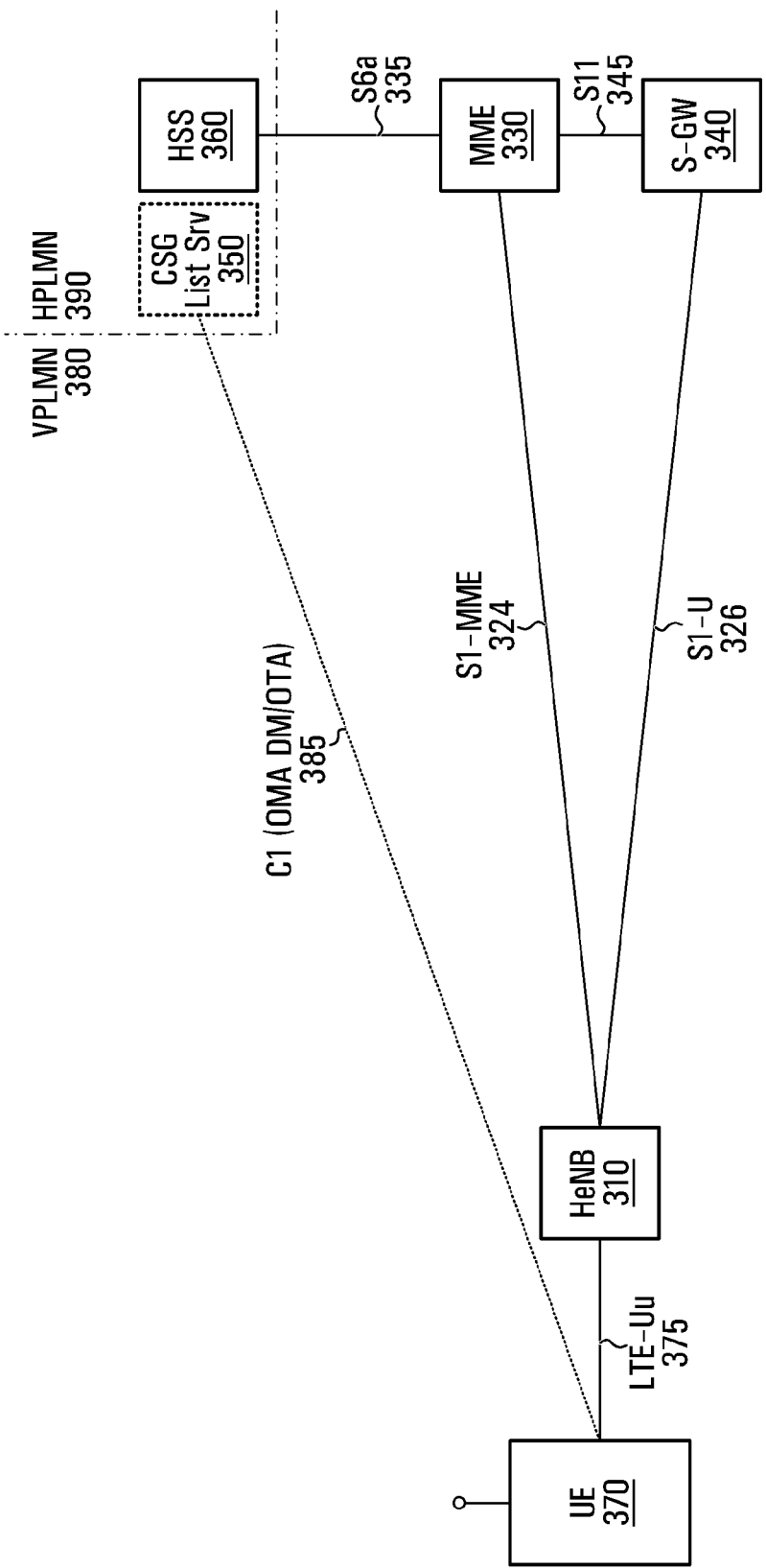
FIG. 3 is a schematic diagram of another example logical architecture for use in a HeNB cell on which aspects of the application may be implemented.

With reference to FIG. 3, a single UE 370 is in communication with a HeNB 310 over reference point LTE-Uu 375. The HeNB 310 is in communication with a S-GW 340 over reference point S1-U 326. The HeNB 310 is in communication with MME 330 over reference point S1-MME 324. A CSG List Srv 350 and HSS 360 are part of a HPLMN 390. Networks that are not the HPLMN 390 on which the UE may operate are a VPLMN 380. The MME 330 is in communication with the HSS 360 over reference point S6a 335. The S-GW 340 is in communication with the MME 330 over reference point S11 345. The UE 370 is in communication with the CSG List Srv 350 over reference point C1 385.

Figure 4:
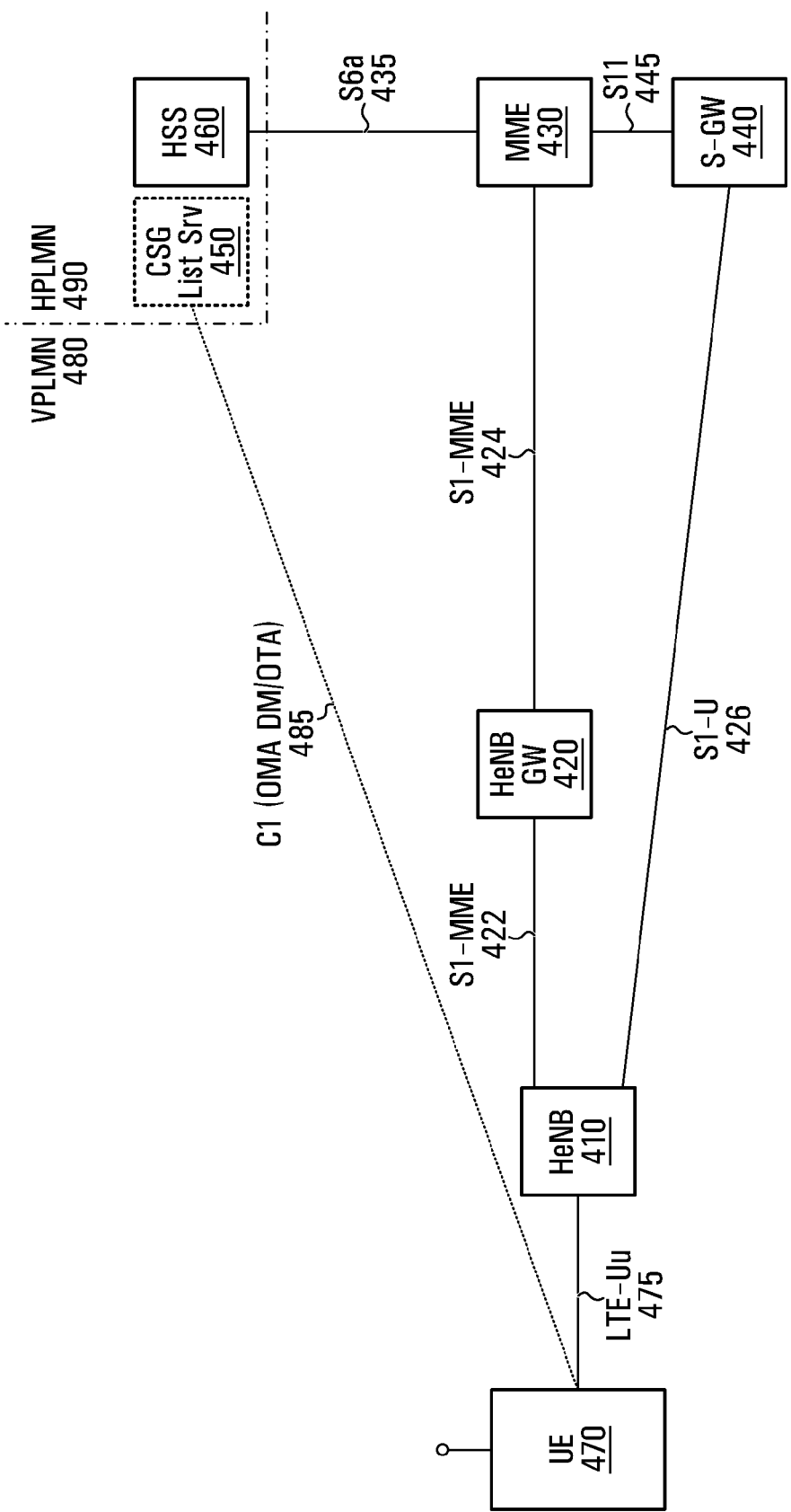
FIG. 4 is a schematic diagram of a further example logical architecture for use in a HeNB cell on which aspects of the application may be implemented.

With reference to FIG. 4, a single UE 470 is in communication with a HeNB 410 over reference point LTE-Uu 475. The HeNB 410 is in communication with a S-GW 440 over reference point S1-U 426. The HeNB 410 is in communication with a HeNB-GW 420 over reference point S1-MME 422. The HeNB-GW 420 is in communication with MME 430 over reference point S1-MME 424. A CSG List Srv 450 and HSS 460 are part of a HPLMN 490. Networks that are not the HPLMN 490 on which the UE may operate are a VPLMN 480. The MME 430 is in communication with the HSS 460 over reference point S6a 435. The S-GW 440 is in communication with the MME 430 over reference point S11 445. The UE 470 is in communication with the CSG List Srv 450 over reference point C1 485.

Traditionally, the UE connects to services through a remote connection (PDP Context towards a GGSN in the core network in the case of 2G/3G, and a PDN Connection to a PGW in the Evolved packet system (EPS).

The HNB/HeNB can be located in a home or corporate environment. Some of the following description will refer to the HNB/HeNB being in a home network, however this is not intended to limit the scope of the application.

When the UE connects to a HNB, it is foreseen that in certain scenarios the UE will benefit from obtaining local connectivity, i.e. connectivity through the IP network local to the HNB (i.e. the (residential or enterprise) IP network in the HNB "home" premises). An example of this scenario is when a given application in the UE needs to print on a local printer, or an application needs to download an updated music playlist from a local media server.

Several architectures for Non-3GPP will now be described with reference to FIG. 21 and FIG. 22.

Figure 21:
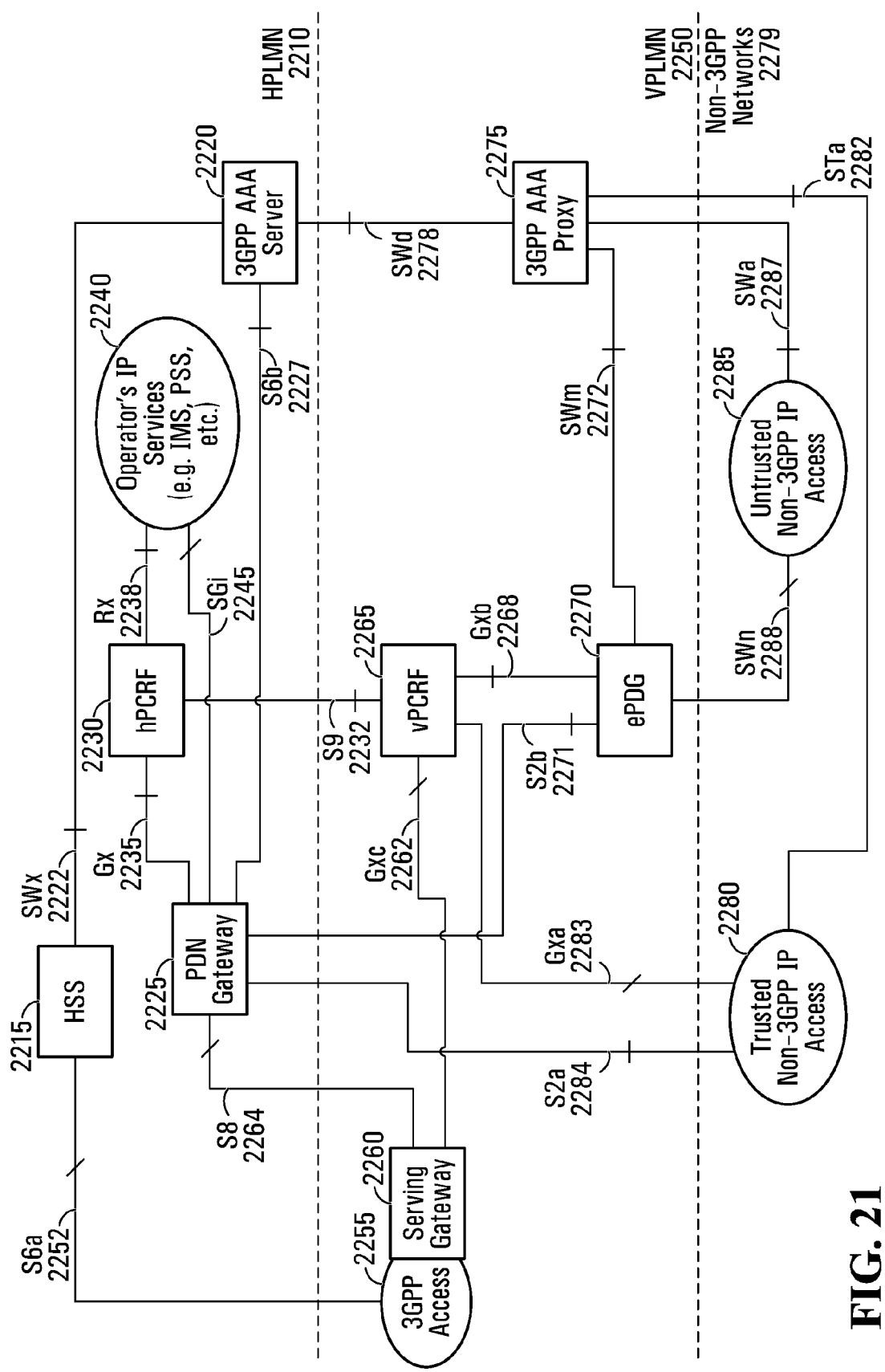
FIG. 21 is a schematic diagram of an example logical architecture in an Evolved Packet System (EPS) including Non-3GPP networks on which aspects of the application may be implemented.

With reference to FIG. 21, a HPLMN 2210 includes an HSS 2215 communicating with a 3GPP AAA server 2220 over reference point SWx 2222. The 3GPP AAA server 2220 is communicating with PDN Gateway 2225 via reference point S6b 2227. The PDN Gateway 2225 is communicating with hPCRR 2230 over reference point Gx 2235. The PDN Gateway 2225 is communicating with Operator's IP Services 2240 over reference point SGi 2245. hPCRR 2230 is communicating with Operator's IP Services 2240 over reference point Rx 2238.

A VPLMN includes 3GPP Access 2255 having a Serving Gateway 2260. The Serving Gateway 2260 is communicating with vPCRF 2265 over reference point Gxc 2262. The vPCRF 2265 is in communication with ePDG 2270 over reference point Gxb 2268. The ePDG 2270 is in communication with 3GPP AAA Proxy 2275 over reference point SWm 2272.

Serving Gateway 2260 is in communication with PDN Gateway 2225 over reference point S8 2264. 3GPP Access 2255 is in communication with HSS 2215 over reference point S6a 2252. ePDG 2270 is in communication with PDN Gateway 2225 over reference point S2b 2271. 3GPP AAA Server is in communication with 3GPP AAA Proxy 2275 over reference point SWd 2278. hPCRF 2230 is in communication with vPCRF 2265 via reference point 2232.

Non-3GPP Networks 2279 includes Trusted Non-3GPP IP Access 2280 and Untrusted Non-3GPP IP Access 2285. Trusted and Untrusted Non-3GPP Access Networks are IP access networks that use access technology whose specification is out of the scope of 3GPP.

Trusted Non-3GPP IP Access 2280 is in communication with 3GPP AAA Proxy 2275 over reference point STa 2282, in communication with vPCRF 2265 over reference point Gxa 2283, and PDN Gateway 2225 over reference point S2a 2284.

Untrusted Non-3GPP IP Access 2285 is in communication with 3GPP AAA Proxy 2275 over reference point SWa 2287 and in communication with ePDG 2270.

Figure 22:
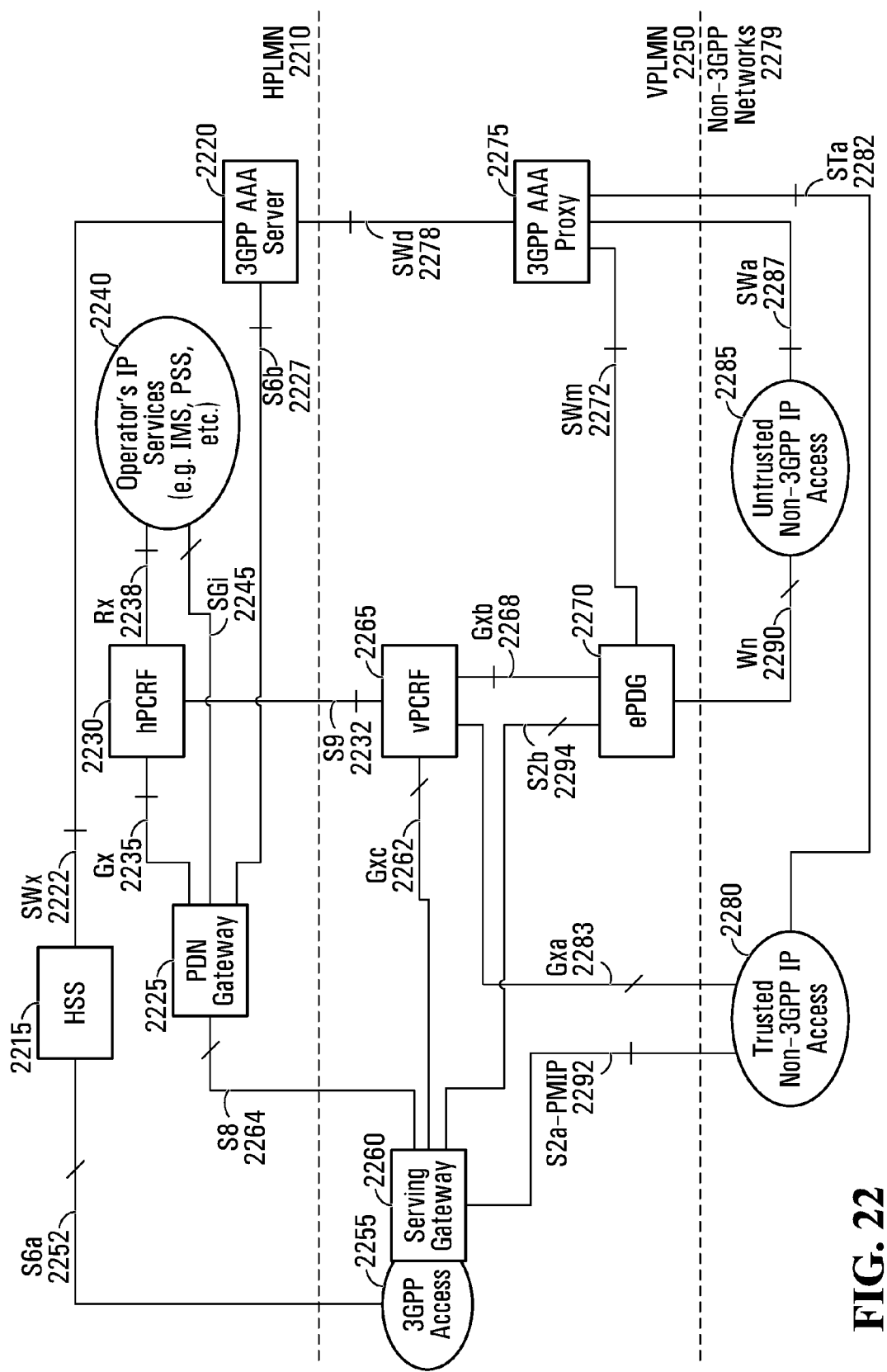
FIG. 22 is a schematic diagram of another example logical architecture in an EPS including Non-3GPP networks on which aspects of the application may be implemented.

With reference to FIG. 22, the network elements in the HPLMN 2210, VPLMN 2250 and Non-3GPP network 2279 are the same as in FIG. 21, but the connectivity between some of the elements is different.

For Trusted Non-3GPP IP Access 2280, instead of a reference point directly to PDN Gateway 2225 as in FIG. 21, there is a reference point S2a-PMIP 2292 from Trusted Non-3GPP IP Access 2280 to Serving Gateway 2260 and existing reference point 2264 from Serving Gateway 2260 to PDN Gateway 2225. Also there is shown to be an additional reference point 2294 between Serving Gateway 2260 and ePDG 2270.

For Untrusted Non-3GPP IP Access 2285, reference point SWn 2288 to ePDG 2270 has been replaced with a new reference point Wn 2290.

S2a 2284 provides the user plane with related control and mobility support between Trusted Non 3GPP IP Access 2280 and the PDN Gateway 2225.

S2b 2271 provides the user plane with related control and mobility support between ePDG 2270 and the PDN Gateway 2225.

S8 2264 provides user plane tunneling and tunnel management between Serving GW 2260 and PDN GW 2225. It is used for Serving GW relocation due to UE mobility and in case the Serving GW needs to connect to a non collocated PDN GW for the required PDN connectivity.

S6a 2252 is defined between MME and HSS 2215 for authentication and authorization.

S6b 2227 is the reference point between PDN Gateway 2225 and 3GPP AAA server/proxy 2220 for mobility related authentication if needed. This reference point may also be used to retrieve and request storage of mobility parameters. This reference point may also be used to retrieve static QoS profile for a UE for non-3GPP access in case dynamic PCC is not supported.

Gx 2235 provides transfer of (QoS) policy and charging rules from PCRF 2230 to Policy and Charging Enforcement Function (PCEF) in the PDN GW 2225.

Gxa 2283 provides transfer of (QoS) policy information from PCRF 2265 to the Trusted Non-3GPP IP Access 2280.

Gxc 2262 provides transfer of (QoS) policy information from PCRF 2265 to the Serving Gateway 2260.

S9 2232 provides transfer of (QoS) policy and charging control information between the Home PCRF 2230 and the Visited PCRF 2265 in order to support local breakout function. In all other roaming scenarios, S9 has functionality to provide dynamic QoS control policies from the HPLMN 2210.

SGi 2245 is the reference point between the PDN Gateway 2225 and the packet data network. Packet data network may be an operator external public or private packet data network or an intra operator packet data network, e.g. for provision of IMS services. This reference point corresponds to Gi and Wi functionalities and supports any 3GPP and non-3GPP access systems.

SWa 2287 connects the Untrusted Non-3GPP IP Access 2285 with the 3GPP AAA Server/Proxy 2275 and transports access authentication, authorization and charging-related information in a secure manner.

STa 2282 connects the Trusted Non-3GPP IP Access 2280 with the 3GPP AAA Server/Proxy 2275 and transports access authentication, authorization, mobility parameters and charging-related information in a secure manner.

SWd 2278 connects the 3GPP AAA Proxy 2275, possibly via intermediate networks, to the 3GPP AAA Server 2220.

SWm 2272 is located between 3GPP AAA Server/Proxy 2275 and ePDG 2270 and is used for AAA signalling (transport of mobility parameters, tunnel authentication and authorization data).

SWn 2288 is the reference point between the Untrusted Non-3GPP IP Access 2285 and the ePDG 2270. Traffic on this interface for a UE-initiated tunnel has to be forced towards ePDG. This reference point has the same functionality as Wn.

SWu is a reference point between the UE and the ePDG 2270 and supports handling of IPSec tunnels. The functionality of SWu includes UE-initiated tunnel establishment, user data packet transmission within the IPSec tunnel and tear down of the tunnel and support for fast update of IPSec tunnels during handover between two untrusted non-3GPP IP accesses.

SWx 2222 is located between 3GPP AAA Server and HSS and is used for transport of authentication, subscription and PDN connection related data.

LIPA will be described in further detail with regard to the FIGS. 5 and 6.

Figure 5:
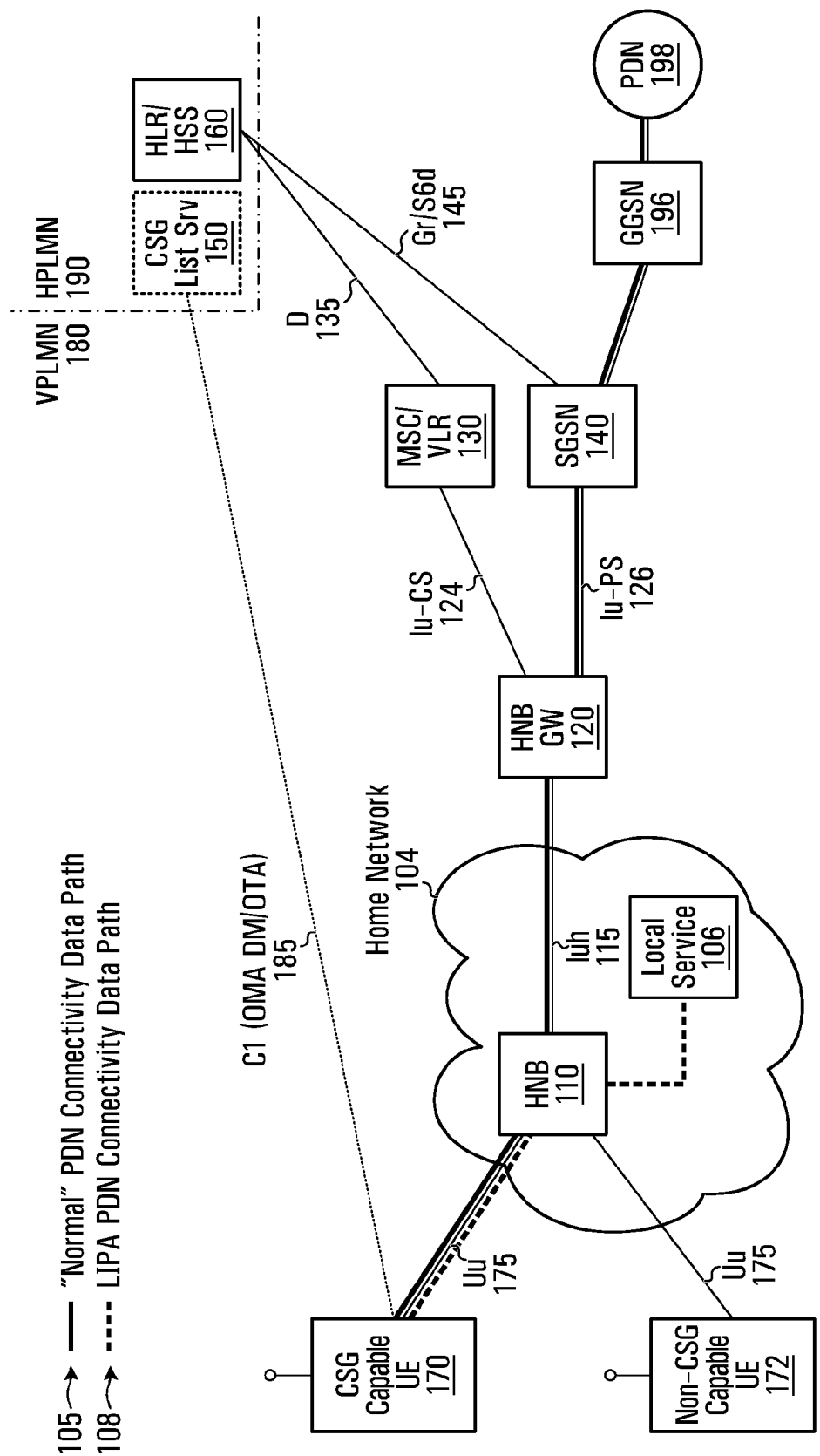
FIG. 5 is a schematic diagram of the example logical architecture of FIG. 1 illustrating Local IP connectivity according to an embodiment of the application.

With reference to FIG. 5, the network that is illustrated is substantially the same as FIG. 1 with the addition of a GGSN 196 connected to the SGSN 140 and a PDN 198 connected to the GGSN 196 and a home network 104 that has an illustrated coverage area defined by a cloud shape. LIPA PDN connectivity is illustrated from the UE 170 through the HNB 110 to the local service 106 via dashed line 108. Normal PDN connectivity via the core network (HNB GW 120, SGSN 140 and GGSN 196) is illustrated from the UE 170 to the PDN 198 via solid line 105.

Figure 6:
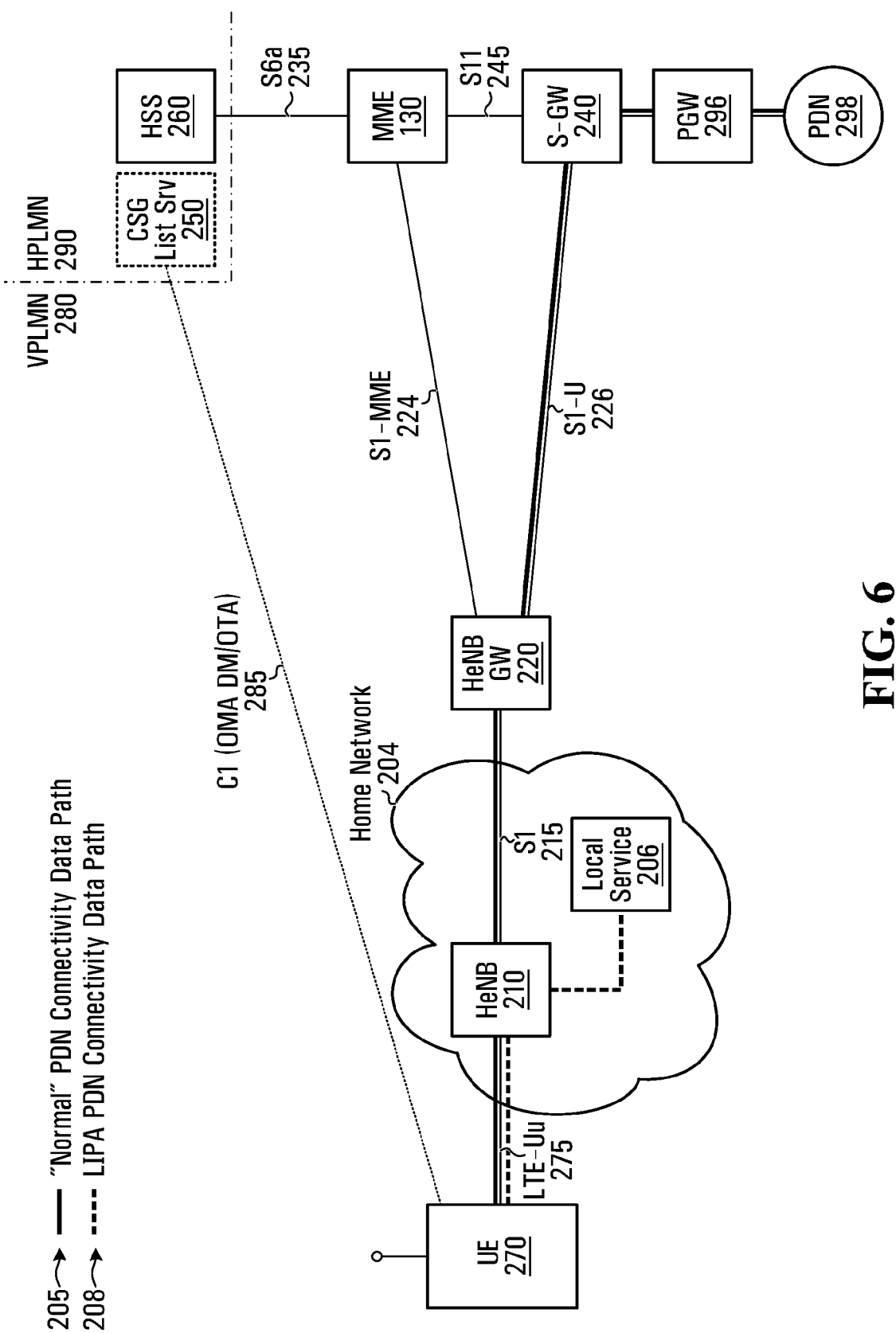
FIG. 6 is a schematic diagram of the example logical architecture of FIG. 2 illustrating Local IP connectivity according to an embodiment of the application.

With reference to FIG. 6, the network that is illustrated is substantially the same as FIG. 2 with the addition of a PGW 296 connected to the S-GW 240 and a PDN 298 connected to the PGW 296 and a home network 204 that has an illustrated coverage area defined by a cloud shape. LIPA PDN connectivity is illustrated from the UE 270 through the HeNB 210 to the local service 206 via dashed line 208. Normal PDN connectivity via the core network (HeBN 210, HeNB GW 220, S-GW 240 and PGW 296) is illustrated from the UE 270 to the PDN 298 via solid line 205.

In some implementations, a UE determines whether it has access to a given HNB as a result of the UE having knowledge of its belonging to a specific Closed Subscriber Group (CSG). The operator/owner of an HNB creates list of CSGs and provisions the UEs with CSG lists so that the UE knows which HNBs it can connect to. Therefore, a UE that is moving in macro-coverage (i.e. in cellular cells not belonging to a CSG/HNB) may come across a CSG/HNB cell. The UE may use the CSG information to decide whether to attempt connection to such HNB or not. CSG information may be configured in the UE by the operator and may be modified dynamically, e.g. using Open Mobile Alliance Device Management (OMA-DM). Universal Subscriber Identity Module (USIM) information to support LIPA is also foreseen. In some implementations this information may be managed by the HeNB hosting party.

In the following discussion, unless explicitly indicated, when LIPA connectivity is discussed, the issues and concepts apply also to SIPTO connectivity as well.

Discovery of Types of Connectivity Available

When a UE connects to a femto cell in a CSG or to a WLAN AP or to a cell or femto cell in a non-3GPP radio technology (for example a 3GPP2 cell), hereinafter referred to generically as a cell, the UE may not know whether the cell provides LIPA connectivity or whether the cell only provides remote connectivity to a remote IP anchoring point (e.g. a GGSN or PDN GW) in the core network.

Typically, a decision of whether to provide connectivity for one or more of the PDNs the UE requests is made by the operator and/or owner of the CSG cell.

If the user or applications in the UE desire to connect using LIPA connectivity, the user and the applications need to be aware of the availability of such connectivity. In some implementations legacy UEs, that is UEs that are pre-release 9 may also make use of LIPA connectivity.

In some embodiments, the CSG cell provides to the UEs by broadcasting over a radio channel a Supported Connectivity Type indication of whether LIPA connectivity is available. In some implementations the femto cell provides a simple indication of whether LIPA is supported or not. In some embodiments, the femto cell provides a "LIPA supported" indication with a value indicating "supported" and a value indicating "not supported". In some embodiments, the femto cell provides a "LIPA supported" indication only when LIPA is supported. When the UE is connecting to the femto cell the UE detects the Supported Connectivity Type indication and decides, based on the value of the Supported Connectivity Type, whether to establish the present or future PDN connections using LIPA or not. The UE connecting to the femto cell and discovering whether LIPA connectivity is supported may occur during events such as, but not limited to: initial attach to the network by the UE; handover of the UE from macro cell to femto cell; idle mobility of the UE from macro cell to femto cell; handover of the UE from a 3GPP macro cell or 3GPP femto cell to a non-3GPP access; and handover of the UE from a non-3GPP access to a 3GPP femto cell. The UE connecting to the femto cell and discovering whether SIPTO connectivity is supported may occur during events such as, but not limited to: initial attach to the network by the UE; handover of the UE from macro cell to femto cell or from femto cell to macro cell; idle mobility of the UE from femto cell to macro cell; handover of the UE from a 3GPP macro cell or 3GPP femto cell to a non-3GPP access; handover of the UE from a non-3GPP access to a 3GPP macro cell or femto cell.

In some embodiments, the cell provides to the UEs over a radio channel an indication of the type of connectivity available in the cell. In some embodiments the cell provides a simple indication of whether one or more of: LIPA connectivity; SIPTO connectivity and remote connectivity, are supported.

In some implementations, the cell provides the indication using multiple fields or bits, one for each type of connectivity, each of them indicating whether the specific type of connectivity is supported, for example LIPA connectivity, SIPTO connectivity, and/or remote connectivity. In some implementations, the cell provides the indication using multiple separate indications, one for each type of connectivity supported. In some embodiments, the indication or indications may be included with a "not supported" value when the type of connectivity is not supported. In some embodiments, the indication or indications may be omitted when the type of connectivity is not supported. When the UE is connecting to the cell, the UE detects the Supported Connectivity Type indication and decides, based on the value of the Supported Connectivity Type, whether to establish the current or future PDN connections using LIPA or not.

An example of the above described embodiments may be based on the idea of providing a Supported Connectivity Type information element to the UE containing one of the following: a single indicator or bit indicating either "LIPA connectivity supported" or "LIPA connectivity not supported"; multiple indicators or bits indicating: "LIPA connectivity supported" or "LIPA connectivity not supported"; "SIPTO connectivity supported" or "SIPTO connectivity not supported"; "remote connectivity supported" or "remote connectivity not supported".

In some embodiments an indication similar to that described in the above embodiments is provided at the networking layer (for example the NAS level in GERAN, UTRAN or E-UTRAN, or IP layer for non-3GPP accesses, or IKEv2 signalling or DSMIPv6 signalling) to the UE, e.g. when the UE initially attaches to the cell, or when the UE performs an handover to the cell, or upon establishing connectivity after idle mobility to the cell (e.g. upon performing a Tracking Area Update in E-UTRAN or Location Area Update in GERAN/UTRAN).

An example of such an implementation is based on the idea of providing a Supported Connectivity Type information element to the UE in: an Attach Accept message in both GERAN/UTRAN and E-UTRAN; in a Tracking Area Update message in E-UTRAN; in a Routing Area Update message in GERAN/UTRAN; in a Activate PDP Context Accept in GERAN/UTRAN; in a Activate PDP Context Reject in GERAN/UTRAN; and in a Activate Default EPS Bearer Context Request message in E-UTRAN. Another example of such implementation is based on providing a Supported Connectivity type information element (IE) to the UE in IKEv2 signalling messages used by the UE when establishing connectivity for WLAN with an Evolved Packet Data Gateway (ePDG). A further example of such implementation is based on non-3GPP access specific networking layer messages, for example in 3GPP2 cells, or in Dual-Stack Mobile IPv6 (DSMIPv6) when the UE is establishing connectivity over a WLAN cell or another non-3GPP cell.

In some embodiments, the Supported Connectivity Type information element contains one of the following: a single bit indicating either "LIPA connectivity supported" or "LIPA connectivity not supported"; multiple bits indicating each: "LIPA connectivity supported" or "LIPA connectivity not supported"; "SIPTO connectivity supported" or "SIPTO connectivity not supported"; "remote connectivity supported" or "remote connectivity not supported".

Figure 23:
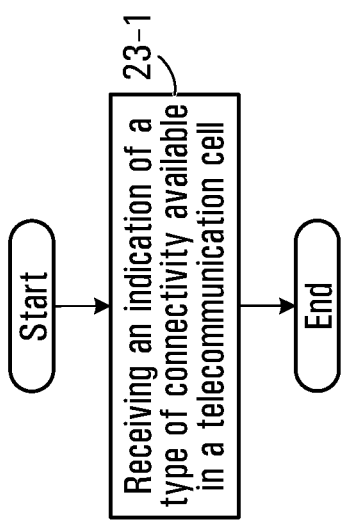
FIG. 23 is a flow chart illustrating an example of a method according to an embodiment described herein.

A method for use in an user equipment (UE) is described with reference to FIG. 23. The method involves a step 23-1 of receiving an indication of a type of connectivity available in a telecommunication cell. In some embodiments the indication of the type of connectivity available is one or more of: local internet protocol access (LIPA) connectivity; selected internet protocol traffic offload (SIPTO) connectivity; and remote connectivity.

Figure 24:
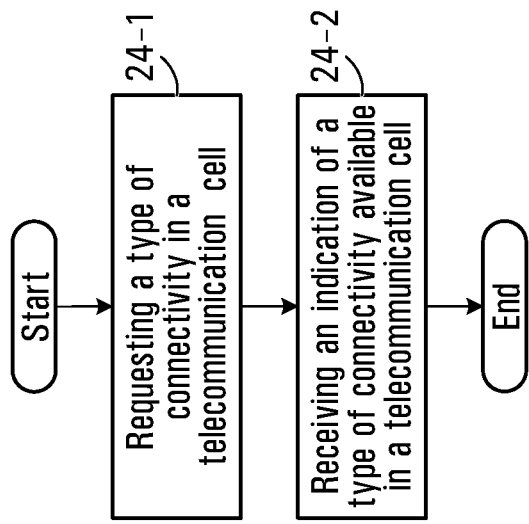
FIG. 24 is a flow chart illustrating another example of a method according to an embodiment described herein.

As shown in FIG. 24, in some embodiments receiving an indication of a type of connectivity available in a telecommunication cell step 24-2 is performed in response to the UE requesting a type of connectivity available in a telecommunication cell in step 24-1.

Figure 26:
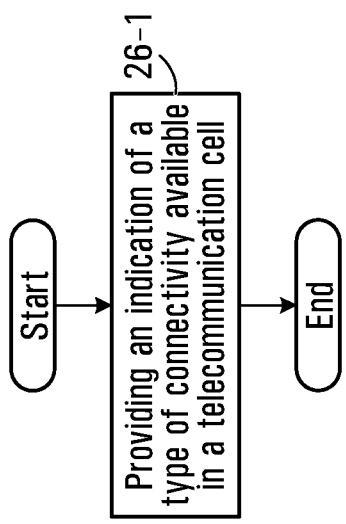
FIG. 26 is a flow chart illustrating yet another example of a method according to an embodiment described herein.

A method for use in an mobility management entity is described with reference to FIG. 26. The method involves a step 26-1 of providing an indication of a type of connectivity available in a telecommunication cell. In some embodiments the indication of the type of connectivity available is one or more of: local internet protocol access (LIPA) connectivity; selected internet protocol traffic offload (SIPTO) connectivity; and remote connectivity.

Examples of procedures for initial attach for GERAN/UTRAN and EUTRAN systems and non-3GPP systems utilizing the above described embodiments are provided in further detail below.

Example Embodiments for GERAN/UTRAN

Figure 7A:
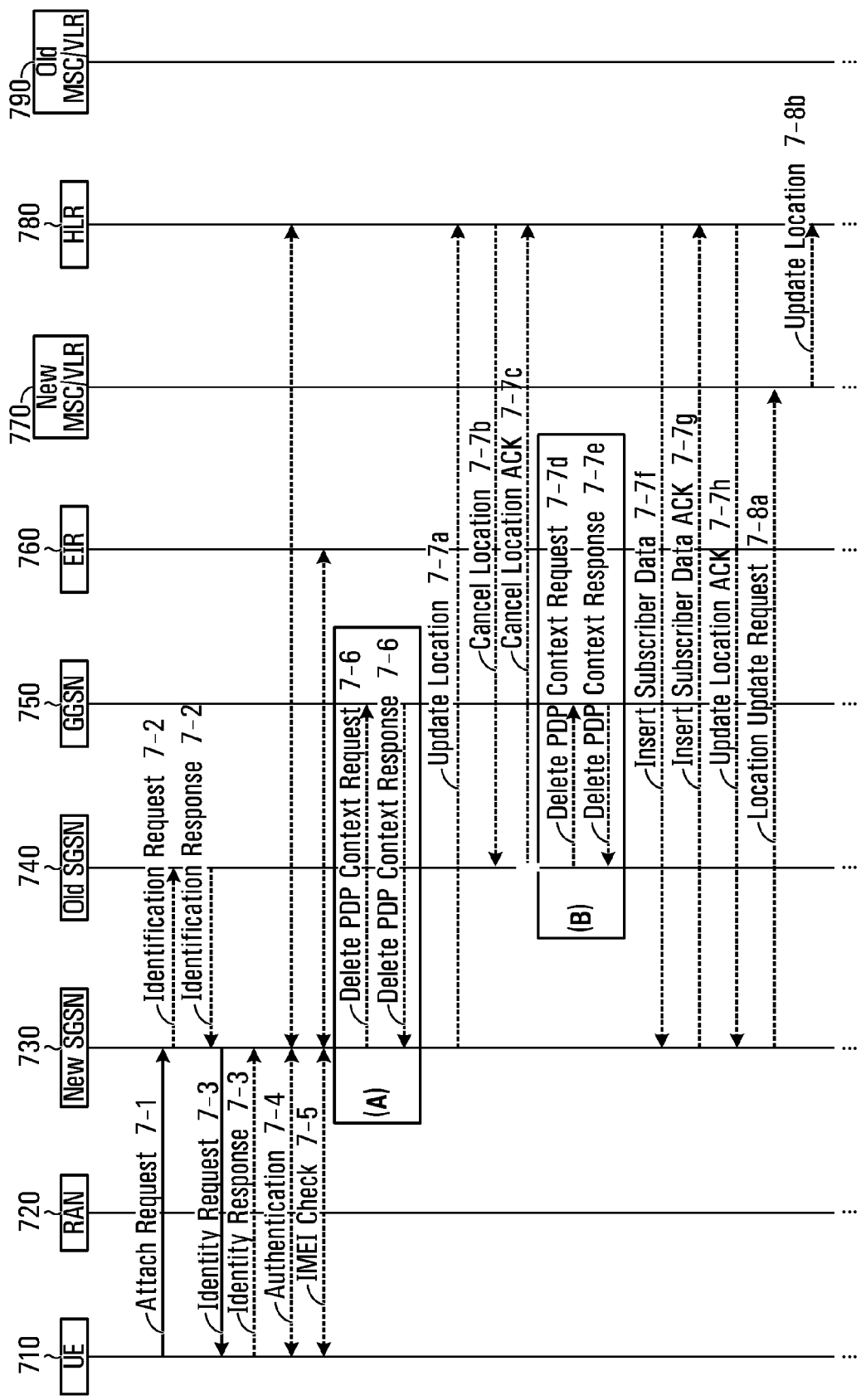
FIGS. 7A and 7B is a signal flow diagram for a combined GPRS/IMSI attach procedure according to an embodiment of the application.
Figure 7B:
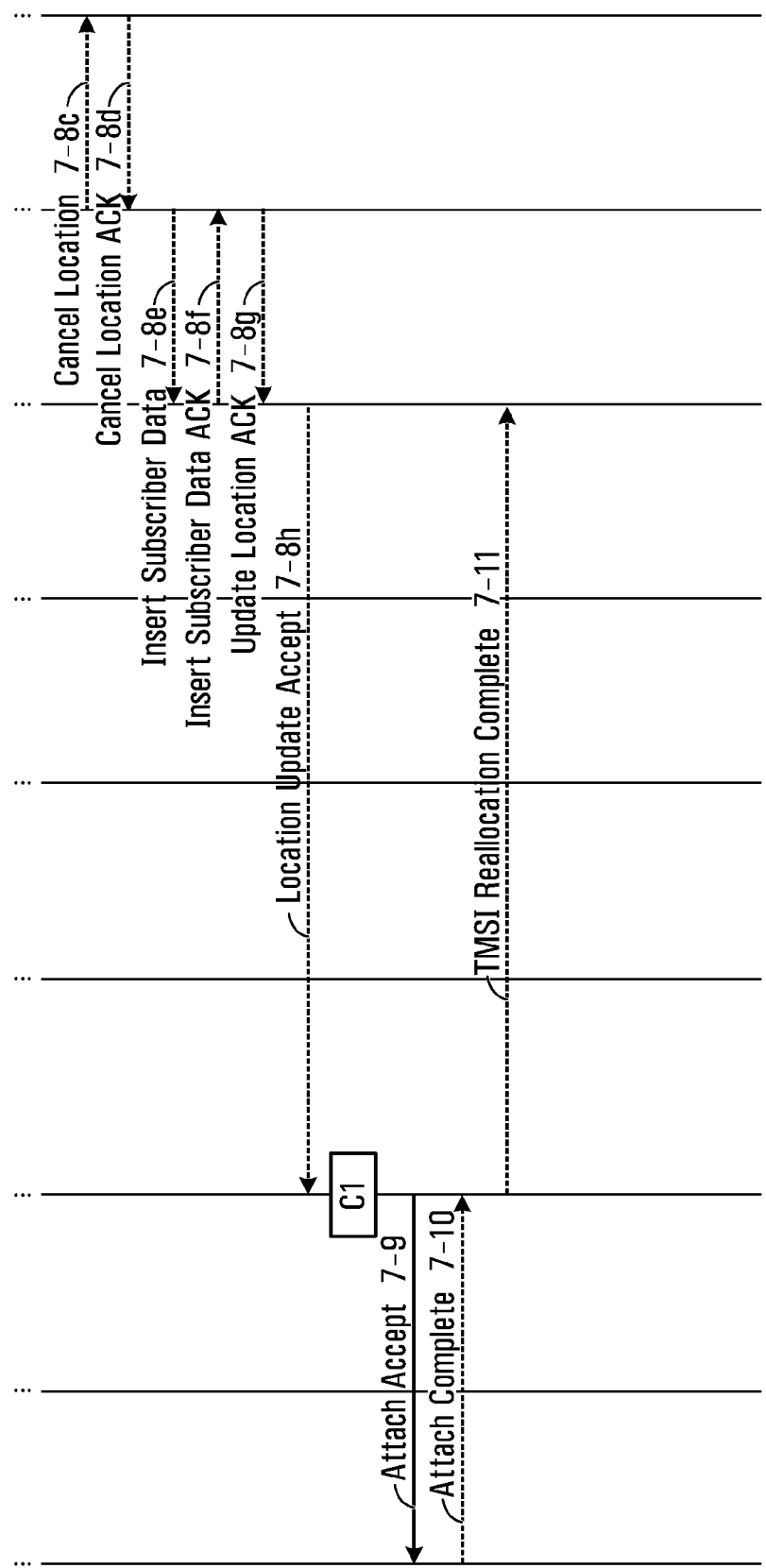

The following is an example of a combined GPRS/IMSI Attach procedure utilizing embodiments described above with reference to FIGS. 7A and 7B. Steps that are particularly relevant to the solutions described above are described in detail. Steps of the network attach procedure that are not particularly affected by the solutions described herein and may have known procedures will not be described in detail.

In signal flow 7-1, in A/Gb mode, the MS initiates the attach procedure by the transmission of an Attach Request (IMSI or P-TMSI and old RAI, MS Radio Access Capability, MS Network Capability, CKSN, Attach Type, DRX Parameters, old P-TMSI Signature, additional P-TMSI) message to the SGSN.

In signal flow 7-7, if the SGSN number has changed since the GPRS detach, or if it is the very first attach, or if the Automatic Device Detection (ADD) function is supported and the IMEISV has changed, or if the MS provides an IMSI or the MS provides an old P-TMSI/RAI which doesn't point to a valid context in the SGSN, then the SGSN informs the HLR.

In signal flow 7-7f, the HLR sends Insert Subscriber Data (IMSI, Subscription Data, CSG subscription data for the PLMN) to the new SGSN. If the S6d interface is used between an S4-SGSN and HSS the message "Insert Subscriber Data" is not used. Instead, the Subscription Data is sent by HSS in the message Update Location Ack. (signal flow 7-7h).

The subscription data contains the type of CSG connectivity supported for the UE.

In signal flow 7-9, if the GPRS attach request is accepted by the network, an ATTACH ACCEPT message is sent to the UE. The SGSN sends an Attach Accept message to the MS.

The network includes a Supported Connectivity Type if the UE is attaching to a CSG cell, in order to indicate the type of connectivity (e.g. LIPA, SIPTO, etc.) supported by the current CSG cell. The SGSN includes the CSG Applicability Indication if the indications in the Selected Connectivity Type or the Supported Connectivity Type, or both, apply only to the current CSG cell or to the current CSG ID.

The network informs the UE of the type of connectivity supported if the UE is attaching to a CSG cell, in order to indicate the type of connectivity (e.g. LIPA, SIPTO, etc.) supported by the current CSG cell. The network includes an indication of whether the type of connectivity supported applies only to the current CSG cell or to the current CSG ID.

In a UE the types of connectivity supported may be provided to the upper layers.

When the UE is in a CSG cell and receives an ATTACH ACCEPT message, and the network informs the UE about the support of specific features, such the types of connectivity supported, the types of connectivity supported may be provided to the upper layers.

An example of an ATTACH ACCEPT message will now be described with reference to Table 1. The message is sent by the network to the MS to indicate that the corresponding attach request has been accepted. The message may be used in a direction from the network to the UE.

TABLE 1

| ATTACH ACCEPT message content | | |
| --- | --- | --- |
| IEI | Information Element | Type/Reference |
|  | Supported Connectivity Type CSG ID | Connectivity Type |

Supported Connectivity Type
The network may include this IE if the UE is attaching to a CSG cell, in order to indicate the type of connectivity supported by the current CSG cell.
CSG ID
The network may include this IE if the UE is attaching to a CSG cell and if the network includes the Supported Connectivity Type. If the network includes an indication that the CSG ID is included this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the "Type/Reference" field is that described in Table 8 below.

It may be possible to configure the selection function on the SGSN to give priority towards SGW/PGW for E-UTRAN capable UEs, and GGSN for non E-UTRAN capable UE.
Example Embodiments for E-UTRAN
PDN GW Selection Function In some embodiments, a PDN GW selection function allocates a PDN GW that provides the PDN connectivity for 3GPP access. In some embodiments, the PDN GW selection function uses subscriber information provided by the home subscriber server (HSS) and possibly additional criteria.

The PDN subscription contexts provided by the HSS may contain one or more of: a) the identity of a PDN GW and an APN (PDN subscription contexts with subscribed PDN GW address are not used when there is interoperation with pre Rel-8 2G/3G SGSNs); b) an APN and an indication for this APN whether the allocation of a PDN GW from the visited PLMN is allowed or whether a PDN GW from the home PLMN may be allocated. Optionally an identity of a PDN GW may be contained for handover with non-3GPP accesses; c) an APN and an indication for this APN of the CSG Connectivity Type allowed for the UE; and d) the identity of a PDN GW and an APN and an indication for this APN of the Connectivity Type allowed for the UE. The indication may contain zero, one or more CSG IDs indicating for which each specific type of connectivity applies.

In some embodiments, the HSS also indicates which of one or more PDN subscription contexts is a default context for the UE.

If the UE provides the Requested Connectivity Type indication, a mobility management entity (MME) may use such indication and the CSG ID of the current CSG cell and the list of CSG IDs obtained from the HSS subscription context to select the PDN GW.
E-UTRAN Initial Attach A UE registers with a network to receive services that require registration. This registration may also be referred to as network attachment. For UEs that have an always-on IP connectivity, this IP connectivity is enabled by establishing a default Evolved packet system (EPS) bearer during network attachment. Rules applied to the default EPS bearer may be predefined in the PDN GW and activated in the attachment by the PDN GW itself. The network attachment procedure may trigger one or multiple Dedicated Bearer Establishment procedures to establish dedicated EPS bearer(s) for that UE. During the network attachment procedure, the UE may request an IP address allocation. Terminals utilising only Internet Engineering Task Force (IETF) based mechanisms for IP address allocation are also supported.

Figure 8A:
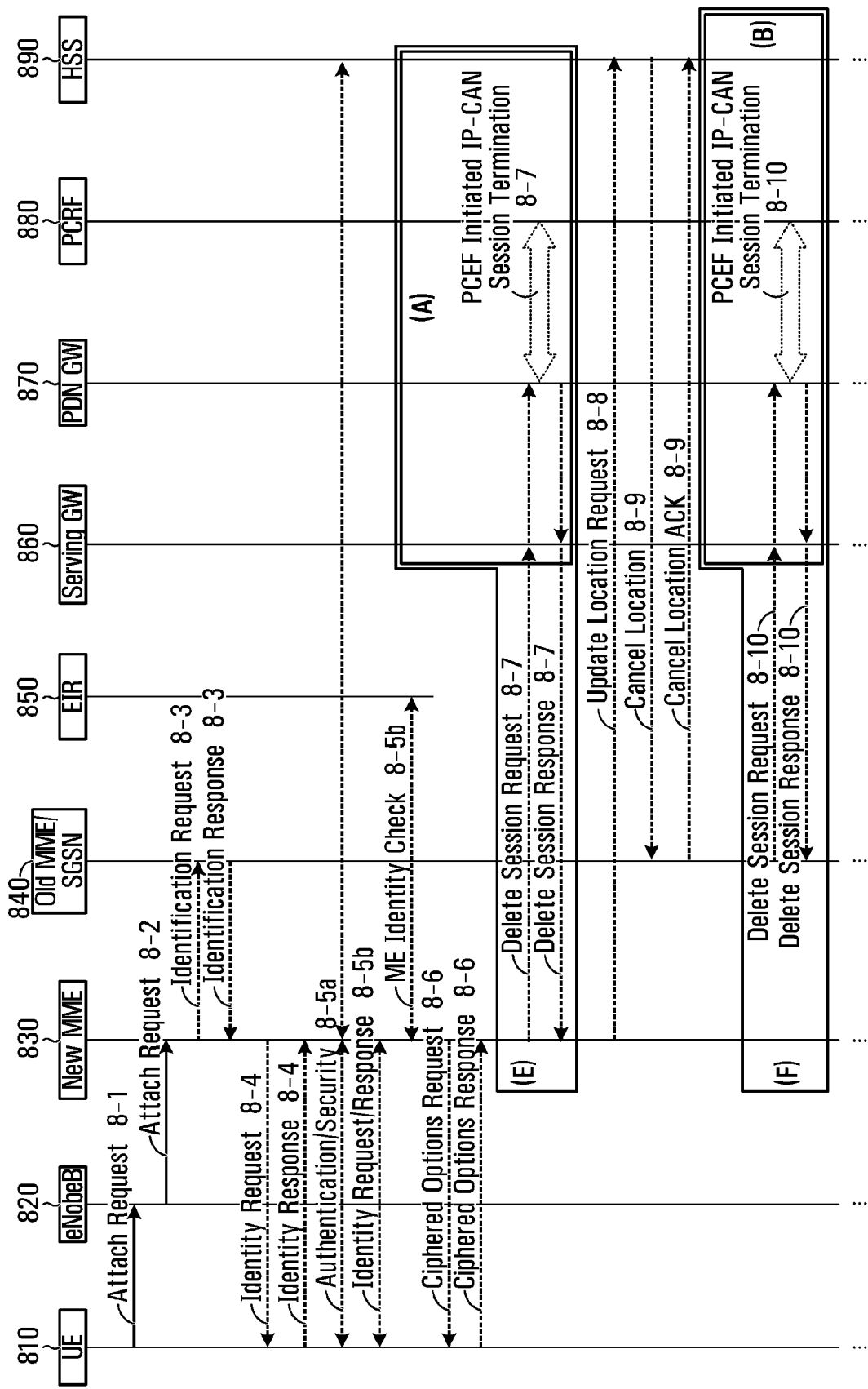
FIGS. 8A and 8B is a signal flow diagram for an E-UTRAN initial attach procedure according to an embodiment of the application.
Figure 8B:
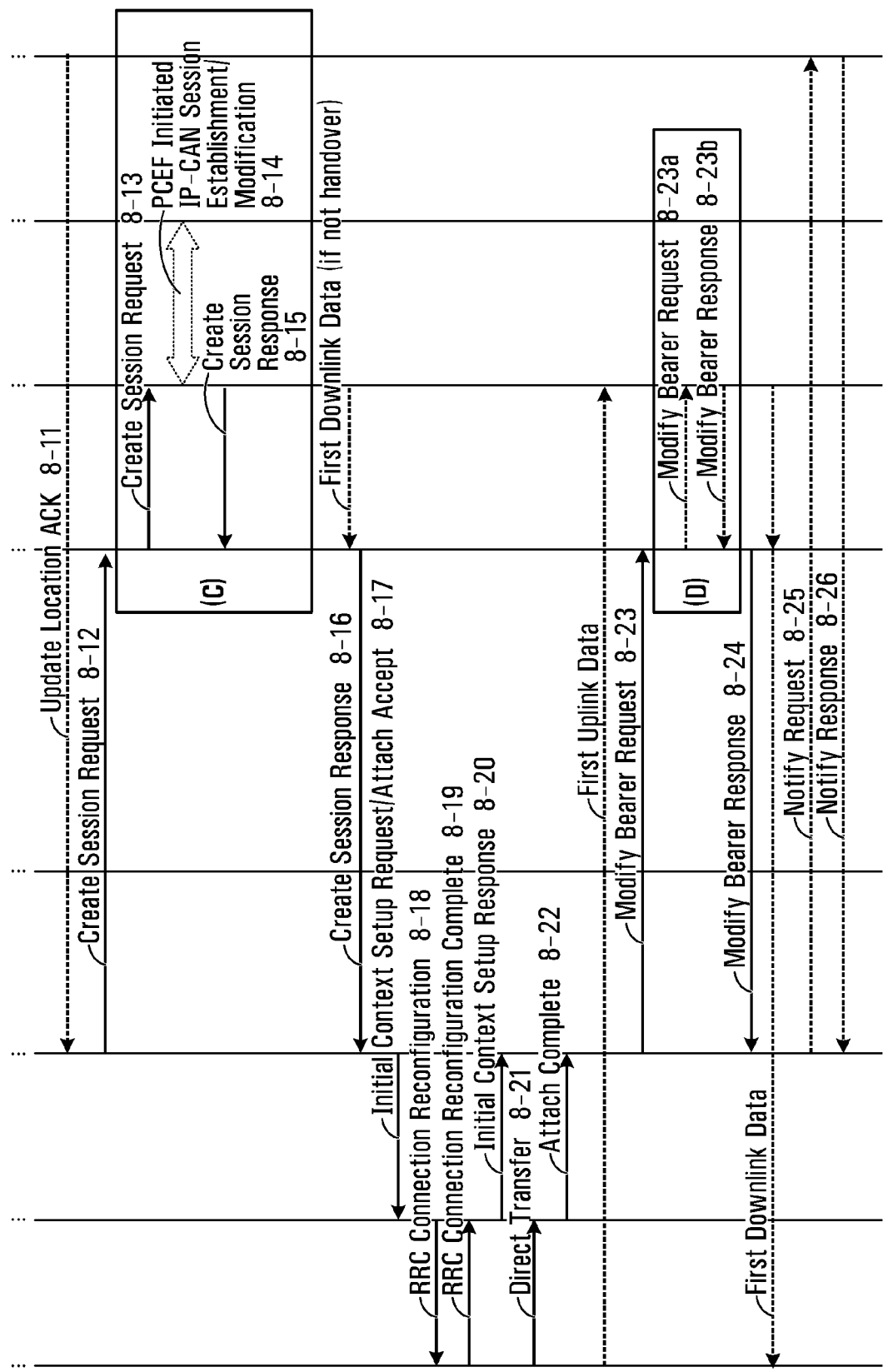

A network attach procedure will now be described with reference to FIGS. 8A and 8B. Steps that are particularly relevant to the solutions described above are described in detail. Steps of the network attach procedure that are not particularly affected by the solutions described herein and may have known procedures will not be described in detail.

In signal flow 8-1, the UE initiates the Attach procedure by the transmission, to the eNodeB, of a message (e.g an ATTACH REQUEST message. The message includes the Requested Connectivity Type and in some embodiments other information such as, but not limited to: IMSI or old GUTI; last visited TAI (if available); UE Core Network Capability; UE Specific DRX parameters; PDN Type; Protocol Configuration Options; Ciphered Options Transfer Flag; Attach Type; Request Type; $KSI_{ASME}$; NAS sequence number; NAS-MAC; additional GUTI; P-TMSI signature. The UE includes the Requested Connectivity Type indication when using a CSG cell in order to indicate the type of connectivity requested for the PDP context (e.g. LIPA, SIPTO, etc.).

An example of an ATTACH REQUEST message will now be described with reference to Table 2. This message is sent by the UE to the network in order to perform an attach procedure. This message may be used in a direction from the UE to the network.

TABLE 2

ATTACH REQUEST message content

| IEI | Information Element | Type/Reference |
|---|---|---|
| | Requested Connectivity Type | Connectivity Type |

Requested Connectivity Type

This IE may be included in the message if the UE requests a specific type of CSG connectivity (e.g. LIPA) for the PDP Context.

An example of the contents of the Connectivity Type in the "Type/Reference" field is that described in Table 8 below.

Referring once again to FIGS. 8A and 8B, in signal flow 8-11, the HSS acknowledges the Update Location message by sending an UPDATE LOCATION ACK message to the new MME. The UPDATE LOCATION ACK message may include information such as, but not limited to IMSI and Subscription data. In some embodiments the Subscription data contains CSG subscription information. In some embodiments, the Subscription data contains the type of CSG connectivity supported for the UE.

In signal flow 8-12, for Request Type indicating "Initial request", if the UE does not provide an APN, the MME may use the PDN GW corresponding to the default APN for default bearer activation. If the UE provides an APN, this APN may be employed for default bearer activation.

If the Request Type indicates "Initial request" and the selected PDN subscription context contains no PDN GW identity the new MME selects a PDN GW as described above in the PDN GW selection function (3GPP accesses) section. If the PDN subscription context contains a dynamically allocated PDN GW identity and the Request Type does not indicate "Handover" the MME may select a new PDN GW as described above.

The MME validates the UE request considering also the Requested Connectivity Type and the CSG ID of the CSG cell the UE is connected to. The MME determines whether the type of connectivity requested by the UE is authorized for the requested APN and the CSG ID based on network settings and the Subscription data.

Figure 25:
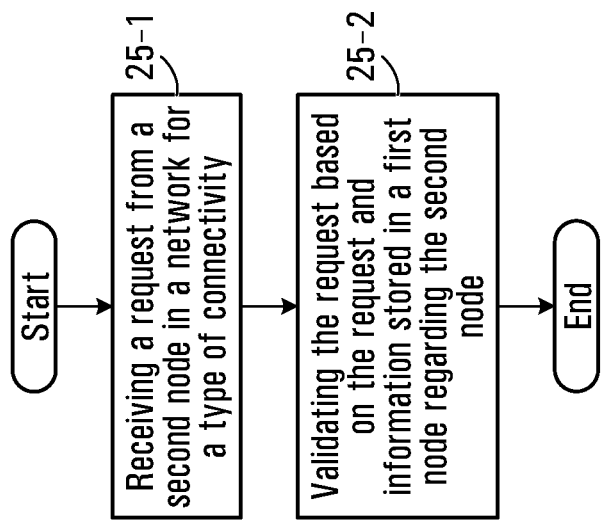
FIG. 25 is a flow chart illustrating a further example of a method according to an embodiment described herein.

A method for requesting an validating the request will now be described with reference to FIG. 25. A first step 25-1 involves receiving a request from a second node in the network for a type of connectivity. A second step 25-2 involves validating the request based on the request and information stored in the first node regarding the second node.

If the MME decides that the type of connectivity requested by the UE is not acceptable, the MME can reject the attach request including an appropriate error cause. The MME includes the Supported Connectivity Type to indicate the type of CSG connectivity supported. The MME includes an indication of whether the requested connectivity type is not acceptable for the current APN or for which APNs it is not acceptable. The MME includes an indication whether the requested connectivity type is not acceptable in all the cells in the same CSG.

If the MME decides that the type of connectivity requested by the UE is not acceptable, the MME can select an acceptable type of connectivity for the UE for the current APN and the current CSG ID.

The MME may use the Connectivity Type indication (set to either the Requested Connectivity Type indication or the selected type of connectivity) to derive the PDN GW address when a CSG Cell is used. The MME may select the PDN GW as described above.

The MME includes the Connectivity Type (set to either the Requested Connectivity Type indication or the selected type of connectivity) when using a CSG cell in order to indicate the type of connectivity requested for the PDN Connection.

The new MME selects a Serving GW (S-GW). Then it sends a message e.g a CREATE SESSION REQUEST MESSAGE, to the selected S-GW. The message includes the Connectivity Type and in some embodiments may include information such as, but not limited to: IMSI; MSISDN; MME TEID for control plane; PDN GW address; PDN Address; APN; RAT type; Default EPS Bearer QoS; PDN Type; APN-AMBR; EPS Bearer Identity; Protocol Configuration Options; Handover Indication; ME Identity; User Location Information (ECGI); MS Info Change Reporting support indication; Selection Mode; Charging Characteristics; Trace Reference; Trace Type; Trigger Id; OMC Identity; Maximum APN Restriction; Dual Address Bearer Flag; and the Protocol Type over S5/S8.

The MME includes the Connectivity Type when using a CSG cell in order to indicate the type of connectivity requested for the PDN connection (e.g. LIPA, SIPTO, etc.).

Referring once again to FIGS. 8A and 8B, in signal flow 8-13, the Serving GW creates a new entry in its EPS Bearer table and sends a message, e.g a CREATE SESSION REQUEST message, to the PDN GW indicated by the PDN GW address received in the previous step. The message includes the Connectivity Type and in some embodiments may include information such as, but not limited to: IMSI; MSISDN; APN; Serving GW Address for the user plane; Serving GW TEID of the user plane; Serving GW TEID of the control plane; RAT type; Default EPS Bearer QoS; PDN Type; PDN Address; subscribed APN-AMBR; EPS Bearer Identity; Protocol Configuration Options; Handover Indication; ME Identity; User Location Information (ECGI); MS Info Change Reporting support indication; Selection Mode; Charging Characteristics; Trace Reference; Trace Type; Trigger Id; OMC Identity; Maximum APN Restriction; and Dual Address Bearer Flag.

In signal flow 8-15, the P-GW creates a new entry in its EPS bearer context table and generates a Charging Id.

The PDN GW returns a message e.g a CREATE SESSION RESPONSE message, to the Serving GW. The message includes the Selected Connectivity Type and in some embodiments may include information such as, but not limited to: PDN GW Address for the user plane; PDN GW TEID of the user plane; PDN GW TEID of the control plane; PDN Type; PDN Address; EPS Bearer Identity; EPS Bearer QoS; Protocol Configuration Options; Charging Id; Prohibit Payload Compression; APN Restriction; Cause; MS Info Change Reporting Action (Start) (if the PDN GW decides to receive UE's location information during the session); and APN-AMBR.

The PDN GW returns an indication of the Selected Connectivity Type in order to indicate the type of connectivity (e.g. LIPA, SIPTO, etc.) selected for the current PDN connection.

In signal flow 8-16, the Serving GW returns a message e.g. a CREATE SESSION RESPONSE message, to the new MME. The message includes the Selected Connectivity Type and in some embodiments may include information such as, but not limited to: PDN Type; PDN Address; Serving GW address for User Plane; Serving GW TEID for User Plane; Serving GW TEID for control plane; EPS Bearer Identity; EPS Bearer QoS; PDN GW addresses and TEIDs (GTP-based S5/S8) or GRE keys (PMIP-based S5/S8) at the PDN GW(s) for uplink traffic; Protocol Configuration Options; Charging Id; Prohibit Payload Compression; APN Restriction; Cause; MS Info Change Reporting Action (Start); and APN-AMBR.

In signal flow 8-17, the new MME sends a message, e.g an ATTACH ACCEPT message, to the eNodeB. The message includes one or more of the Supported Connectivity Type; Selected Connectivity Type; APN Applicability; and CSG Applicability and in some embodiments may include information such as, but not limited to: APN; GUTI; PDN Type; PDN Address; TAI List; EPS Bearer Identity; Session Management Request; Protocol Configuration Options; KSI$_{ASME}$; NAS sequence number; NAS-MAC; IMS Voice over PS session supported Indication; and Emergency Service Support indicator.

The MME includes a Supported Connectivity Type if the UE is attaching to a CSG cell, in order to indicate to the UE the type of connectivity (e.g. LIPA, SIPTO, etc.) supported.

The MME returns an indication of the Selected Connectivity Type in order to indicate the type of connectivity (e.g. LIPA, SIPTO, etc.) selected for the current PDN connection.

The MME includes an indication of whether the requested connectivity type is not acceptable for the current APN or for which APNs it is not acceptable if the Selected Connectivity Type is different from the Requested Connectivity Type.

The MME includes the CSG Applicability Indication if the indications in the Selected Connectivity Type and/or the Supported Connectivity Type apply only to the current CSG cell or to the current CSG ID.

Attach Accepted by the Network

If the attach request is accepted by the network, the MME may send the ATTACH ACCEPT message to the UE and start timer T3450. The MME may send the ATTACH ACCEPT message together with an ACTIVATE DEFAULT EPS BEARER CONTEXT REQUEST message contained in the Evolved Packet System (EPS) Session Management (ESM) message container information element to activate the default bearer.

The network informs the UE about the support of specific features, such as IMS voice over PS session or emergency bearer services, in the EPS network feature support information element. In a UE with IMS voice over PS capability, the IMS voice over PS session indicator and the emergency bearer services indicator may be provided to the upper layers. The upper layers may take the IMS voice over PS session indicator into account, when selecting the access domain for voice sessions or calls. When initiating an emergency call, the upper layers also take the emergency bearer services indicator into account for the access domain selection.

The network informs the UE of the type of connectivity supported if the UE is attaching to a CSG cell, in order to indicate the type of connectivity (e.g. LIPA, SIPTO, etc.) supported by the current CSG cell. The network includes an indication of whether the type of connectivity supported applies only to the current CSG cell or to the current CSG ID.

When the UE is in a CSG cell and receives an ATTACH ACCEPT message, and the network informs the UE about the support of specific features, such the types of connectivity supported, the types of connectivity supported may be provided to the upper layers.

An example of an ATTACH ACCEPT message will now be described with reference to Table 3. This message is sent by the network to the UE to indicate that the corresponding attach request has been accepted. This message may be used in a direction from the network to the UE.

TABLE 3

ATTACH ACCEPT message content

| IEI | Information Element | Type/Reference |
|---|---|---|
| | Supported Connectivity Type | Connectivity Type |
| | Selected Connectivity Type | Connectivity Type |
| | APN Applicability Indication | |
| | CSG Applicability Indication | |

Supported Connectivity Type

The network may include this IE if the UE is attaching to a CSG cell, in order to indicate the type of connectivity supported by the current CSG cell.

Selected Connectivity Type

This IE may be included in order to inform the UE of the Connectivity Type selected by the network.

APN Applicability Indication

This IE may be included if the network indicates for what APNs the type of connectivity requested by the UE is not acceptable. If the network includes an indication that one or more APNs are included, this indicates that the type of connectivity requested by the UE is not acceptable for all the APNs provided. If the network includes an indication that the APN ID is not included, this indicates that the Supported Connectivity Type applies only to the current APN.

CSG Applicability Indication

The network may include this IE if the UE is attaching to a CSG cell and if the network includes the Supported Connectivity Type IE or the Selected Connectivity Type IE. If the network includes an indication that the CSG ID is included, this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the "Type/Reference" field is that described in Table 8 below.

In some embodiments, an MO (Management Object) provided by the network to the UE (e.g. upon UE configuration or update) is used to indicate LIPA availability and also providing the necessary means/information to use it.

In some implementations, the MO may be provided to the UE by an ANDSF (Access Network Discovery and Selection Function) that the UE can query to retrieve information about the network, or can push information to the UE.

In some embodiments, the UE is provided the MO by an ANDSF located in the operator network, either in the home operator or the visited operator network.

In some embodiments, a LIPA Manager network functionality that is collocated with the HeNB or near the HeNB, provisions the UE (e.g. using OMA DM MOs leafs) with the availability of LIPA functionality in the HeNB connectivity area. In some embodiments the LIPA Manager is a functionality that is similar to the ANDSF.

In some implementations, the MO may be hosted by the HeNB. In some embodiments, the UE may have to discover the MO Server. In some implementations, the MO server may be an ANDSF server located in the "home" network where the HNB is located. In some implementations, the MO server may reside in the HNB. In some implementations, the UE discovers the MO server upon a first connection to the HNB in LIPA mode. In some implementations, the UE is preconfigured by the HNB owner/operator or the user with the address of the server, or both. For scenarios in which the MO Server in the HNB network can be reached from outside the home network, the UE may also be pre-configured with an FQDN (i.e. web address) that the UE, once it has gained connectivity with the cellular network, can use to query the domain name system (DNS) and get the IP address of the MO Server.

An example of using an MO is described below.

HHPPF: HeNB Hosting Party provisioning Function

The HHPPF is a network element that provides information to a UE attached to the HeNB. In some embodiments the HHPPF is collocated with a HeNB. In a configuration where multiple HeNB are deployed, one HHPPF may serve UEs connected to different HeNBs. There may be multiple HHPPFs in one CSG cell.

A HHPPF can provide indicators to a UE seeking LIPA connectivity. These indicators can be provided using one or more OMA DM MOs.

The UE has to be able to address the HHPPF.

The address(es) of the HHPPF can be provisioned in the UE. In some embodiments the address(es) may be IP address (es). In some implementations, a home operator can provision address(es) in the UE. Examples of the address(es) may be one or more: IPv4; IPv6 and Fully Qualified Domain Name (FQDN).

The domain name or the address(es) of the HHPPF may also be discovered (e.g. by the UE) by means of a dynamic host configuration protocol (DHCP) query. For example, if new DHCPv4 and DHCPv6 options called the HHPPF IP Address Option and HHPPF Domain List Option are provided. These options allow the UE to locate the HHPPF or an HHPPF Server that hosts the desired service. In some embodiments, new DHCPv4 options may need to be specified such as, but not limited to: HHPPF IPv4 Address Option for DHCPv4 (OPTION-IPv4_Address-HHPPF) and HHPPF Domain Name List option for DHCPv4 (OPTION-IPv4_FQDN-HHPPF).

In some embodiments, new DHCPv6 options may need to be specified such as, but not limited to: ANDSF IPv6 Address Option for DHCPv6 (OPTION-IPv6_Address-HHPPF) and ANDSF Domain Name List option for DHCPv6 (OPTION-IPv6_FQDN-HHPPF).

The HHPPF address by which the UE can contact the HHPPF may also be obtained by the UE through a DNS lookup by name. In some embodiments, a QNAME can be set to the HHPPF-SN FQDN.

In some embodiments, when performing DNS resolution, the UE may apply the following procedures. For the HHPPF discovery, the UE builds a FQDN based on an identifier for the DNS request and selects the IP address of the HHPPF included in the DNS response message. In some implementations, the identifier included in the DNS request is associated with the CSG or HeNB Hosting Party. In some embodiments, the identifier included in the DNS request is the CSG identifier. In some embodiments, a cell identifier may be included. In some embodiments, a provided value or value otherwise obtained may be included. Examples of such values are a HPLMN or a VPLMN identifier. Generating the identifier included in the DNS request using one or more of the embodiments described above may allow the HHPPF to be identified according to various levels or granularity.

In some embodiments, when performing DHCP resolution, the UE shall apply the following procedures. For the HHPPF discovery, the UE sends a DHCP message with an identifier included in the DHCP option that allows discovery of the IP address or domain name of the HHPPF. In some implementations, the identifier included in the DNS request is associated with the CSG or HeNB Hosting Party. In some embodiments, the identifier included in the DNS request is the CSG identifier. In some embodiments, a cell identifier may be included. In some embodiments, a provided value or value otherwise obtained may be included. Examples of such values are a HPLMN or a VPLMN identifier. Generating the identifier included in the DNS request using one or more of the embodiments described above may allow the HHPPF to be identified according to various levels or granularity. When the DHCP Server only provides the domain name of the HHPPF, the recipient may perform another DNS query to obtain the address of the HHPPF.

The UE can discover one or more HHPPFs using a combination of different methods.

An MO may include the following information. Information in MOs are contained in so called leafs; a leaf of the MO is consulted to determine the value of a setting or variable. The MO may be provided by the HHPPF:

One or more leafs provide to the UE one or more types of connectivity indicating whether the type of connectivity can be indicated when attempting to request creation of PDN connection.

Format: chr; Access Types: Get, Replace; Values: APN.

One or more leafs provide to the UE one or more Access Point Names (APNs) indicating whether the APN can be used for the type of connectivity. In the absence of this leaf, the UE can indicate the type of connectivity when attempting to request creation of PDN connection without indicating an APN.

Format: chr; Access Types: Get, Replace; Values: one or more values coded according to an Access Point Name structure.

One or more leafs provide to the UE one or more CSG IDs indicating whether the type of connectivity is available for the CSG ID. For example, when the UE is attached or connected to the CSG ID, the UE may attempt to request creation of a PDN connection indicating the type of connectivity.

Access Types: Get, Replace; Values: one or more values coded according to a CSG ID structure.

A leaf provides to the UE the indication whether the UE shall/should/may use the APN for the indicated type of connectivity.

Occurrence: One; Format: chr; Access Types: Get, Replace; Values: <shall,first,subsequent>.

The various "Values" fields are defined as: shall, which defines that the UE shall only use the APN for the indicated type of connectivity; first, which defines that the first or subsequent first PDN connection established by the UE fuses the APN for the indicated type of connectivity; and subsequent, which defines that if a PDN Connection using the APN exists, any subsequent PDN Connection established by the UE uses the APN for the indicated type of connectivity.

Example Embodiments for a Non-3GPP Access

In some embodiments, what is described above for 3GPP access also applies to non-3GPP accesses.

PDN GW Selection Function for Network-Based Mobility

In some embodiments, a PDN GW selection function allocates a PDN GW that provides the PDN connectivity for 3GPP access. In some embodiments, the PDN GW selection function uses subscriber information provided by the home subscriber server (HSS) and possibly additional criteria PDN Gateway selection for non-3GPP accesses uses similar mechanisms as defined for GERAN/UTRAN and E-UTRAN. During the initial authorization, PDN Gateway selection information for each of the subscribed PDNs (i.e. the PDN subscription contexts) is returned to the non-3GPP access system.

The PDN subscription contexts provided by the HSS may contain, but is not limited to only, one or more of: a) the identity of a PDN GW and an APN; b) an APN and an indication for the APN whether the allocation of a PDN GW from the VPLMN is allowed or whether a PDN GW from the HPLMN may be allocated; c) an APN and an indication for the APN of the Connectivity Type allowed for the UE; or d) the identity of a PDN GW and an APN and an indication for the APN of the Connectivity Type allowed for the UE. The PDN subscription contexts may also contain a list of Service Set Identifiers (SSIDs) of WLAN radio cells, or a list of identifiers of 3GPP2 cell or femto cell.

If the UE provides the Requested Connectivity Type indication, an access gateway may use such indication and the information of the current radio access and possibly a list of CSG IDs or SSIDs or identifiers of 3GPP2 cells or femto cells obtained from the HSS subscription context to select the PDN GW. Examples of an access gateway may include, but are not limited to: an evolved Packet Data Gateway (ePDG) for connection over WLAN and a trusted non-3GPP IP access for connection over 3GPP2 radio access. Examples of information of the current radio access may include, but are not limited to: the SSID of a WLAN radio cell, or another identifier related to the WLAN radio cell, or CSG ID of the current CSG cell for a 3GPP2 radio access or another identifier of a 3GPP2 cell or femto cell.

Problem 2: Selection of Local IP Connectivity Depending on the Service

When the UE connects to the network through a femto cell, there are situations in which it is preferable for the UE to access services located in the home network (e.g. access to local services such as media gateways, printers, etc.).

However, in the case of LIPA, some access point names (APNs) identifying specific Packet Data Network (PDNs), i.e. specific services such as internet browsing or connectivity to media gateways, may be accessible only when the UE connects to a remote GGSN or PGW in the core network, whereas connectivity to other APNs may be available only when the UE is connected with LIPA (e.g. for access to local services and resources). Therefore, a mechanism is proposed to tie the accessibility to certain PDNs/APNs through the CSG cell via LIPA connectivity and enable the UE to request the desired type of connectivity.

Even assuming that the UE has a way to request the specific type of connectivity it desires, when the UE attaches to the network, it may not provide an APN in the request to attach to the network. Based on conventional operation, the network assumes the UE is requesting connectivity to the default APN that may be defined in a user subscription profile, which the UE may not know. Assuming that remote connectivity is provided at attach to the UE for the default PDN, the UE may later on want to add LIPA connectivity to the default APN, but since the UE may not know the default APN, conventional operation does not allow such a request to be sent.

Solution to Problem 2:
GERAN/UTRAN and E-UTRAN

The proposed solution is to allow the UE to indicate at attach (e.g. in either GERAN/UTRAN or E-UTRAN attach procedures) or when requesting additional PDN connectivity (e.g. in GERAN/UTRAN PDP Context Activation procedure or in E-UTRAN in the PDN Connectivity request) that the UE desires to obtain LIPA connectivity for the specific PDN, independently of whether the UE provides an APN or not.

In some embodiments, this is achieved by the UE providing an additional indication, referred to herein as a "Requested Connectivity Type" indication. The UE can provide such a parameter set to indicate either LIPA connectivity or SIPTO connectivity only when one of these two types of connectivity are needed, or sent in any case and set to indicate the type of connectivity that is request such as any one or more of: LIPA connectivity; SIPTO connectivity or remote connectivity.

The UE sends the "Requested Connectivity Type" indication independently of whether the UE provides an APN or not in the Activate PDP Context Request message in GERAN/UTRAN, the ATTACH REQUEST message in E-UTRAN or in the request for additional PDN connectivity in E-UTRAN.

In some embodiments, if the UE does not provide an APN, the network assumes the UE is requesting connectivity to the default APN, which the UE may not know. If the UE establishes remote connectivity to the default APN upon attachment by not providing any APN, the UE may later add LIPA connectivity to the default APN. To do so the UE requests additional PDN connectivity with the "Requested Connectivity Type" set to LIPA and not providing an APN. Upon receiving such request, the network interprets the request as a request for LIPA connectivity to the default PDN.

In some embodiments, if the UE request for connectivity for a specific APN is not acceptable by the network, the network upon receiving the request from the UE for connectivity responds to the UE by rejecting the request with an appropriate cause and indicating that the requested connectivity for that APN is not available. The network can for example use an existing rejection cause augmented with a "Supported Connectivity Type" indication, or a new cause augmented with a "Supported Connectivity Type" indication.

In some embodiments the network upon receiving the request from the UE for connectivity for a specific APN responds to the UE by accepting the request and providing an available type of connectivity and indicating that requested type of connectivity is not available. For example, if LIPA connectivity is requested and LIPA connectivity is not available, but remote connectivity is available, the network provides remote connectivity. In some embodiments, the network may indicate that the requested type of connectivity is not available by providing an indication of the Selected Connectivity Type to indicate which type of connectivity was selected. The UE in reaction may either maintain the current connectivity, even if different from the type requested, or disconnect from the PDN.

In some embodiments, the network may also provide the Supported Connectivity Type in order to indicate to the UE which types of connectivity are supported. For example, the UE may have indicated "LIPA" as the Requested Connectivity Type, but the network does not support LIPA and has instead selected "Remote connectivity" and indicated this selection to the UE in the Selected Connectivity Type indicator. If the network also supports SIPTO, the network may indicate that both "SIPTO" and "Remote connectivity" are supported in the Supported Connectivity Type indicator.

In some embodiments, the network explicitly indicates the specific APN by providing the APN in the response, or implicitly indicating that it is the APN that the UE requested by not returning any APN.

In some embodiments, if the UE request for connectivity for any APN is not acceptable by the network (i.e. the network does not allow any LIPA connectivity for such UE or does not allow any remote connectivity for such UE or the specific APN cannot be reached when using a specific type of connectivity), the network upon receiving the request from the UE for connectivity for any APN responds to the UE by rejecting the request indicating that the requested connectivity is not available and indicating that the rejection applies to all available APNs. The network may indicate this either implicitly by not providing any APNs in the reply or by explicitly providing an "All APN Indication" in the response. In some embodiments, if the network rejects LIPA or Remote connectivity for a specific APN it does so by returning the APN to the UE that is being rejected to clearly distinguish which type of connectivity is being rejected for the APN, for example "no LIPA" or "No remote connectivity".

In some embodiments, the network may use an existing rejection cause augmented with a "Supported Connectivity Type" indication and an "All APN Indication" to indicate the response applies to all available APNs. In some embodiments, the network may use a new cause augmented with a "Supported Connectivity Type" indication and an "All APN Indication". In some embodiments, the network may use a new cause indicating the response is for any type of APN with a "Supported Connectivity Type" indication.

In some embodiments, upon receiving the request for connectivity from the UE for any APN, the network responds to the UE by accepting the request, providing an available type of connectivity and indicating that requested type of connectivity is not available. For example, if LIPA connectivity is requested and LIPA connectivity is not available, but remote connectivity is available, the network provides remote connectivity. In some embodiments, the network may indicate that the requested type of connectivity is not available by providing an indication of the Selected Connectivity Type to indicate which type of connectivity was selected and the "All APN Indication". The UE in reaction may maintain the current connectivity, even if the connectivity is different from the type requested, or the UE may disconnect from the PDN.

In some embodiments, the network may also provide the Supported Connectivity Type indicator in order to indicate to the UE which types of connectivity are supported. As an example, the UE may have indicated "LIPA" in the Requested Connectivity Type. However, as the network does not support LIPA, it has selected "remote connectivity" and indicated this selection to the UE in the Selected Connectivity Type indicator. If the network also supports SIPTO, the network may indicate that both "SIPTO" and "Remote connectivity" are supported in the Supported Connectivity Type indicator.

In some embodiments, if the UE request for connectivity for a specific APN, or for any available APNs, is not acceptable by the network, in some embodiments, the network may provide an indication of whether the restrictions of connectivity for a specific APN, or any available APNs, apply only to the current CSG cell, or if the restrictions apply to the CSG ID, which may include more than one CSG cell. As an example, the network can do so by providing a specific "CSG Applicability Indication" set to "current CSG" or the CSG ID together with indications such as those described above to indicate to the UE that the restrictions apply to any CSG cells belonging to the CSG. In some implementations, the network may either not provide any additional indication or provide a "CSG Applicability Indication" indicator set to "current cell". In some implementations the network may provide the specific ID of the current CSG Cell when the restrictions apply only to the current CSG cell.

If at any time the network provides an indication to the UE of the type of connectivity supported for a given CSG cell, in some implementations the UE stores the information in relation to the identity of the CSG cell or in relation to the CSG ID.

In some embodiments, when the UE provides a Request Connectivity Type in a request such as a PDP Context Request for GERAN/UTRAN or an Attach Request or PDN Connection Request in E-UTRAN, the SGSN and MME respectively can use such information to validate the UE request. The validation may for example be performed by considering the Request Connectivity Type indication versus the contents of an UE user profile.

Non-3GPP Accesses:

For non-3GPP accesses, the UE sends the "Requested Connectivity Type" indication independently of whether the UE provides an APN or not in IK@v2 signalling when connecting over WLAN, in the networking layer messages for other non-3GPP accesses (for example for 3GPP2 cells), or in DSMIPv6 tunnel establishment messages.

In some embodiments, if the UE does not provide an APN, the network assumes the UE is requesting connectivity to the default APN, which the UE may not know. If the UE establishes remote connectivity to the default APN upon attachment by not providing any APN, the UE may later add LIPA connectivity to the default APN. To do so the UE requests additional PDN connectivity with the "Requested Connectivity Type" set to LIPA and not providing an APN. Upon receiving such request, the network interprets the request as a request for LIPA connectivity to the default PDN.

In some embodiments, if the UE request for connectivity for a specific APN is not acceptable by the network, the network upon receiving the request from the UE for connectivity responds to the UE by rejecting the request with an appropriate cause and indicating that the requested connectivity for that APN is not available. The network can for example use an existing rejection cause augmented with a "Supported Connectivity Type" indication, or a new cause augmented with a "Supported Connectivity Type" indication.

In some embodiments upon receiving the request from the UE for connectivity for a specific APN the network responds to the UE by accepting the request and providing an available type of connectivity and indicating that requested type of connectivity is not available. For example, if LIPA connectivity is requested and LIPA connectivity is not available, but remote connectivity is available, the network provides remote connectivity. In some embodiments, the network may indicate that the requested type of connectivity is not available by providing an indication of the Selected Connectivity Type to indicate which type of connectivity was selected. The UE in reaction may either maintain the current connectivity, even if different from the type requested, or disconnect from the PDN.

In some embodiments, the network may also provide the Supported Connectivity Type in order to indicate to the UE which types of connectivity are supported. For example, the UE may have indicated "LIPA" as the Requested Connectivity Type, but the network does not support LIPA and has instead selected "Remote connectivity" and indicated this selection to the UE in the Selected Connectivity Type indicator. If the network also supports SIPTO, the network may indicate that both "SIPTO" and "Remote connectivity" are supported in the Supported Connectivity Type indicator.

In some embodiments, the network explicitly indicates the specific APN by providing the APN in the response, or implicitly indicating that it is the APN that the UE requested by not returning any APN.

In some embodiments, if the UE request for connectivity for any APN is not acceptable by the network (i.e. the network does not allow any LIPA connectivity for such UE or does not allow any remote connectivity for such UE or the specific APN cannot be reached when using a specific type of connectivity), the network upon receiving the request from the UE for connectivity for any APN responds to the UE by rejecting the request indicating that the requested connectivity is not available and indicating that the rejection applies to all available APNs. The network may indicate this either implicitly by not providing any APNs in the reply or by explicitly providing an "All APN Indication" in the response. In some embodiments, if the network rejects LIPA or Remote connectivity for a specific APN it does so by returning the APN to the UE that is being rejected to clearly distinguish which type of connectivity is being rejected for the APN, for example "no LIPA" or "No remote connectivity".

In some embodiments, the network may use an existing rejection cause augmented with a "Supported Connectivity Type" indication and an "All APN Indication" to indicate the response applies to all available APNs. In some embodiments, the network may use a new cause augmented with a "Supported Connectivity Type" indication and an "All APN Indication". In some embodiments, the network may use a new cause indicating the response is for any type of APN with a "Supported Connectivity Type" indication.

In some embodiments, upon receiving the request for connectivity from the UE for any APN, the network responds to the UE by accepting the request, providing an available type of connectivity and indicating that requested type of connectivity is not available. For example, if LIPA connectivity is requested and LIPA connectivity is not available, but remote connectivity is available, the network provides remote connectivity. In some embodiments, the network may indicate that the requested type of connectivity is not available by providing an indication of the Selected Connectivity Type to indicate which type of connectivity was selected and the "All APN Indication". The UE in reaction may maintain the current connectivity, even if the connectivity is different from the type requested, or the UE may disconnect from the PDN.

In some embodiments, the network may also provide the Supported Connectivity Type indicator in order to indicate to the UE which types of connectivity are supported. As an example, the UE may have indicated "LIPA" in the Requested Connectivity Type. However, as the network does not support LIPA, it has selected "remote connectivity" and indicated this selection to the UE in the Selected Connectivity Type indicator. If the network also supports SIPTO, the network may indicate that both "SIPTO" and "Remote connectivity" are supported in the Supported Connectivity Type indicator.

In some embodiments, if the UE request for connectivity for a specific APN, or for any available APNs, is not acceptable by the network, in some embodiments, the network may provide an indication of whether the restrictions of connectivity for a specific APN, or any available APNs, apply only to the current cell, or if the restrictions apply to the current cell identifier, which may include more than one cell. As an example, the network can do so by providing a specific "Applicability Indication" set to "current cell" or the cell identity together with indications such as those described above to indicate to the UE that the restrictions apply to any cells with the same identity.

If at any time the network provides an indication to the UE of the type of connectivity supported for a given cell, in some implementations the UE stores the information in relation to the identity of the cell.

In some embodiments, when the UE provides a Request Connectivity Type, the network can use such information to validate the UE request. The validation may for example be performed by considering the Request Connectivity Type indication versus the contents of an UE user profile.

PDN GW Selection Function for Host-Based Mobility

For the S2c reference point (not shown), the UE needs to know the IP address of the PDN Gateway for the PDN the UE attempts to connect to. This address is made known to the UE using one of the following methods:

1) Via Protocol Configuration Option (PCO) at the attach procedure or UE requested PDN Connectivity procedure, for 3GPP access as defined for GERAN, UTRAN or E-UTRAN or trusted non-3GPP access (if supported). The UE may provide at the attach procedure or UE requested PDN Connectivity procedure the Requested Connectivity Type indication, and the selection of the PDN GW and of the IP address of the PDN GW takes into consideration the Requested Connectivity Type indication 2) Via IKEv2 during a tunnel setup to ePDG. The UE may provided the Requested Connectivity Type indication in the IKEv2 signalling, and the selection of the PDN GW and of the IP address of the PDN GW takes into consideration the Requested Connectivity Type indication. The network returns the IP address of the PDN GW to the UE in the IKEv2 signalling.

3) If the IP address of the PDN GW is not received using methods 1) or 2) above and if the UE knows that the HA is in the PDN where the UE is attached to then the UE shall request a PDN Gateway address via a Dynamic Host Configuration protocol (DHCP). The UE may provided the Requested Connectivity Type indication in the DHCP request, and the selection of the PDN GW and of the IP address of the PDN GW takes into consideration the Requested Connectivity Type indication. The network returns the IP address of the PDN GW to the UE in the DHCP response.

4) If the IP address of the PDN GW is not delivered using methods 1), 2) or 3) above the UE can interact directly with the Domain Name Service function by composing a Fully Qualified Domain name (FQDN) corresponding to the PDN. The UE may provide the Requested Connectivity Type indication, and the selection of the PDN GW and of the IP address of the PDN GW takes into consideration the Requested Connectivity Type indication. In some embodiments the UE provides the Requested Connectivity Type indication by creating an FQDN containing the Requested Connectivity Type indication. In some implementations, the network returns the IP address of the PDN GW to the UE in the DNS response.

In one or more of the four methods above, the network provides an indication in the response of:

A) Supported Connectivity Type: The network may include this information in order to indicate the type of connectivity supported by the current WLAN cell or 3GPP2 cell or femto cell.

B) Selected Connectivity Type: the network may include this information in order to inform the UE of the Connectivity Type selected by the network.

C) APN Applicability Indication: the network may include this information if the network indicates for what APNs the type of connectivity requested by the UE is not acceptable. If the network includes an indication that one or more APNs are included, this indicates that the type of connectivity requested by the UE is not acceptable for all the APNs provided. If the network includes an indication that the APN is not included, this indicates that the Supported Connectivity Type applies only to the current APN.

D) Cell Applicability Indication: The network may include this information if the UE is attaching to a WLAN cell or 3GPP2 cell or femto cell and if the network includes the Supported Connectivity Type information or the Selected Connectivity Type information. If the network includes an indication that the WLAN SSID or other identifier of the WLAN cell or 3GPP2 cell or femto cell identifier is included, this indicates that the Supported Connectivity Type applies to any CSG cell with the same value of CSG ID. If the network includes an indication that the WLAN SSID or other identifier of the WLAN cell or 3GPP2 cell or femto cell identifier is not included, this indicates that the Supported Connectivity Type applies only to the current WLAN cell or 3GPP2 cell or femto cell.

Problem 3: Triggering of Applications Based on a Mobility Event

When the UE is connected to macro coverage and enters the coverage area of the CSG cell, the UE may move to the CSG cell depending on one or more of: mobility mechanisms; cell selection mechanisms; and connectivity policies defined by the user, the operator or both, in the UE. The connectivity policies may include a list of APNs; CSG IDs or cell identities; and the preferred connectivity type (e.g. LIPA or remote connectivity) for such APNs, so that the UE knows the preferred connectivity type for each specific APN for a specific CSG ID or cell identity (e.g. for WLAN cells or 3GPP2 cells or femto cells). The list can contain also an indication of which applications can use a specific type of connectivity or that shall use a specific type of connectivity.

Traditionally, the triggering for PDN connectivity related to a specific data network or service (and therefore related to a specific APN) is based on an application in the UE being launched that requires connectivity to such specific APN.

However, in the case of a CSG cell, the situation is different. In fact, there are some applications that may require connectivity only when the UE is connected to a given CSG cell (or a set of CSG cells) or to any CSG cell. A particular example of such an application is an application that uploads pictures taken by the UE to a home media server when the UE is connected to the CSG cell in the UE's own home network. Another particular example of such an application is an application that automatically downloads the most recently created music podcast from a home PC in the UE's own home network.

Traditionally, applications are started in the UE by the user. However, there may be "dormant" applications that are triggered only when the UE moves to the CSG cell coverage.

Such applications typically cannot use the PDN connectivity before the UE moves to the CSG cell, since the UE is typically connected to a remote PDN (e.g. in the home public land mobile network (HPLMN) or visited public land mobile network (VPLMN) core network), and does not have a direct connection to the network where the CSG cell resides (i.e. the UE does not have local IP access). In some implementations, the applications may not use the PDN connectivity, for example, based on policies indicating that LIPA connectivity is preferable to remote connectivity or based on policies indicating that remote connectivity may not be used by such applications.

In some implementations, an application may trigger local IP connectivity when the UE moves to a specific radio cell, as in the case of the HNB. This may be the equivalent of having a mobility event triggering a specific PDN connectivity. Several examples of a mobility event, which are used for illustration purposes and not intended to limit the scope of the subject matter described herein, may include the UE reselecting the HNB cell or the UE handing over existing connections to the HNB cell.

When LIPA PDN connectivity is dropped or handed over elsewhere, for example to a remote access, or when the UE moves out of the CSG cell, the applications utilizing LIPA PDN connectivity should be to be notified.

Certain application may use different transport protocols, for example User Datagram Protocol (UDP) or Transmission Control Protocol (TCP), or different security mechanism to exchange data between a UE and a server in the network. Depending on the type of connectivity, such as LIPA or SIPTO or remote connectivity, the application may need to use a different transport protocol or different security mechanism to exchange data. The application in the UE therefore needs to be informed of the type of connectivity being established, such as LIPA or SIPTO or remote connectivity.

The problem described in this section applies more generally to the case of mobility between radio accesses, e.g. for UE mobility from GERAN/UTRAN to E-UTRAN or vice-versa, or for UE mobility between a 3GPP technology (e.g. GERAN, UTRAN or E-UTRAN) and a non-3GPP technology (e.g. WLAN). In such cases, it is preferable that some applications only use connectivity over one access with respect to another access, or some applications may be forbidden from using a specific access. For this reason, upon mobility between accesses, in some embodiments, the applications are made aware of the type of access being used and of the occurrence of a mobility event.

Solution to Problem 3:

In some embodiments the UE has an application manager that is configured with application connectivity policies. The application connectivity policies may either be defined by the user or provided by the network operator to the UE during UE configuration. Examples of information that may be defined by the application connectivity policies may include one or more of: whether a given access is preferable for the application with respect to other accesses; whether a given access is forbidden for the application; whether LIPA connectivity or SIPTO connectivity or remote connectivity (or any combination of the three) are preferable for the application when the UE is connected to a 3GPP or non-3GPP cell; whether LIPA connectivity or SIPTO connectivity or remote connectivity (or any combination of the three) are forbidden for the application when the UE is connected to a 3GPP or non-3GPP cell; whether LIPA connectivity or SIPTO connectivity or remote connectivity (or any combination of the three) are the only type of connectivity that the application can use when the UE is connected to a 3GPP or non-3GPP cell; and whether the application can use a certain type of connectivity in a specific 3GPP or non-3GPP cell or set of 3GPP or non-3GPP cells.

In some embodiments the application manager receives triggers from the lower layers (e.g. NAS or AS) of one or a set of mobility events. A list of examples of mobility events that are not intended to limit the scope of the subject matter described herein may include: the UE entering coverage of a specific radio technology (e.g. E-UTRAN, WLAN, etc.); the UE leaving the coverage of a specific radio technology; the UE connecting to a 3GPP or non-3GPP cell (including optionally providing the CSG ID of the CSG cell or identity of the non-3GPP cell and, if available, indication of the type of connectivity available in the 3GPP or non-3GPP cell); the UE leaving a 3GPP or non-3GPP cell.

In some embodiments, the application manager upon receiving a trigger from the lower layers decides whether, based on the application connectivity policies, one or a set of applications should be launched and allowed to access the existing connectivity.

In some embodiments, applications that use a specific type of connectivity in a 3GPP or non-3GPP cell can go dormant (i.e. remain active but not exchange data) and possibly provide an indication to the user that the connectivity is not available anymore and that the application is suspended. In some embodiments, applications that use a specific access to send and receive data and that are launched by the user when the UE has access to that specific type of connectivity in a 3GPP or non-3GPP cell, or are connected to that specific access, can go dormant and possibly provide an indication to the user that the connectivity is not available anymore and that the application is suspended.

In some embodiments, the application manager upon receiving a trigger from the lower layers decides whether, based on the application connectivity policies, one or a set of applications that were dormant should be notified of the type of connectivity now available when the UE is connected to a CSG cell or when the UE is connected to a specific access.

In some embodiments, in order to allow applications to go dormant, a context is maintained in the UE in the state machine at networking or IP or NAS level so that the applications can be reactivated when the right type of connectivity or access become available.

The indication to the upper layers in the UE that LIPA connectivity is available, or has been selected, or that remote connectivity is available, or has been selected, or that SIPTO connectivity is available, or has been selected can be given in addition to the notification of mobility events, including mobility between accesses. In some implementations, the UE provides such an indication to its upper layers. The application manager or the IMS UE "layer" are examples of such an upper layer. However, if LIPA availability or remote connectivity availability is determined using a MO or even USIM, then the upper layers would determine LIPA availability or remote connectivity availability by consulting the indicator. In some implementations the indicator may be stored in memory (e.g. removable memory). If the upper layers determine the availability of any of LIPA, SIPTO, or remote connectivity, or that any of LIPA, SIPTO or remote connectivity have been selected due to being attached to a 3GPP or non-3GPP cell, then upon successful attaching, the upper layers are provided the indication that a connection to a specific 3GPP or non-3GPP cell is established, for example a 3GPP CSG cell or a WLAN cell). It is then up to the upper layers to determine that LIPA or remote connectivity is available.

In some embodiments an application receives triggers from the lower layers (e.g. NAS or AS) of one or a set of mobility events. A list of examples of mobility events that are not intended to limit the scope of the subject matter described herein may include: the UE entering coverage of a specific radio technology (e.g. E-UTRAN, WLAN, etc.); the UE leaving the coverage of a specific radio technology; the UE connecting to a 3GPP or non-3GPP cell (including optionally providing the CSG ID of the CSG cell or identity of the non-3GPP cell and, if available, indication of the type of connectivity available in the 3GPP or non-3GPP cell); the UE leaving a 3GPP or non-3GPP cell. When the application receives the triggers, the application decide which type of transport protocol to use or which type of security mechanisms to use to exchange data.

Figure 27:
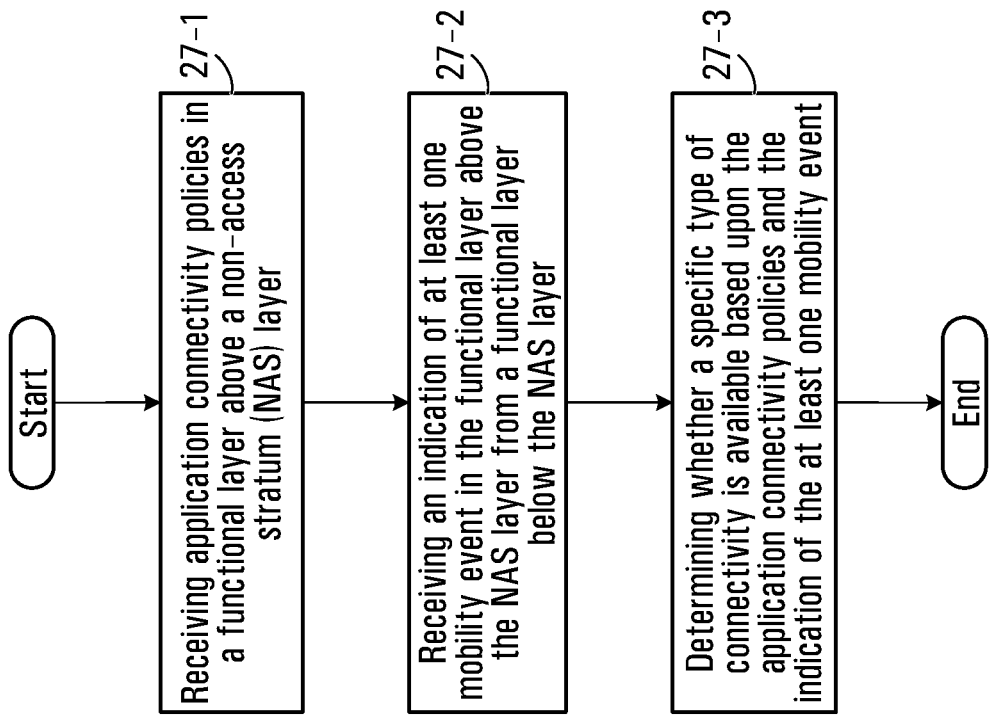
FIG. 27 is a flow chart illustrating still a further example of a method according to an embodiment described herein.

A example method for use in an user equipment (UE) will now be described with reference to FIG. 27. A first step 27-1 involves receiving application connectivity policies in a functional layer above a non-access stratum (NAS) layer. A second step 27-2 involves receiving an indication of at least one mobility event in the functional layer above the NAS layer from a functional layer below the NAS layer. A third step 27-3 involves determining whether a specific type of connectivity is available based upon the application connectivity policies and the indication of the at least one mobility event.

Problem 4: Establishment of Single or Multiple Connectivity

When the UE connects to a given PDN while camping on a cell, such as a 3GPP cell or WLAN cell or non-3GPP cell (such as a 3GPP2 cell), assuming that the cell allows LIPA connectivity, some applications may need to be connected both locally (i.e. in LIPA) and remotely (e.g. to the operator network). This means that for the same PDN, typically identified by a specific APN, the UE may need to connect both in LIPA and in remote connectivity.

The problem may be considered to consist of two parts: a) how does the UE know that a specific PDN needs to be connected both in LIPA and remotely when LIPA is available and b) how does the UE indicate the need for a first connection to a PDN to be connected in LIPA and for a second connection to the same PDN to be connected remotely.

In conventional operation it is the network that decides whether connectivity to a certain PDN (i.e. a specific APN) in a certain cell (e.g. a CSG cell) should be connected using LIPA or remote connectivity.

While simultaneous connectivity to the same APN is already permitted, there is no mechanism to indicate that when a PDN connection is established, it should be established using LIPA connectivity or remote connectivity.

Solution to Problem 4:

In some embodiments, the UE is configured through policies. An example of a policy, which is for illustrative purposed only and not intended to limit the scope of the subject matter described herein, is for each APN the UE is provided an indication of whether connectivity for that APN should be in LIPA connectivity or remote connectivity.

In some implementations, the policies are configured in the UE by the user. In some implementations, the policies are provided to the UE by the network operator. An example of the policies being provided to the UE may include MOs using OMA DM.

In some implementations policy information is stored in a memory storage component of the UE. In some implementations the memory is removable, for example a Universal Integrated Circuit Card (UICC) card. In some implementations the memory is configured with policy information.

In some embodiments, the UE is provided with an indication, when LIPA is available, whether the UE should connect for that specific APN simultaneously in LIPA connectivity and in remote connectivity. In some embodiments, the UE is provided with an indication of whether or not the UE should request first connection to the APN for remote connectivity and subsequently request an additional connection to the same APN in LIPA connectivity.

In some embodiments, the UE sends an additional indication when requesting the first or additional PDN connectivity (for example Activate PDP Context Request in GERAN/UTRAN, PDN Connectivity Request in E-UTRAN, IKEv2 signalling for WLAN, PDN GW discovery mechanisms for DSMIPv6, DSMIPv6 tunnel establishment messages or networking protocols of non-3GPP accesses used to establish the connectivity) or in an ATTACH REQUEST message, independently of whether the UE provides an APN or not in request, indicating whether the UE desires LIPA connectivity or remote connectivity.

Problem 5: CSG Manual Configuration

In some embodiments, the user of the UE can manually add a new CSG to a list of allowed CSG that is stored in the UE. In such case, the user may configure whether LIPA connectivity is desired for the specific CSG, and for which connections/applications.

However, the network may not accept the configuration that the user has entered. In a first example of why this may occur, in the specific CSG the UE has added manually, the network may decide that a specific APN cannot be connected in LIPA, or may decide that the UE is not allowed to access LIPA connectivity. This may occur for example because the user is a guest in the CSG and is not allowed to access local resources such as printers or local servers. In another example of why this may occur, in the specific CSG the UE has been added manually, the network may decide that a specific APN cannot be connected remotely, but only in LIPA, or may decide that the UE is not allowed to access remote connectivity, but only local resources.

Solution to Problem 5:

The proposed solution is to allow configuration of when LIPA connectivity is needed on a per application basis, or a per-APN basis, for the specific cell. In some embodiments, the user manually configures when LIPA connectivity is needed. In some embodiments the application configures the information.

The UE requests the type of connectivity as described in the previous solutions.

If user configuration for a specific CSG and related LIPA connectivity or remote connectivity for a specific APN is not acceptable by the network, the network upon receiving the request from the UE for connectivity responds to the UE by rejecting the request and indicating that the requested connectivity for that APN is not available.

Alternatively, the network upon receiving the request from the UE for connectivity for an APN responds to the UE by accepting the request and providing an available type of connectivity and indicating that requested type of connectivity is not available. For example, if LIPA connectivity is requested and LIPA connectivity is not available, but remote connectivity is available, the network provides remote connectivity. The network can explicitly indicate the specific APN by providing the APN in the response, or implicitly indicate it is the APN the UE requested by not returning any APN.

If user configuration for a specific CSG and related LIPA connectivity or remote connectivity for any APN is not acceptable by the network (i.e. the network does not allow any LIPA connectivity for such UE or does not allow any remote connectivity for such UE), the network upon receiving the request from the UE for connectivity for any APN responds to the UE by rejecting the request and indicating that the requested connectivity (either LIPA connectivity or remote connectivity, whichever was requested) is not available.

Alternatively, the network upon receiving the request from the UE for connectivity for an APN responds to the UE by accepting the request and providing an available type of connectivity and indicating that requested type of connectivity is not available.

The network may indicate this either implicitly by not providing any APNs in the reply or by explicitly providing an "All APN Indication" in the response. In some embodiments, if the network rejects LIPA or Remote connectivity for a specific APN it does so by returning the APN to the UE that is being rejected to clearly distinguish which type of connectivity is being rejected for the APN, for example "no LIPA" or "No remote connectivity".

Problem 6: Discovery of Type of Connectivity Provided to the UE

In some embodiments, when the UE establishes PDN connectivity in a cell, the UE may have requested a certain type of connectivity (e.g. LIPA), but the network may decide not to provide the requested type of connectivity and instead provide an alternative type connectivity. In some embodiments, when the UE establishes PDN connectivity in a cell, the UE may not have requested a certain type of connectivity (e.g. LIPA), and the network may decide to provide a specific type of connectivity (e.g. LIPA). In such case, the UE needs to know the type of connectivity actually provided in order to allow applications that require LIPA connectivity or remote connectivity to access local services, or applications that require to know the type of connectivity provided in order to select a transport protocol or security mechanism.

Similarly, when a UE establishes connectivity in a macro cell, the network may decide to provide SIPTO connectivity instead of remote connectivity. Some applications may allow the use of one type of IP transport protocol (e.g. UDP) when connectivity is provided remotely or in SIPTO or LIPA, in which case the UE may need to use a different protocol for the applications. This may occur because the GGSN/PGW is selected in such a way that the GGSN/PGW has enhanced capability to provide specific services to the UE. An illustrative example not meant to limit the subject matter described herein is the UE that desires to know whether connectivity was provided remotely or in SIPTO, so that the UE uses an appropriate protocol for the application.

Solution to Problem 6:

In some embodiments the network ensures that a given type of unwanted connectivity (e.g. LIPA) is not allowed for either all the APNs or for a set of APNs.

In some embodiments the network ensures that the type of connectivity selected is indicated to the UE. In some implementations SIPTO and remote connectivity are indicated to the UE when selected for a UE connecting through a macro network or through a CSG cell, and LIPA when provided to a UE connecting through a CSG cell.

The network provides an indication of the Selected Connectivity Type to the UE indicating either LIPA, SIPTO or remote connectivity. This can be achieved by including in the acceptance of a PDP Context Activation Request or UE Requested PDN Connection Request or IKEv2 connection establishment or DSMIPv6 tunnel establishment (for example a Binding Acknowledgment message) or non-3GPP PDN connection establishment (for example for a 3GPP2 cell). In some implementations this may include an indication in a PDP CONTEXT ACCEPT message or an ACTIVATE DEFAULT EPS BEARER CONTEXT REQUEST message indicating one of the three types of connectivity. In some implementations this may include an indication in an IKEv2 connection establishment or DSMIPv6 tunnel establishment (for example a Binding Acknowledgment message) or non-3GPP PDN connection establishment (for example for a 3GPP2 cell) indicating one of the three types of connectivity.

The network includes a Supported Connectivity Type indicator in order to indicate to the UE the type of connectivity (e.g. LIPA, SIPTO, etc.) supported.

The network returns an indication of the Selected Connectivity Type in order to indicate the type of connectivity (e.g. LIPA, SIPTO, etc.) selected for the current PDN connection.

The network includes an indication of whether the requested connectivity type is not acceptable for the current APN or for which APNs it is not acceptable if the Selected Connectivity Type is different from the Requested Connectivity Type.

For CSG cells, the network includes the CSG Applicability Indication if the indications in the Selected Connectivity Type or the Supported Connectivity Type, or both, apply only to the current CSG cell or to the current CSG ID.

In some implementations such a solution may not work for legacy UEs, since the legacy UE may not be capable of processing the new indication.

Problem 7: Implications of an Architecture with More than One S-GW Serving a UE

An architecture with more than one serving gateway (S-GW) serving a UE, for example an architecture supporting at least two S-GWs, at least one in the HeNB subsystem and at least one in the macro or core network, has been proposed in order to enable LIPA or SIPTO, or both. Embodiments provided in this application include modifications to existing data structures and message flows in order to support LIPA service continuity as well as remote access local resources for LIPA/SIPTO based on the at least two S-GWs architecture. Further enhancements may be made beyond introducing more than one S-GW associated with a UE and enabling LIPA or/and SIPTO service continuity. LIPA service continuity or SIPTO service continuity, or both, enables a UE to maintain its IP connectivity to a first residential IP network or enterprise IP network as the UE moves to a HeNB subsystem or another cell or an eNB that is connected to a second IP network, or vice versa. Initially, service continuity may be supported in one direction enabling a UE to maintain its IP connectivity to the residential IP network or enterprise IP network as the UE moves to a HeNB subsystem or another cell or an eNB that is not connected to a IP network different from said residential IP network or enterprise IP network or the IP resources in said residential IP network or enterprise IP network.

As a UE can move in/out of H(e)NB subsystem coverage which is directly connected to residential/enterprise network, a HO between a first H(e)NB and another H(e)NB (the another H(e)NB not having access to resources local to the first H(e)NB) or macro (e)NB occurs. Upon successful HO procedure the UE may not be able to initiated new LIPA connections top the resources local to the first H(eNB). In order top notify the UE, the MME may send a message to the UE indicating whether the Local IP resources are directly accessible or not. If LIPA continuity is enabled, the UE may be notified that the LIPA traffic is now handled by the macro. As a consequence of the macro handling the LIPA traffic, different charging rules may apply. The MME may send a message to the UE indicating that the LIPA traffic is no handled by the macro.

The UE may also detect that access to the local resources is not available due to determining that the CSG indicator is absent or no longer broadcasted. Alternatively, a change in cell id may be detected. Said detection(s) may assist the UE in determining whether the Local IP resources are directly accessible or not or indicating that the LIPA traffic is now handled by the macro or by a H(e)NB subsystem that fails to have access to the local resources.

Upon determining (e.g. due to receiving the message from the network (e.g. the MME), indicating the following, or due to a UE determining the absence of a CSG indicator) whether the Local IP resources are directly accessible or not or indicating that the LIPA traffic is now handled by the macro or by a H(e)NB subsystem that fails to have access to the local resources the UE provides one or more indications towards the upper layers indicating whether the Local IP resources are directly accessible or not or indicating that the LIPA traffic is now handled by the macro or by a H(e)NB subsystem that fails to have access to the local resources. The upper layers may take these indications into account when determining how to utilize the LIPA connectivity (e.g. also taking into account user preferences or other preferences).

In addition, it would be beneficial if remote access toward the local IP resource is supported because of the possibility to enable a user to access enterprise or residential IP resources.
Solution to Problem 7:

In the description below it should be noted that eNB can correspond to NB and HeNB can correspond to HNB, respectively, unless such correspondence is precluded according to the context of the description. Another term for HeNB is HeNB Subsystem.

Architecture

In some embodiments, for supporting the LIPA and SIPTO service continuity the architecture supporting more than one S-GW is used as a basis. The S11 interface or similar interface is added to the HeNB subsystem to manage the bearer setup for LIPA and SIPTO.

Because a UE may be served by more than one S-GW at times, in some embodiments, conventional operation in which a UE is served by a single S-GW at a given point of time is overridden to allow for more than one S-GW to simultaneously serve the UE.

For the situation in which a handover occurs when the UE is utilizing services with more than one IP connection type via more than one S-GW or SGSGN (in this document, the term S-GW can be substituted with SGSN unless the context indicates otherwise), the merge or split or reallocation of bearer contexts on the source S-GW to the target S-GW may occur. Another term for merge or spit is reallocate. The more than one IP connection type may include LIPA, SIPTO, non-LIPA and non-SIPTO. Typically, IP packets transmitted as part of a IP connection of a IP connection type, are subjected to e.g. LIPA, SIPTO, non-LIPA and non-SIPTO functionality.

In some embodiments, the functions of one or more of the HeNB, the eNB, the MME and the S-GWs are enhanced to support the mobility messaging, data storage and context management for bearers and PDP contexts as well as information associated with PDN connections.

Figure 29:
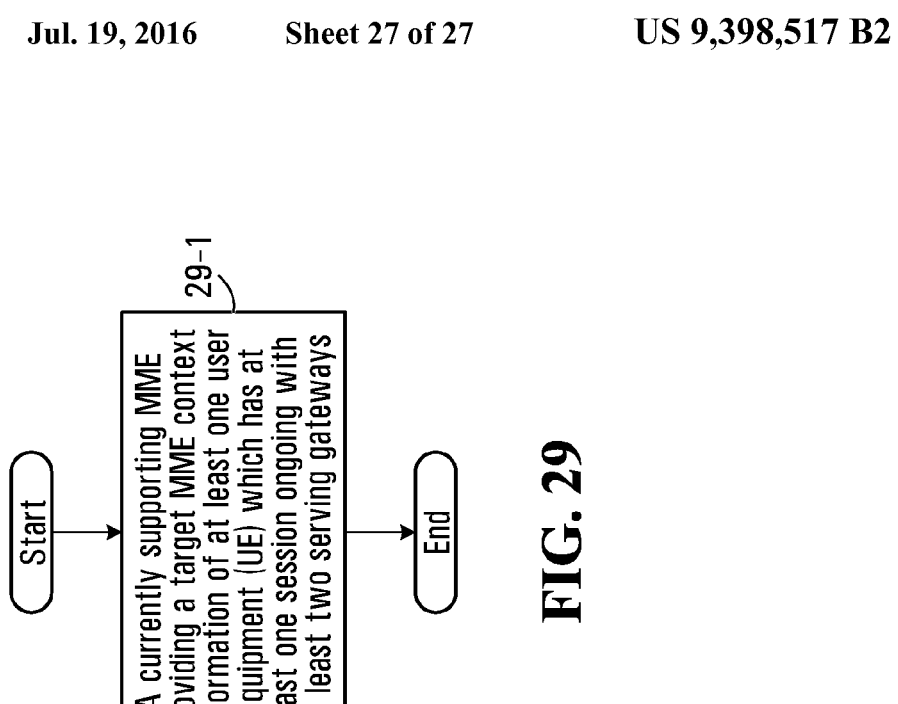
FIG. 29 is a flow chart illustrating still a further example of a method according to an embodiment described herein.

A method will now be described with regard to FIG. 29. The method involves a step 29-1 of a source MME providing a target MME context information of at least one user equipment (UE) which has at least one session served by a local serving gateways.

Data Structure Modifications

As a UE may be served by more than one S-GW if the UE is in HeNB coverage and it uses one or more LIPA and/or SIPTO PDN connections, in some implementations the MME is configured to keep track of more than one S-GW in the UE's context information.

In some embodiments, the UE's context information contains additional fields for the address and GPRS tunnelling protocol tunnelling endpoint identifier (GTP TEID) of the local serving gateway (LS-GW). The GTP TEID can be used for control plane messages over S-11 reference point between the MME and the LS-GW. If UE is being served by single S-GW, the additional fields can be empty or not used. For example, an indicator could be added indicating the number LS-GWs serving the UE.

In some embodiments, the MME also maintains the context information per active PDN connection. As the MME conventionally communicates with only one S-GW, no PDN connection specific S-GW information has been needed. With the introduction of potentially more than one S-GW, the identity of the S-GW, which is associated with the PDN connection, in some embodiments is made available. Thus, an additional field for the S-GW identity, in terms of IP address or Fully Qualified Domain Name (FQDN), may be added per active PDN connection.

As a UE may be served by more than one S-GW, the MME is configured to handle multiple S-GWs per UE.

The MME maintains MM context and EPS bearer context information for UEs in the ECM-IDLE, ECM-CONNECTED and EMM-DEREGISTERED states. The MM context and EPS bearer context information for UEs maintained by the MME needs to include a LS GW IP address for S11, for each LS GW serving a (L)S GW, a corresponding LS GW TEID (Tunnel Endpoint Identifier) for S11, and the (L)S-GW Addresses in Use (the IP address of the (L)S-GW currently used for sending control plane signalling) for each (L)S GW serving the UE. Examples of MME MM and EPS bearer Contexts that may be used in some embodiments are included below in Table 4.

TABLE 4

MME MM and EPS bearer contexts

| Field | Description |
|---|---|
| IMSI | IMSI (International Mobile Subscriber Identity) is the subscribers permanent identity. |
| IMSI-unauthenticated-indicator | This is an IMSI indicator to show the IMSI is unauthenticated. |
| MSISDN | The basic MSISDN of the UE. The presence is dictated by its storage in the HSS. |
| MM State | Mobility management state ECM-IDLE, ECM-CONNECTED, EMM-DEREGISTERED. |
| GUTI | Globally Unique Temporary Identity. |
| ME Identity | Mobile Equipment Identity - (e.g. IMEI/IMEISV) Software Version Number |
| Tracking Area List | Current Tracking area list |
| TAI of last TAU | TAI of the TA in which the last Tracking Area Update was initiated. |
| E-UTRAN Cell Global Identity | Last known E-UTRAN cell |
| E-UTRAN Cell Identity Age | Time elapsed since the last E-UTRAN Cell Global Identity was acquired |
| CSG ID | Last known CSG ID when the UE was active |
| CSG membership | Last known CSG membership of the UE when the UE was active |
| Access mode | Access mode of last known ECGI when the UE was active |
| Authentication Vector | Temporary authentication and key agreement data that enables an MME to engage in AKA with a particular user. An EPS Authentication Vector consists of four elements: a) network challenge RAND, b) an expected response XRES, c) Key $K_{ASME}$, d) a network authentication token AUTN. |
| UE Radio Access Capability | UE radio access capabilities. |
| MS Classmark 2 | GERAN/UTRAN CS domain core network classmark (used if the MS supports SRVCC to GERAN or UTRAN) |
| MS Classmark 3 | GERAN CS domain radio network classmark (used if the MS supports SRVCC to GERAN) |
| Supported Codecs | List of codecs supported in the CS domain (used if the MS supports SRVCC to GERAN or UTRAN) |
| UE Network Capability | UE network capabilities including security algorithms and key derivation functions supported by the UE |
| MS Network Capability | For a GERAN and/or UTRAN capable UE, this contains information needed by the SGSN. |
| UE Specific DRX Parameters | UE specific DRX parameters for A/Gb mode, Iu mode and S1-mode |
| Selected NAS Algorithm | Selected NAS security algorithm |
| Selected AS Algorithm | Selected AS security algorithms. |
| $KSI_{ASME}$ | Key Set Identifier for the main key $K_{ASME}$ |
| $K_{ASME}$ | Main key for E-UTRAN key hierarchy based on CK, IK and Serving network identity |
| NAS Keys and COUNT | $K_{NASint}$, $K_{NASenc}$, and NAS COUNT parameter. |
| E-UTRAN/UTRAN Key Set flag | Indicates whether the UE is using security keys derived from UTRAN or E-UTRAN security association |
| Selected CN operator id | Selected core network operator identity (to support network sharing as defined in TS 23.251 [24]). |
| Recovery | Indicates if the HSS is performing database recovery. |
| Access Restriction | The access restriction subscription information. |
| ODB for PS parameters | Indicates that the status of the operator determined barring for packet oriented services. |
| APN-OI Replacement | Indicates the domain name to replace the APN-OI when constructing the PDN GW FQDN upon which to perform DNS queries. This replacement applies for all the APNs in the subscriber's profile. |
| MME IP address for S11 | MME IP address for the S11 interface (used by S-GW) |
| MME TEID for S11 | MME Tunnel Endpoint Identifier for S11 interface. |
| S-GW IP address for S11/S4 | S-GW IP address for the S11 and S4 interfaces |
| S-GW TEID for S11/S4 | S-GW Tunnel Endpoint Identifier for the S11 and S4 interfaces. |
| LS-GW IP address for S11/S4 | LS-GW IP address for the S11 and S4 interfaces. Empty if LS-GW is not used |
| LS-GW TEID for S11/S4 | LS-GW Tunnel Endpoint Identifier for the S11 and S4 interfaces. Empty if LS-GW is not used |
| SGSN IP address for S3 | SGSN IP address for the S3 interface (used if ISR is activated for the GERAN and/or UTRAN capable UE) |
| SGSN TEID for S3 | SGSN Tunnel Endpoint Identifier for S3 interface (used if ISR is activated for the E-UTRAN capable UE) |
| eNodeB Address in Use | The IP address of the eNodeB currently used. |
| eNB UE S1AP ID | Unique identity of the UE within eNodeB. |
| MME UE S1AP ID | Unique identity of the UE within MME. |
| Subscribed UE-AMBR | The Maximum Aggregated uplink and downlink MBR values to be shared across all Non-GBR bearers according to the subscription of the user. |
| UE-AMBR | The currently used Maximum Aggregated uplink and downlink MBR values to be shared across all Non-GBR bearers. |
| EPS Subscribed Charging Characteristics | The charging characteristics for the MS e.g. normal, prepaid, flat rate and/or hot billing. |
| Subscribed RFSP Index | An index to specific RRM configuration in the E-UTRAN that is received from the HSS. |
| RFSP Index in Use | An index to specific RRM configuration in the E-UTRAN that is currently in use. |
| Trace reference | Identifies a record or a collection of records for a particular trace. |
| Trace type | Indicates the type of trace |
| Trigger id | Identifies the entity that initiated the trace |
| OMC identity | Identifies the OMC that shall receive the trace record(s). |
| URRP-MME | URRP-MME indicating that the HSS has requested the MME to notify the HSS regarding UE reachability at the MME |
| CSG Subscription Data | The CSG Subscription Data is a list of CSG IDs for the visiting PLMN and for each CSG ID optionally an associated expiration date which indicates the point in time when the subscription to the CSG ID expires; an absent expiration date indicates unlimited subscription. |
| For each active PDN connection: | |
| APN in Use | The APN currently used. This APN shall be composed of the APN Network Identifier and the APN Operator Identifier. |
| APN Restriction | Denotes the restriction on the combination of types of APN for the APN associated with this EPS bearer Context. |
| APN Subscribed | The subscribed APN received from the HSS. |
| PDN Type | IPv4, IPv6 or IPv4v6 |
| IP Address(es) | IPv4 address and/or IPv6 prefix E: The MME might not have information on the allocated IPv4 address. Alternatively, following mobility involving a pre-release 8 SGSN, this IPv4 address might not be the one allocated to the UE. |

TABLE 4-continued

MME MM and EPS bearer contexts

| Field | Description |
|---|---|
| EPS PDN Charging Characteristics | The charging characteristics of this PDN connection, e.g. normal, prepaid, flat-rate and/or hot billing. |
| APN-OI Replacement | APN level APN-OI Replacement which has same role as UE level APN-OI Replacement but with higher priority than UE level APN-OI Replacement. This is an optional parameter. When available, it shall be used to construct the PDN GW FQDN instead of UE level APN-OI Replacement. |
| VPLMN Address Allowed | Specifies whether the UE is allowed to use the APN in the domain of the HPLMN only, or additionally the APN in the domain of the VPLMN. |
| PDN GW Address in Use (control plane) | The IP address of the PDN GW currently used for sending control plane signalling. |
| PDN GW TEID for S5/S8 (control plane) | PDN GW Tunnel Endpoint Identifier for the S5/S8 interface for the control plane. |
| S-GW Address in Use (control plane) | The IP address of the S-GW currently used for sending control plane signalling. |
| MS Info Change Reporting Action | Need to communicate change in User Location Information and/or User CSG Information to the PDN GW with this EPS bearer Context. For User CSG Information, this field denotes separately whether the MME/SGSN are requested to send changes in User CSG Information for (a) CSG cells, (b) hybrid cells in which the subscriber is a CSG member and (c) hybrid cells in which the subscriber is not a CSG member. |
| EPS subscribed QoS profile | The bearer level QoS parameter values for that APN's default bearer (QCI and ARP) (see clause 4.7.3). |
| Subscribed APN-AMBR | The Maximum Aggregated uplink and downlink MBR values to be shared across all Non-GBR bearers, which are established for this APN, according to the subscription of the user. |
| APN-AMBR | The Maximum Aggregated uplink and downlink MBR values to be shared across all Non-GBR bearers, which are established for this APN, as decided by the PDN GW. |
| PDN GW GRE Key for uplink traffic (user plane) | PDN GW assigned GRE Key for the S5/S8 interface for the user plane for uplink traffic. (For PMIP-based S5/S8 only) |
| Default bearer | Identifies the EPS Bearer Id of the default bearer within the given PDN connection. For each bearer within the PDN connection: |
| EPS Bearer ID | An EPS bearer identity uniquely identifies an EP S bearer for one UE accessing via E-UTRAN |
| TI | Transaction Identifier |
| IP address for S1-u | IP address of the S-GW for the S1-u interfaces. |
| TEID for S1u | Tunnel Endpoint Identifier of the S-GW for the S1-u interface. |
| PDN GW TEID for S5/S8 (user plane) | P-GW Tunnel Endpoint Identifier for the S5/S8 interface for the user plane. (Used for S-GW change only). E: The PDN GW TEID is needed in MME context as S-GW relocation is triggered without interaction with the source S-GW, e.g. when a TAU occurs. The Target S-GW requires this Information Element, so it must be stored by the MME. |
| PDN GW IP address for S5/S8 (user plane) | P GW IP address for user plane for the S5/S8 interface for the user plane. (Used for S-GW change only). E: The PDN GW IP address for user plane is needed in MME context as S-GW relocation is triggered without interaction with the source S-GW, e.g. when a TAU occurs. The Target S GW requires this Information Element, so it must be stored by the MME. |
| EPS bearer QoS | QCI and ARP optionally: GBR and MBR for GBR bearer |
| TFT | Traffic Flow Template. (For PMIP-based S5/S8 only) |

Modified Message Format for Inter MME HO

In some embodiments an old or source serving MME is switched to a new or target serving MME while the UE stays in the HeNB subsystem. Load re-balancing between MMES is an example of when this may occur. During the MME switch, the new MME requests from the old MME the context information regarding the UE using a CONTEXT REQUEST message. The old MME provides the context information of the UE in the CONTEXT RESPONSE message. As the old MME may need to covey the information of more than one S-GW (e.g. including LSGW S11 IP Addresses, TEIDs for Control Plane, and LSGW node names, as well as SGW S5/S8 IP Addresses for Control Plane or PMIP per (L)SGW node name), the CONTEXT RESPONSE message format needs to be changed accordingly. In addition, an indication is needed such that a MME can determine the service type. Examples of service types include "normal", "lipa", "l(ocal)-sipto", "h((e)NB)-sipto", "sipto", "m(acro)-sipto", "emergency", "priority", "priority-<value or level>", etc.

In some embodiments the CONTEXT RESPONSE message is sent as a response to a previous CONTEXT REQUEST message during TAU/RAU procedure. Possible Cause values may include one or more of: "Request Accepted"; "IMSI not known"; "System failure"; "Mandatory IE incorrect"; "Conditional IE missing"; "Invalid message format"; "P-TMSI Signature mismatch" and "User authentication failed".

Table 5 specifies an example of the presence requirements and conditions of the IEs in the message.

TABLE 5

Information Elements in a Context Response

| Information elements | P | Condition/Comment | IE Type | Ins. |
|---|---|---|---|---|
| Cause | M | | Cause | 0 |
| IMSI | C | The IMSI may be included in the message except for the case: If the UE is emergency attached and the UE is UICCless. The IMSI shall be included in the message but not used as an identifier | IMSI | 0 |

TABLE 5-continued

Information Elements in a Context Response

| Information elements | P | Condition/Comment | IE Type | Ins. |
|---|---|---|---|---|
| | | If UE is emergency attached but IMSI is not authenticated. | | |
| MME/SGSN UE MM Context | C | | MM Context | 0 |
| MME/SGSN UE EPS PDN Connections | C | This IE may be included if there is at least a PDN connection for this UE on the sending MME/SGSN. Several IEs with this type and instance values shall be included as necessary to represent a list of PDN Connections. | PDN Connection | 0 |
| Sender F-TEID for Control Plane | C | This IE specifies the address and the TEID for control plane message which is chosen by the old MME/SGSN. | F-TEID | 0 |
| SGW S11/S4 IP Address and TEID for Control Plane | C | This IE shall be included if a SGW is being used by the UE. | F-TEID | 1 |
| SGW node name | C | This IE shall be included if the source MME or SGSN has the source SGW FQDN. | FQDN | 0 |
| LSGW S11/S4 IP Address and TEID for Control Plane | C | This IE shall be included if a LSGW is being used by the UE. | F-TEID | 1 |
| LSGW node name | C | This IE shall be included if the source MME or SGSN has the source LSGW FQDN. | FQDN | 0 |
| Indication Flags | C | This IE shall be included if any of the flags are set to 1. Idle mode Signalling Reduction Supported Indication: This flag shall be set to 1 if the Cause IE value indicates "Request accepted" and the old system has the ISR capability. Unauthenticated IMSI: This flag shall be set to 1 if the IMSI present in the message is not authenticated and is for an emergency attached UE. | Indication | 0 |
| Trace Information | C | This IE shall be included when session trace is active for this IMSI/IMEI. | Trace Information | 0 |
| HRPD access node S101 IP address | C | This IE shall be included only if the HRPD pre registration was performed at the old MME | IP-Address | 0 |
| 1xIWS S102 IP address | C | This IE shall be included only if the 1xRTT CS fallback pre registration was performed at the old MME | IP-Address | 1 |
| Private Extension | O | | Private Extension | VS |

Table 6 specifies an example of presence requirements and conditions of MME/SGSN UE EPS PDN Connections within Context Response.

TABLE 6

MME/SGSN UE EPS PDN Connections within Context Response

| Octet 1 | PDN Connection IE Type = 109 (decimal) |
| Octets 2 and 3 | Length = n |
| Octet 4 | Spare and Instance fields |

| Information elements | P | Condition/Comment | IE Type | Ins. |
|---|---|---|---|---|
| APN | M | | APN | 0 |
| APN Restriction | C | This IE denotes the restriction on the combination of types of | APN Restriction | 0 |

TABLE 6-continued

| MME/SGSN UE EPS PDN Connections within Context Response | | | | |
|---|---|---|---|---|
| | | APN for the APN associated with this EPS bearer Context. The target MME or SGSN determines the Maximum APN Restriction using the APN Restriction. If available, the source MME/S4 SGSN shall include this IE. | | |
| IPv4 Address | C | This IE shall not be included if no IPv4 Address is assigned. | IP Address | 0 |
| IPv6 Address | C | This IE shall not be included if no IPv6 Address is assigned. | IP Address | 1 |
| Linked EPS Bearer ID | M | This IE identifies the default bearer of the PDN Connection. | EBI | 0 |
| PGW S5/S8 IP Address for Control Plane or PMIP | M | This IE shall include the TEID in the GTP based S5/S8 case and the GRE key in the PMIP based S5/S8 case. | F-TEID | 0 |
| PGW node name | C | This IE shall be included if the source MME or SGSN has the PGW FQDN. | FQDN | 0 |
| SGW S5/S8 IP Address for Control Plane or PMIP | M | This IE shall include the TEID in the GTP based S5/S8 case and the GRE key in the PMIP based S5/S8 case. | F-TEID | 0 |
| SGW node name | C | This IE shall be included if the source MME or SGSN has the SGW FQDN. | FQDN | 0 |
| Bearer Contexts | M | Several IEs with this type and instance values may be included as necessary to represent a list of Bearers. | Bearer Context | 0 |
| Aggregate Maximum Bit Rate (APN-AMBR) | M | | AMBR | 0 |
| Charging characteristics | C | This IE shall be present if charging characteristics was supplied by the HSS to the MME/SGSN as a part of subscription information. | Charging characteristics | 0 |
| Change Reporting Action | C | This IE shall be included whenever available at the source MME/SGSN. | Change Reporting Action | 0 |

LIPA/SIPTO PDN Connection Establishment

Figure 9:
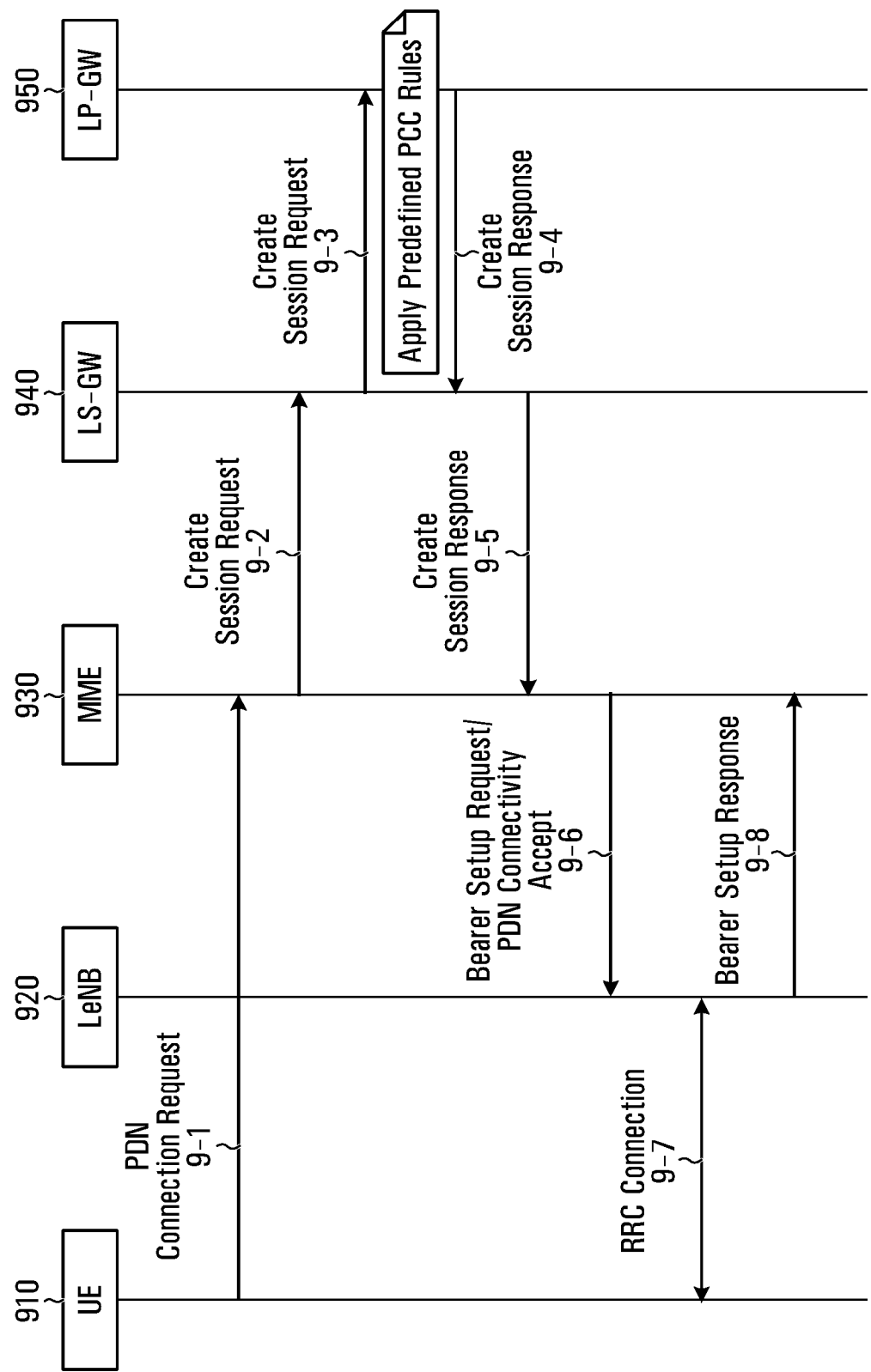
FIG. 9 is a signal flow diagram for a LIPA/SIPTO PDN connection establishment according to an embodiment of the application.

LIPA and SIPTO connectivity are provided through separate PDN connections. This section describes an example of how the PDN connection for LIPA/SIPTO is established based on the architecture described above. FIG. 9 depicts the procedure in detail. Here we assume that the UE is in the HeNB's coverage and already has at least one non-LIPA/non-SIPTO PDN connection through the core network. The UE is authenticated to use LIPA or SIPTO IP connectivity through a first HeNB. The UE preferably maintains the LIPA or SIPTO IP connectivity to the residential/enterprise IP network as it moves to a second H(e)NB or to second cell or second (e)NB that is not connected to the same residential/enterprise IP network.

Steps that are particularly relevant to the solutions described above are described in detail. Steps of the network attach procedure that are not particularly affected by the solutions described herein and may have known procedures will not be described in detail.

In signal flow 9-1, when the UE attempts to access local IP resources the UE indicates the predefined APN in the request message or it indicates LIPA preference as described elsewhere this application. If the UE attempts to access any other PDN, the UE will provide the APN accordingly and execute appropriate procedures when connected to 3GPP acceses. Appropriate procedures for 3GPP access may include those described in 3GPP TS 24.301. Alternative appropriate procedures apply if the UE is connected to non-3GPP accesses such as WLAN.

In signal flow 9-2, on receiving a request for access to local IP resources from the UE, the MME selects the LS-GW and LP-GW for the PDN connection if it is a LIPA PDN connection. This application describes various techniques for requesting access to local IP resources.

In some embodiments, on receiving a request from the UE that does not indicate a LIPA connection type the MME makes a decision whether to apply SIPTO to a connection. Typically, SIPTO is not applied to LIPA connections. The MME then decides whether to apply SIPTO based on a number of criteria such as if the UE is in the HeNB's coverage, if the UE is allowed to use SIPTO through the HeNB, whether it is appropriate to apply SIPTO to the requested APN or the default APN if the APN was not present in the request, and other factors like the UE's recent mobility pattern, as well as the type PDN requested (e.g. "emergency"), Typically SIPTO is not applied to PDN connections of the emergency type. Once the MME decides to apply SIPTO, it will choose a S-GW, which can be a LS-GW, and a PDN Gateway (P-GW) (which can be a Local PDN Gateway (LP-GW)) for the PDN connection. The MME likely keeps track of the information in order to indicate the IP connectivity (e.g. SIPTO, LIPA, etc.) if e.g. Load re-balancing between MMEs.

In some implementations the MME sends a CREATE SESSION REQUEST message to the (L)S-GW which is located in the HeNB subsystem. The message contains the IP address information of the (L)P-GW as the designated P-GW for the PDN connection. Note that a LP-GW and a LS-GW can be located within the H(e)NB subsystem or can be reached by the H(e)NB within its local IP network. It is possible that LS-GWs can connect to P-GWs and vice versa. For the purpose of this document, a LP-GW can be a P-GW and a LS-GW can be a S-GW.

In signal flow 9-3, the LS-GW creates context information for the PDN connection and for the default bearer of the PDN connection. The LS-GW sends the create session request message toward the LP-GW, the IP address of which was provided by the MME. The LP-GW applies predefined Policy and Charging Control (PCC) rules for the PDN connection unless the reference point towards a Policy and Charging Rule Function (PCRF) exists.

In signal flow 9-4, the LP-GW creates context information for the PDN connection and for the default bearer of it, and sends a create session response message towards the LS-GW.

In signal flow 9-6, on receiving the create session response message from the LS-GW, the MME records the address and the tunnelling endpoint identifier (TEID) of the LS-GW as the secondary S-GW for the UE in the UE's context information.

Figure 10:
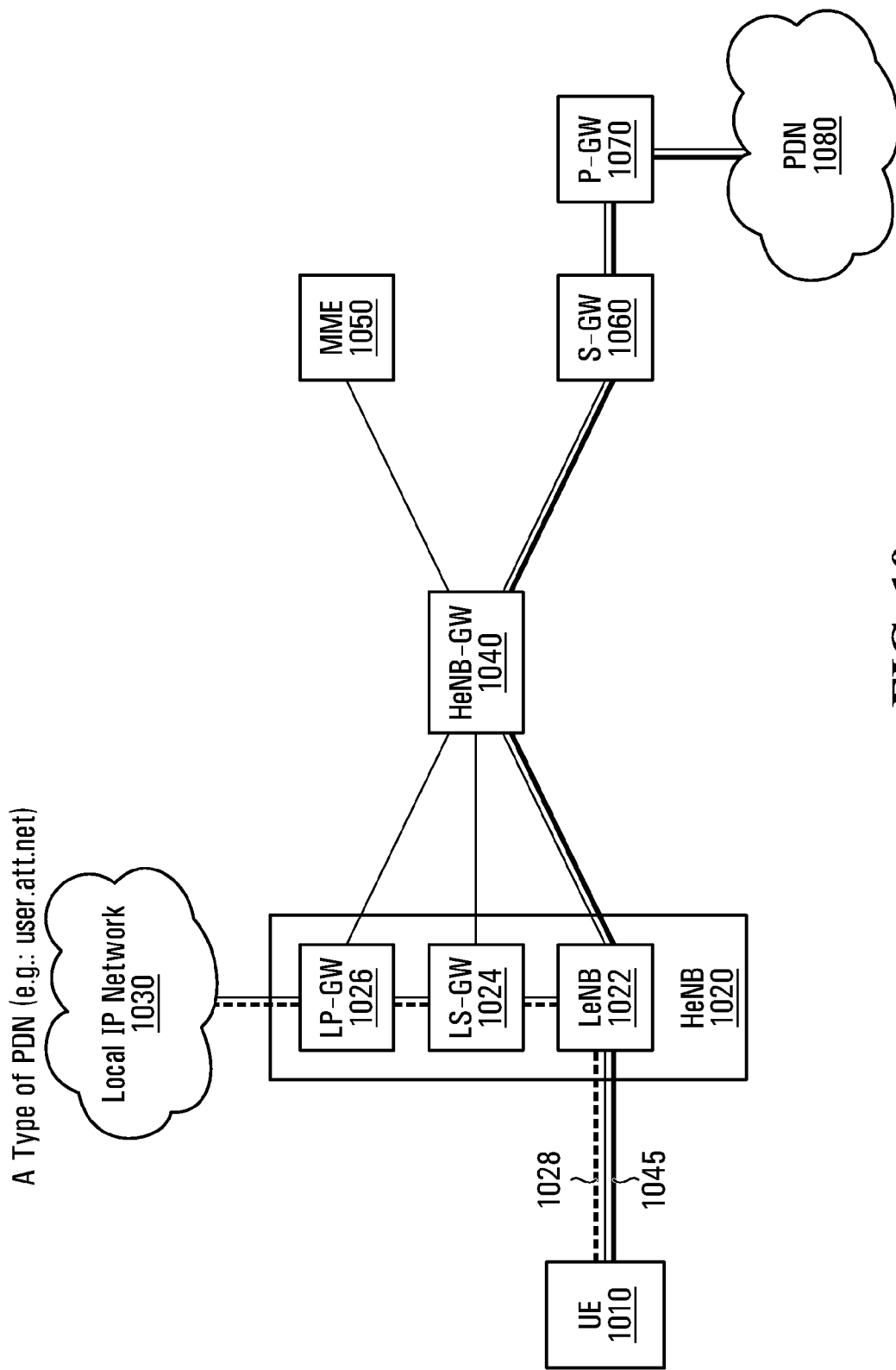
FIG. 10 is a schematic diagram of traffic flows in an HeNB subsystem according to an embodiment of the application.

After establishing LIPA/SIPTO PDN connection, the user plane traffic flows will be transferred as shown in FIG. 10.

User plane data traffic for LIPA and SIPTO does not go through the core network. The traffic goes from UE 1010 through LeNB 1022, LS-GW 1024, and LP-GW 1026, which are illustrated to all be collocated in HeNB 1020, as indicated with dashed line 1028. If the UE has an additional PDN connection which is non-LIPA, non-SIPTO, the traffic goes through the HeNB-GW 1040, S-GW 1060 and P-GW 1070 to the core PDN 1080 as indicated with solid line 1045 in FIG. 10.

Remote Access to Local IP Resources

Figure 11:
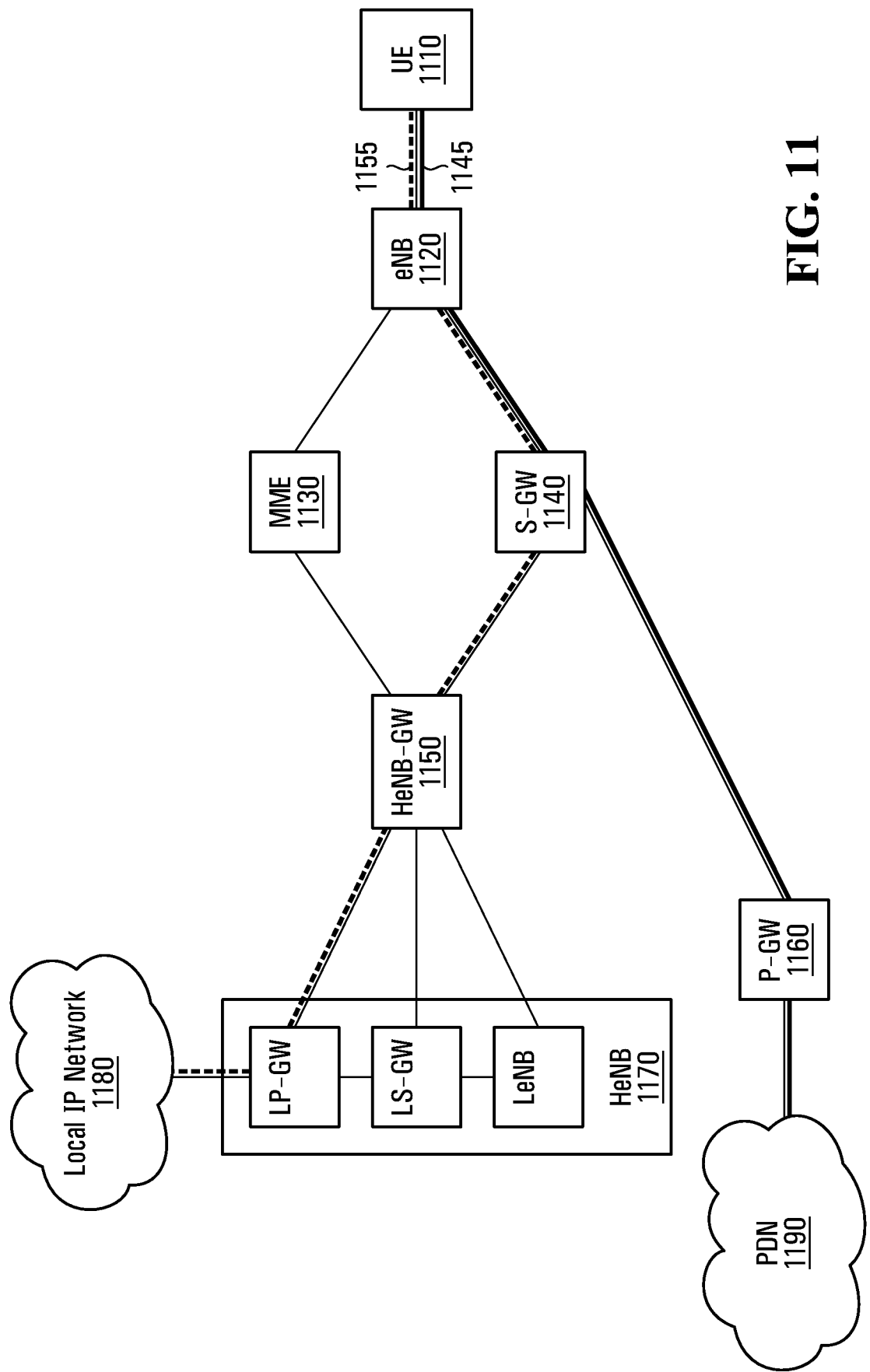
FIG. 11 is a schematic diagram illustrating remote access to a Local IP network while the UE is located out of HeBN coverage.

In FIG. 11, the UE 1110 has established two PDN connections, one towards a non-LIPA, non-SIPTO PDN, which is depicted with the solid line 1145, and the other connection towards a local IP network, which is represented by the dashed line 1155.

It is possible that a UE attempts to access the local IP network which is directly accessible from the HeNB while the UE is attached to a macro level eNB or a HeNB that does not have direct access to the local IP network the UE attempts to access. An example of this would be where a UE attempts to send a print job to a printer located in the local IP network while the UE is on the go. In such a situation, the UE sends a PDN CONNECTION REQUEST message towards the MME. An indicator in the message indicates that the UE desires a PDN connection towards the local IP network. The MME may verify that the UE is authorized to access the requested local IP network and determines the IP address of the LP-GW which can provide access to the required local IP network. The identity of the LP-GW associated with the indicator is likely to be statically specified in the UE contexts. The MME sends a CREATE SESSION REQUEST message to the S-GW in the core network which has been serving the UE. The message contains the IP address of the destination LP-GW.

Providing Service Continuity for LIPA/SIPTO

It is possible that a UE moves in to/out of the HeNB's coverage while the UE has one or more active PDN connections for LIPA and/or SIPTO. The following section describes an example of how the service continuity is provided in such a case. It is assumed that the capability to move out of the HeNB's coverage while the UE has one or more active PDN connections for LIPA and/or SIPTO is deployed first. If a PS HO occurs, from said HeNB's coverage to a GERAN network, due to a CSFB (CS Fall Back) call, due to DTM (Dual Transfer Mode) the PS activity is suspended. Typically, the DTM condition does not occur when the PS HO is to a UTRAN network. If LIPA continuity is enabled, the LIPA connections continue to be useable if the HO is to UTRAN. If the HO is to GERAN due a CS call and due to DTM, the LIPA connections may be suspended.

Handover (HO) from HeNB to Macro eNB Without S-GW HO (S-GW Merge)

The example is directed to a situation where the UE moves from the HeNB to a macro level eNB or another HeNB. Please note that the target system is referred to a target eNB for simplicity. It does not exclude the possibility that the target system can be another HeNB. In the example it is assumed that the UE has at least one PDN connection for LIPA/SIPTO and one PDN connection to the core network which is non-LIPA, non-SIPTO.

Figure 12:
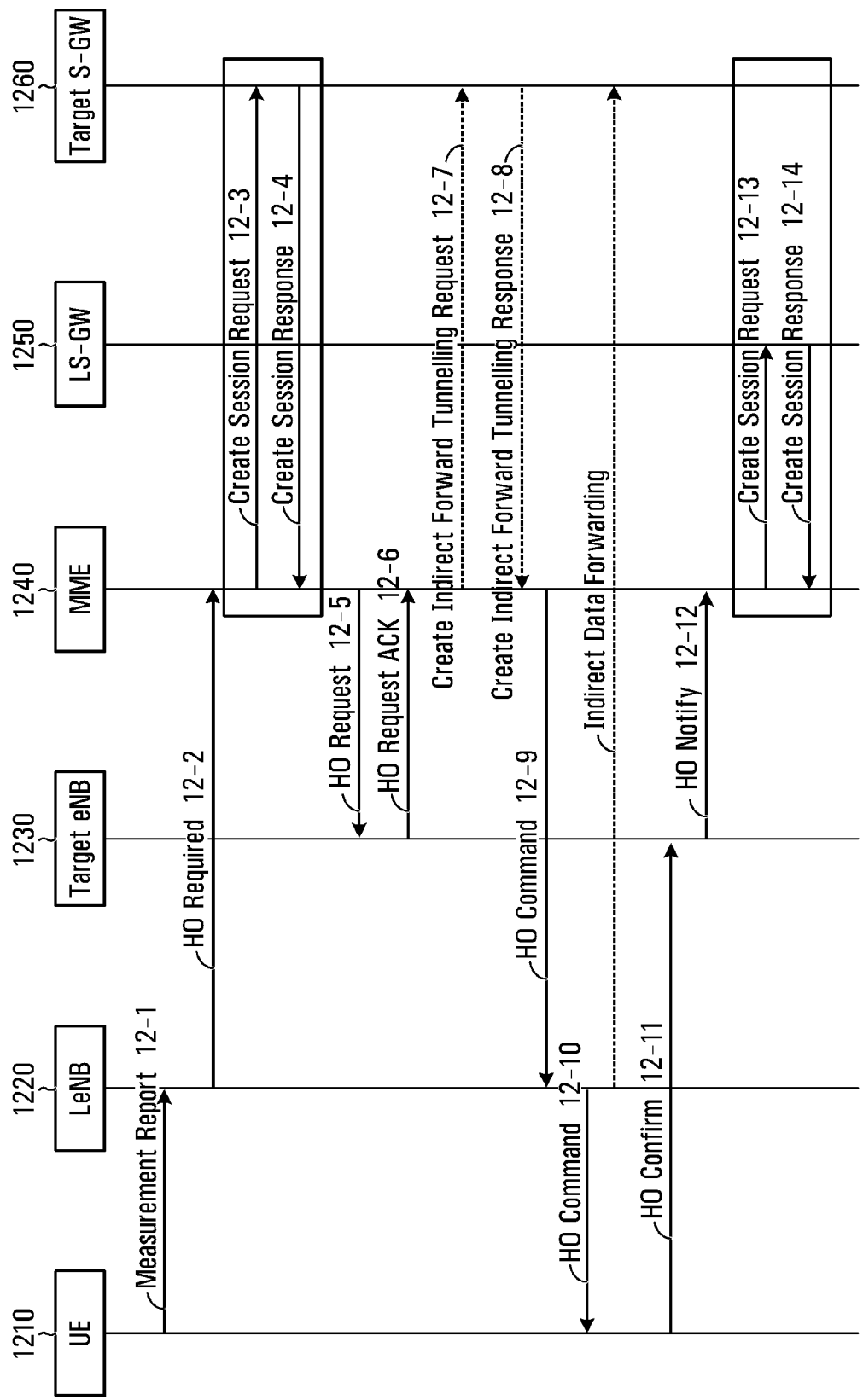
FIG. 12 is a signal flow diagram for handover from HeNB to eNB without serving gateway handover according to an embodiment of the application.

FIG. 12 shows the procedure for the handover from the HeNB to the target eNB without a core S-GW handover. Steps that are particularly relevant to the solutions described above are described in detail. Steps of the network attach procedure that are not particularly affected by the solutions described herein and may have known procedures will not be described in detail.

It is assumed in this example that the handover does not involve an MME handover. The S-GW which is depicted as the target S-GW in FIG. 12 is the S-GW that has been serving one or more non-LIPA, non-SIPTO connections. Though the core network source S-GW is also the target S-GW for the UE, the target S-GW does not have context information of the PDN connection and EPS bearers for the LIPA/SIPTO traffic since the connection has been served by the LS-GW. Therefore, the context information of PDN connection and EPS bearers for the LIPA/SIPTO should be created or transferred to the target S-GW, which is performed in signal flows 12-3 and 12-4. The existing context information on the LS-GW should be deleted from the LS-GW, which is done in signal flows 12-13 and 12-14. This can be called partial S-GW HO or combined S-GW HO, which merges context information of two or more of the source S-GWs into one of the source S-GWs as the target S-GW, is a new concept in the EPS system. After performing the HO, the UE can remotely access the local IP resources as shown in FIG. 11. The remote access is facilitated by the connection request that was authorized and established when the UE was connected to the HeNB subsystem that enabled access to the local IP resources.

HO from HeNB to Macro eNB with S-GW HO (2 to 1 S-GW HO)

When the UE moves from the HeNB to the target eNB (either macro eNB or another HeNB, which does not belong to the source HeNB subsystem), it may be possible that the S-GW in the core network is re-selected if the target eNB is outside of the service area of the source S-GW. In such a case, the context information from both source LS-GW and source S-GW in the core network are merged and handed over to the single target S-GW.

Figure 13:
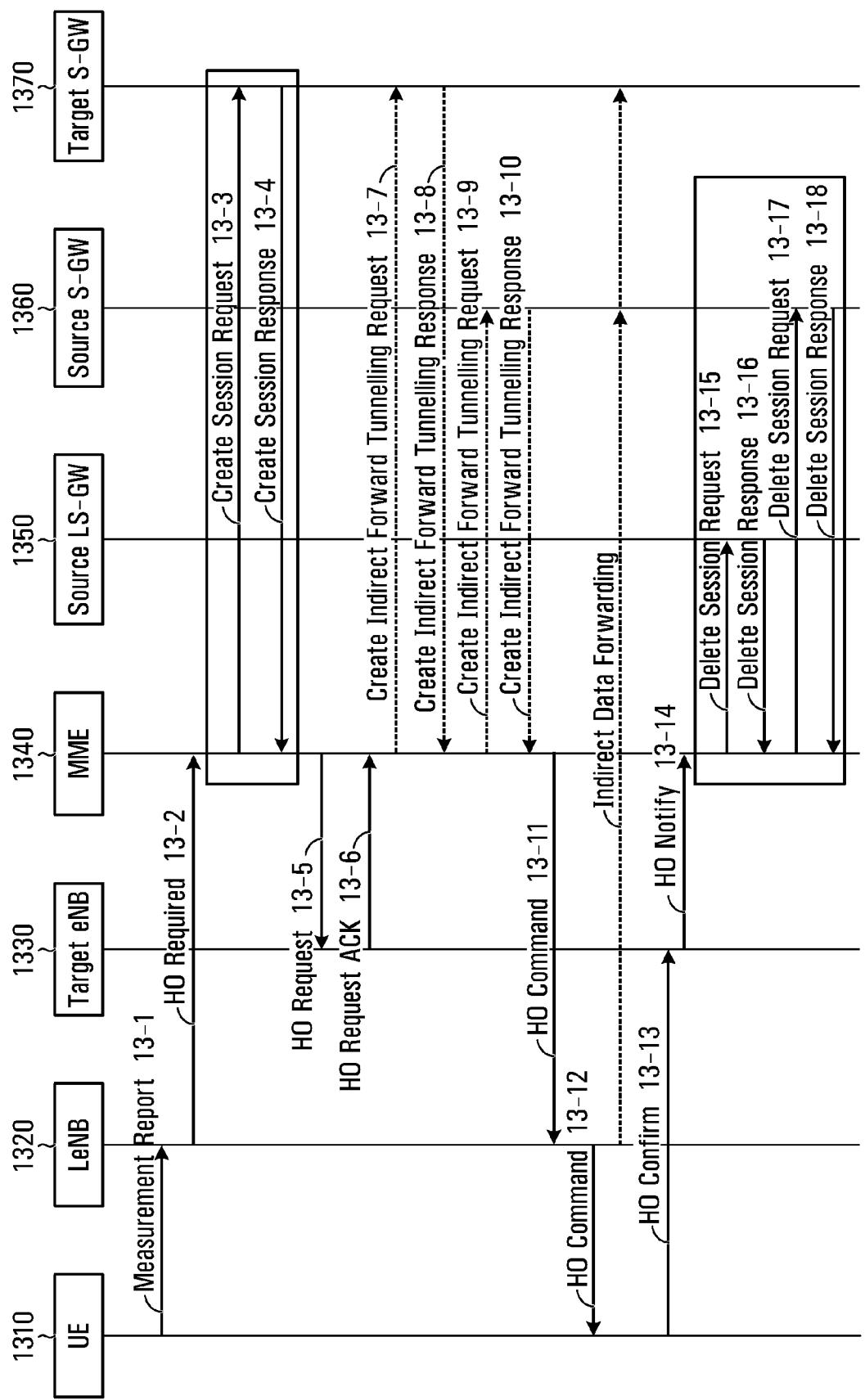
FIG. 13 is a signal flow diagram for handover from HeNB to eNB with serving gateway handover according to an embodiment of the application.

FIG. 13 shows the procedure for the handover from the HeNB to the target eNB with a core S-GW handover. Steps that are particularly relevant to the solutions described above are described in detail. Steps of the network attach procedure that are not particularly affected by the solutions described herein and may have known procedures will not be described in detail.

Resource preparation at the target S-GW is done in signal flows 13-3 and 13-4 and releasing the resources at the source S-GWs is done in signal flows 13-15 through 13-18.

HO from Macro eNB to HeNB (S-GW Split)

Figure 14:
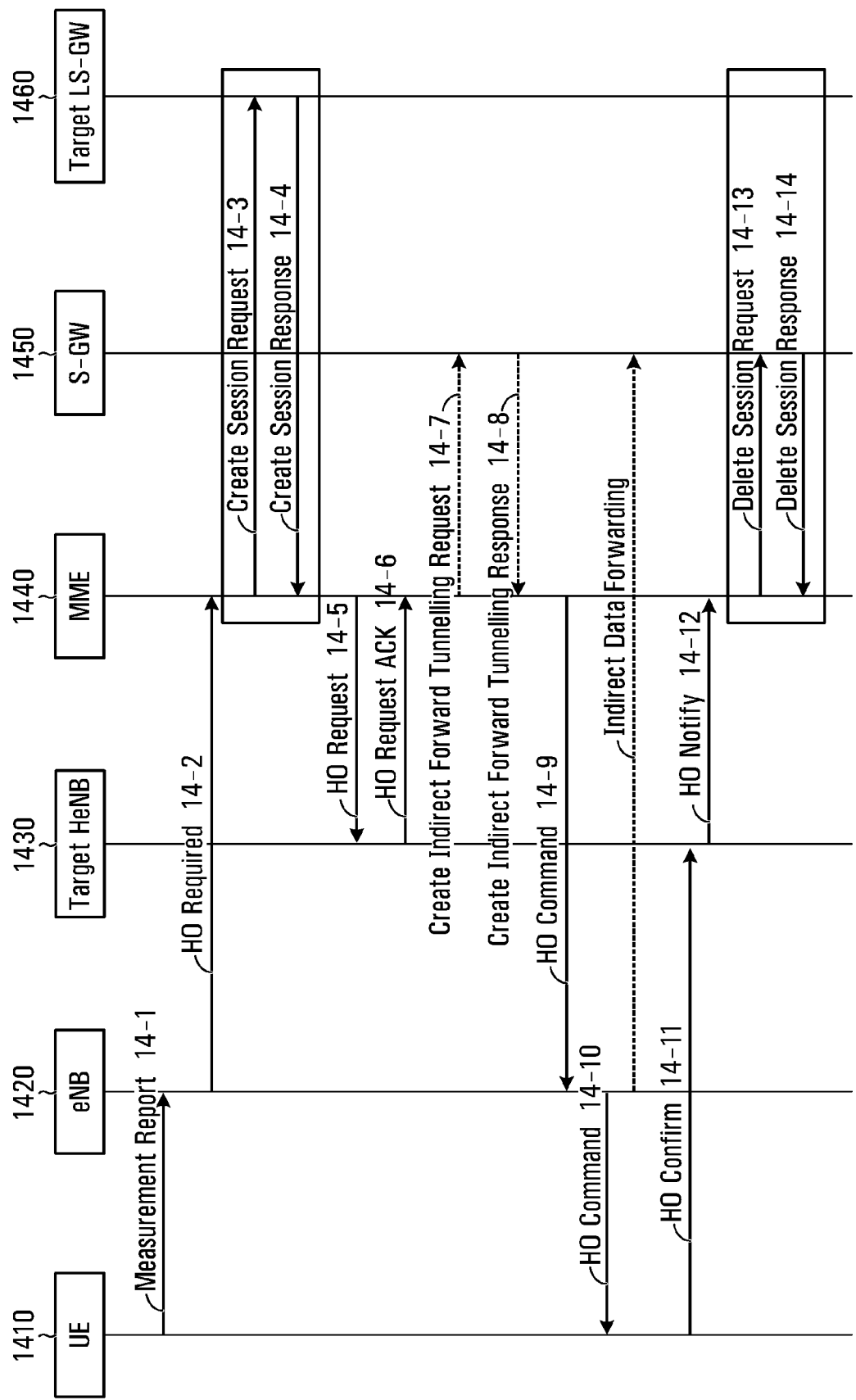
FIG. 14 is a signal flow diagram for handover from macro eNB to HeNB according to an embodiment of the application.

When a UE is remotely accessing the local IP resources as shown in FIG. 11, if the UE performs HO towards the HeNB, in some embodiments, connectivity for the LIPA is maintained. In order to keep the service continuity in an efficient way, a partial S-GW HO splits the context information on the source S-GW into two S-GWs: one in the HeNB subsystem and one in the core network. The context information for LIPA or SIPTO, or both is created in LS-GW and is deleted from the S-GW in the core network. The procedure is depicted in FIG. 14. After performing this HO, the UE can access LIPA/SIPTO connection as well as the non-LIPA, non-SIPTO connection as presented in FIG. 10. Multiple HeNB may support the same LP GWs and LS GWs. Multiple LS GWs may support the same LP GWs. A MME must be able to determine if a UE performs HO such that a LS GW can be selected that is supported by the LP GW which currently terminates the connectivity for the LIPA. Selection of such a LS GW may warrant the S-GW Split.

Inter-Radio Access Technology (I-RAT) HO

A UE attached to a HeNB may perform inter-RAT HO for various reasons. A particular example is that the UE performs an inter-RAT HO for CS Fall-back (CSFB). In such an example, the UE has one or more LIPA/SIPTO PDN connections before it performs IRAT HO. The UE may have been served by more than one S-GW, for example a LS-GW in the HeNB subsystem and a S-GW in the core network. If the UE hands over to a 2G/3G network, a reference point S4 between SGSN (and optionally GGSN) and the S-GW should be established. As only one S-GW may be used for this situation, the S-GW merging procedure, described in detail above, may be performed during the IRAT HO preparation phase.

Figure 15:
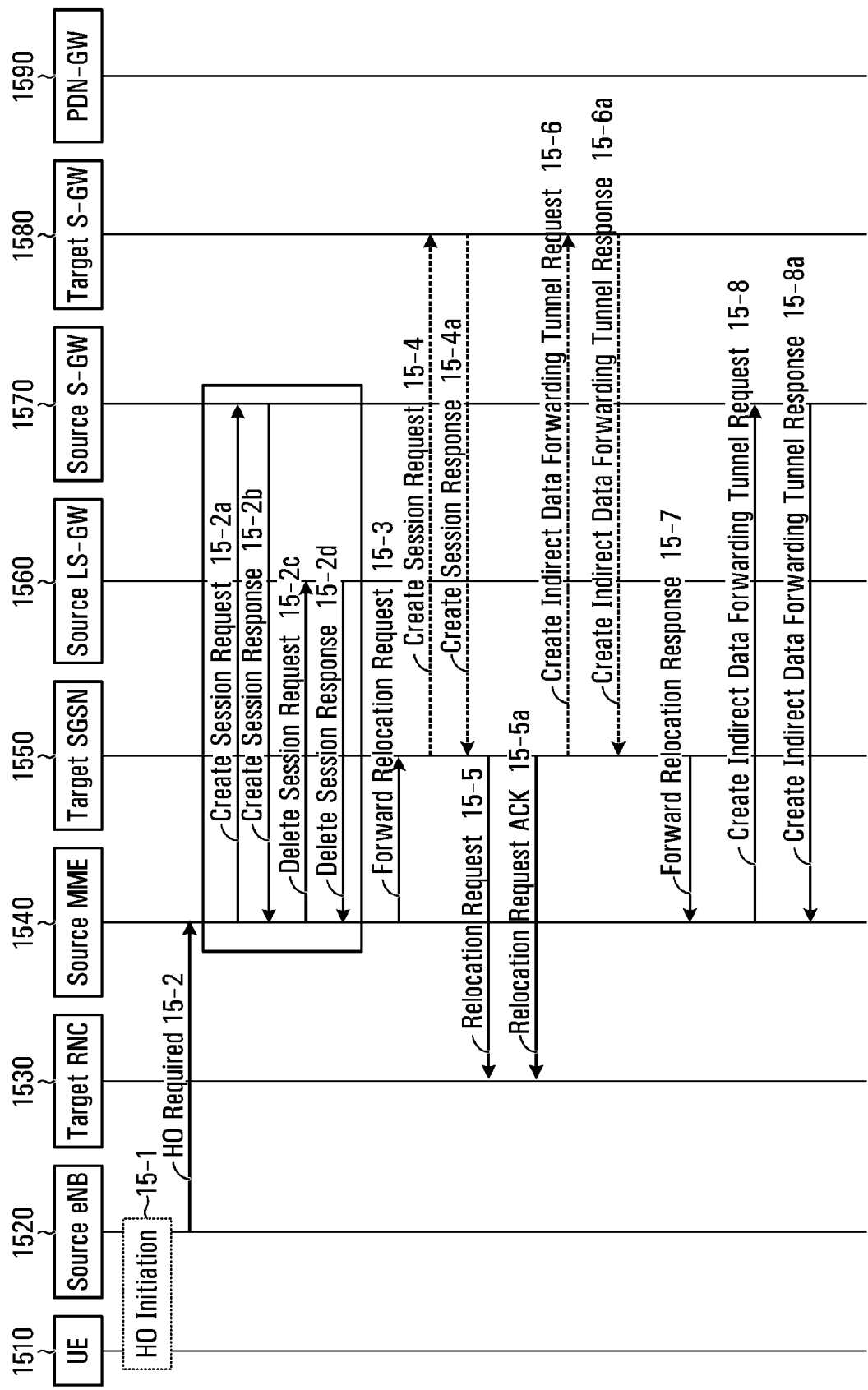
FIG. 15 is a signal flow diagram for preparation of inter-radio access technology (IRAT) handover when UE has been served by two S-GWs according to an embodiment of the application.

A detailed example will now be described with reference to FIG. 15. Steps that are particularly relevant to the solutions described above are described in detail. Steps of the network attach procedure that are not particularly affected by the solutions described herein and may have known procedures will not be described in detail. These steps can be found in 3GPP TS 23.401.

In the example it is to be assumed that the UE is served by more than one S-GWs and has at least one PDN connection with each S-GW. In addition, the UE may have been served by two S-GWs, the LS-GW in the HeNB subsystem and the S-GW in the core network. In the UE HO to a 2G/3G network, the connection between SGSN (and optionally GGSN) and S-GW is be established.

In signal flow 15-2a, on receiving the Handover Required message from eNodeB, the MME checks if the UE is served by more than one S-GW. If true, the MME sends a message (e.g. a Create Session Request message) to the source S-GW in the core network to prepare the local resources for the PDN connections and EPS bearers. The message may include information such as IMSI, MME Tunnel Endpoint Identifier for Control Plane, MME Address for Control plane, PDN GW address(es) for user plane, PDN GW UL TEID(s) for user plane, PDN GW address(es) for control plane, and PDN GW TEID(s) for control plane and the Protocol Type over S5/S8.

In signal flow 15-2b, the source S-GW allocates its local resources and returns a message (e.g. a Create Session Response message) including e.g. Serving GW address(es) for user plane, Serving GW UL TEID(s) for user plane, Serving GW Address for control plane, Serving GW TEID for control plane) message to the source MME.

In signal flow 15-2c, the source MME sends a message requesting that the resource associated with the session are to be deleted (e.g. the Delete Session Request message including the Cause and TEID to the source LS-GW. The cause value may be set to indicate the session is merged or reallocated. In one example, the cause could be set to "LIPA-context-reallocation". In some embodiments the source LS-GW will not initiate a delete procedure towards the PDN GW based on the Cause value.

In signal flow 15-2d, the source LS-GW release the resource and sends back messages, such as Delete Session Response messages.

Figure 28:
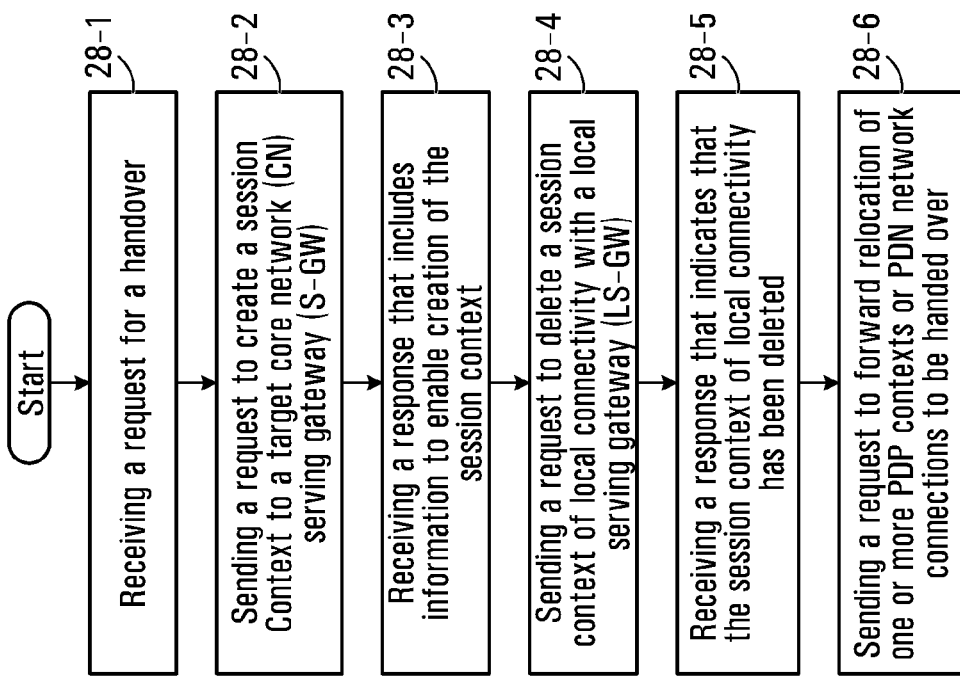
FIG. 28 is a flow chart illustrating another example of a method according to an embodiment described herein.

A example method for use in a mobility management entity of a network in which simultaneous use of multiple serving gateways is supported will now be described with reference to FIG. 28. A first step 28-1 involves receiving a request for a handover (HO). A second step 28-2 sending a request to create a session context to a target serving gateway (S-GW). A third step 28-3 receiving a response that includes information to enable creation of the session context. A fourth step 28-4 sending a request to delete a session context of local connectivity with a local serving gateway (LS-GW). A fifth step 28-5 receiving a response that indicates that the session context of local connectivity has been deleted. A sixth step 28-6 sending a request to forward relocation of one or more PDP contexts or PDN connections to be handed over.

Particular Examples and Message Formats Related to GERAN/UTRAN

PDP Context Activation Procedure

Figure 16:
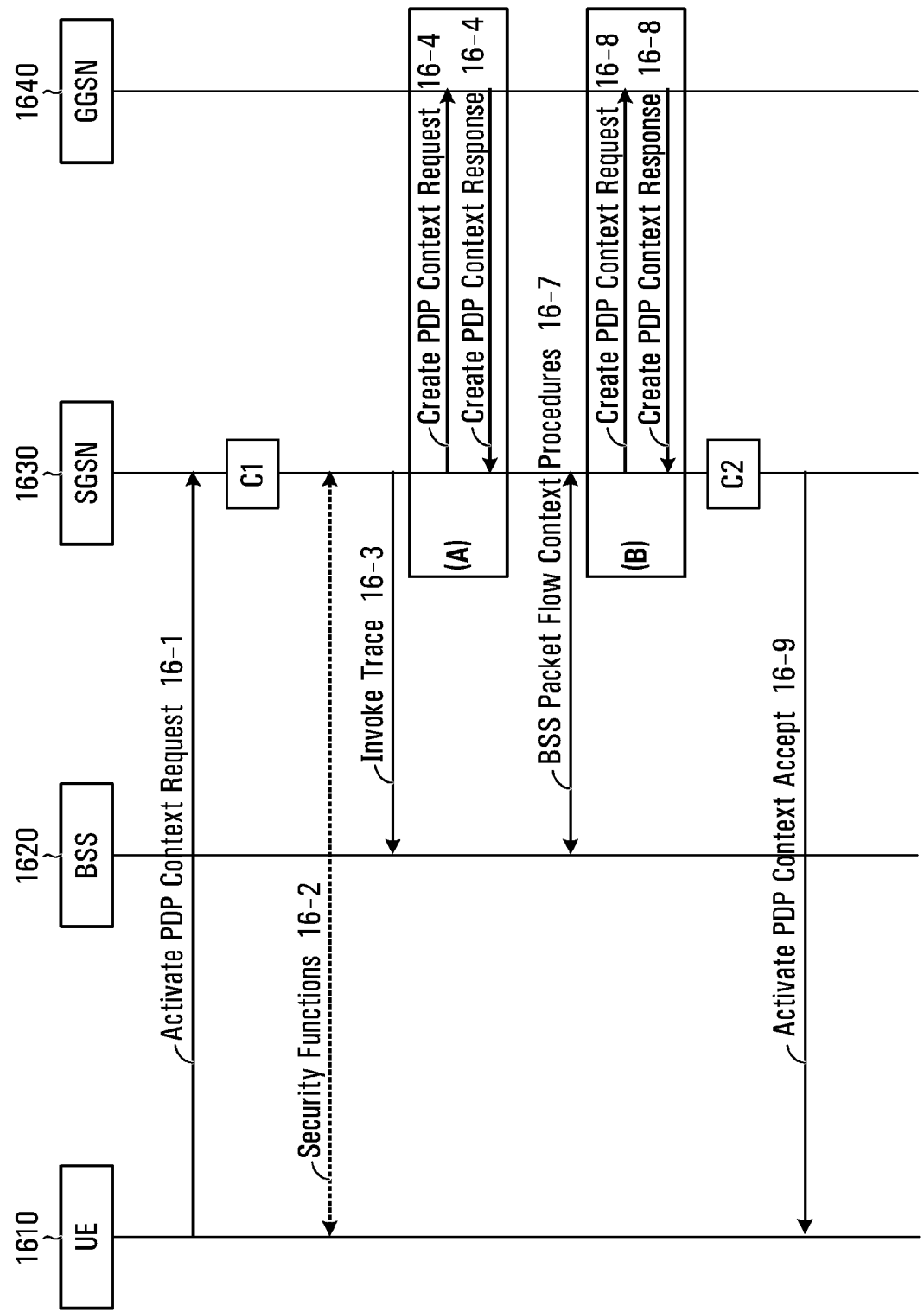
FIG. 16 is a signal flow diagram for a packet data protocol (PDP) context activation procedure for A/Gb mode according to an embodiment of the application.
Figure 17:
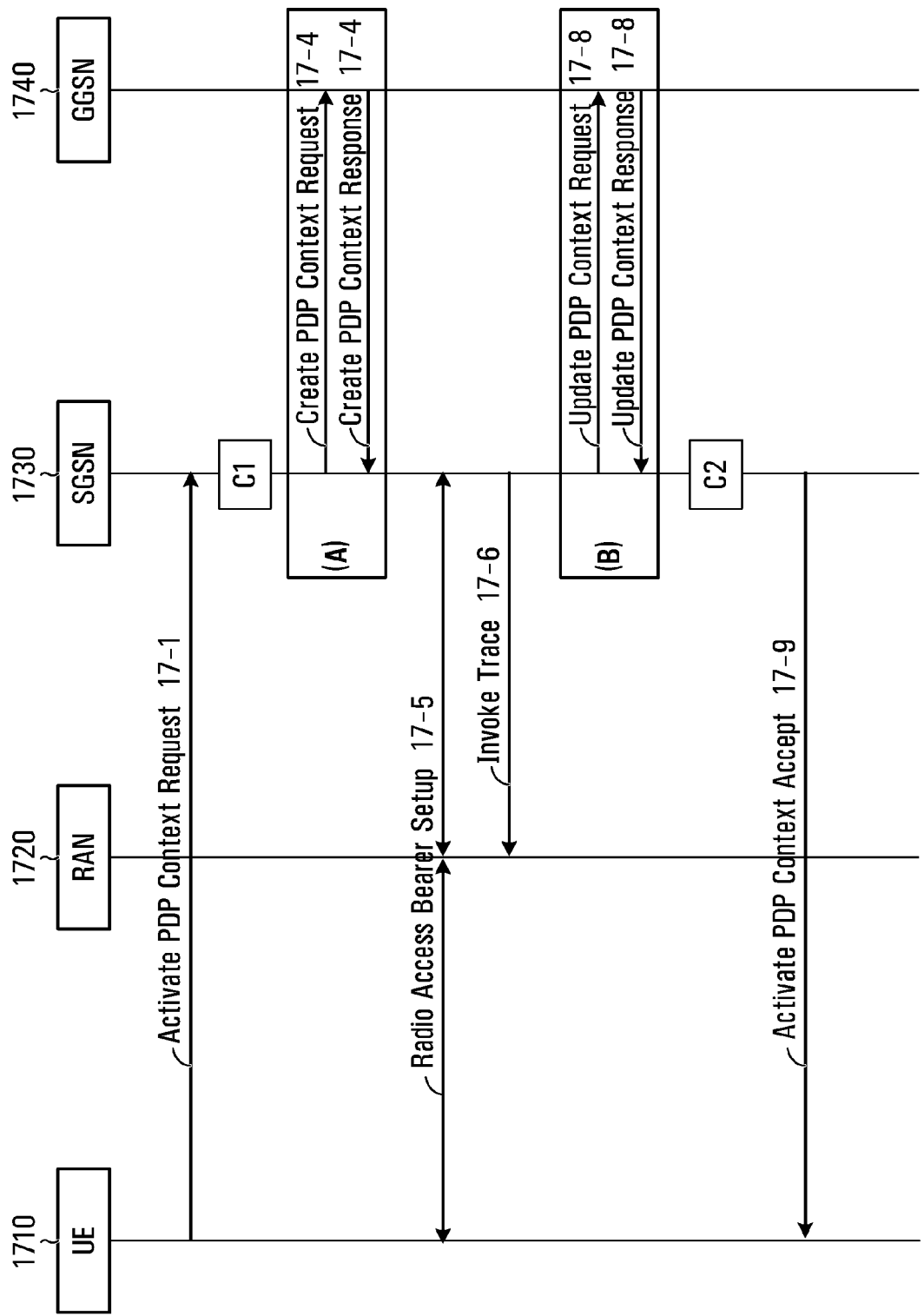
FIG. 17 is a signal flow diagram for a PDP context activation procedure for Iu mode according to an embodiment of the application.

A PDP Context Activation procedure is illustrated in FIG. 16 for A/Gb mode and in FIG. 17 for Iu mode. Steps that are particularly relevant to the solutions described above are described in detail. Steps of the network attach procedure that are not particularly affected by the solutions described herein and may have known procedures will not be described in detail.

In signal flows 16-1 and 17-1, the UE sends a message e.g. an ACTIVATE PDP CONTEXT REQUEST message, to the SGSN. The message may include information such as, but not limited to: NSAPI; TI; PDP Type; PDP Address; Access Point Name; QoS Requested; Protocol Configuration Options; Request Type; and Requested Connectivity Type.

Activate PDP Context Request

An example of an ACTIVATE PDP CONTEXT REQUEST message will now be described with reference to Table 7. This message is sent by the MS to the network to request activation of a PDP context. This message may be used in a direction from the UE to the network.

TABLE 7

| ACTIVATE PDP CONTEXT REQUEST message content | | |
|---|---|---|
| IEI | Information Element | Type/Reference |
| | Requested Connectivity Type | Connectivity Type |

Requested Connectivity Type

This IE may be included in the message if the UE requests a specific type of CSG connectivity (e.g. LIPA) for the PDP Context.

SGW/PGW/GGSN Selection Function (3GPP Accesses)

In some embodiments, at PDP Context activation, it is possible for the SGSN to use the UE capability as an input to select GGSN, or a SGW and PGW. The SGSN may use the Requested Connectivity Type indication to derive the GGSN address when a CSG Cell is used.

An example of the contents of the Connectivity Type in the Type/Reference field is provided below. It is to be understood that the particular values for particular Connectivity Types are merely illustrative in nature and not intended to limit the scope of the subject matter involved. Furthermore, while the number of bits is limited to three in the example, in some embodiments there may be more or less than three bits. It should also be understood that the Connectivity Types included is not necessarily a complete list of combinations and permutations of all the Connectivity Types possible.

Figure 18:
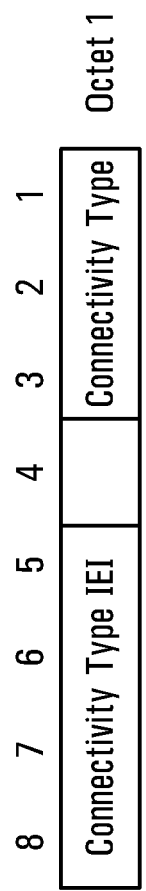
FIG. 18 is a schematic diagram of a connectivity type information element (IE) according to an embodiment of the application.

The purpose of the Connectivity Type information element is to identify the type of connectivity supported or selected. In some embodiments, the Connectivity Type information element is coded as shown in FIG. 18 and Table 8. The Connectivity Type is a type 1 information element with 1 octet length.

TABLE 8

Connectivity Type information element
Connectivity Type

| Bit | | | |
|---|---|---|---|
| 3 | 2 | 1 | |
| 0 | 0 | 0 | Remote connectivity |
| 0 | 0 | 1 | LIPA connectivity |
| 0 | 1 | 0 | SIPTO connectivity |
| 0 | 1 | 1 | Remote connectivity, LIPA connectivity |
| 1 | 0 | 0 | Remote connectivity, SIPTO connectivity |
| 1 | 0 | 1 | LIPA connectivity, SIPTO connectivity |
| 1 | 1 | 0 | Remote connectivity, LIPA connectivity, SIPTO connectivity |
| 1 | 1 | 1 | Reserved |

The MS may use APN to select a reference point to a certain packet data network and/or to select a service. APN is a logical name referring to the packet data network and/or to a service that the subscriber wishes to connect to.

The UE includes the Requested Connectivity Type indication in order to indicate the type of connectivity requested for the PDP context (e.g. LIPA, SIPTO, etc.).

Referring once again to FIGS. 16 and 17, in signal flows 16-4 and 17-4, the SGSN validates the Activate PDP Context Request using PDP Type (optional), PDP Address (optional), and APN (optional) and the Requested Connectivity Type (optional) provided by the MS and the PDP context subscription records.

The SGSN validate the UE request considering also the Requested Connectivity Type and the CSG ID of the CSG cell the UE is connected to. The SGSN determines whether the type of connectivity requested by the UE is authorized for the requested APN and the CSG ID based on network settings and the user profile.

In the event the SGSN decides that the type of connectivity requested by the UE is not acceptable, the SGSN can reject the PDP context activation request using a PDP CONTEXT ACTIVATION REJECT message including an appropriate error cause.

In some embodiments, the SGSN includes the Supported Connectivity Type to indicate the type of CSG connectivity supported.

In some embodiments, the SGSN includes an indication of whether the requested connectivity type is not acceptable for the current APN or for which APNs it is not acceptable.

In some embodiments, the SGSN includes an indication whether the requested connectivity type is not acceptable in all the cells in the same CSG.

If the SGSN decides that the type of connectivity requested by the UE is not acceptable, the SGSN can select an acceptable type of connectivity for the UE for the current APN and the current CSG ID.

In some embodiments, the SGSN uses the Connectivity Type indication (set to either the Requested Connectivity Type indication or the selected type of connectivity) to derive the GGSN address when a CSG Cell is used.

The SGSN sends a CREATE PDP CONTEXT REQUEST message to the affected GGSN. The CREATE PDP CONTEXT REQUEST message may include information such as, but not limited to: PDP Type; PDP Address; Access Point Name; QoS Negotiated; TEID; NSAPI; MSISDN; Selection Mode; Charging Characteristics; Trace Reference; Trace Type; Trigger Id; OMC Identity; Protocol Configuration Options; serving network identity; Maximum APN Restriction IMEISV; CGI/SAI; RAT type; S-CDR CAMEL information; CGI/SAI/RAI change support indication; NRSN; Dual Address Bearer Flag; and Connectivity Type.

In some embodiments, the SGSN includes the Connectivity Type when using a CSG cell in order to indicate the type of connectivity requested for the PDP context (e.g. LIPA, SIPTO, etc.).

The GGSN then returns a CREATE PDP CONTEXT RESPONSE message to the SGSN. The CREATE PDP CONTEXT RESPONSE message may include information such as, but not limited to: TEID; PDP Type; PDP Address; Protocol Configuration Options; QoS Negotiated; Charging Id; Prohibit Payload Compression; APN Restriction; Cause; CGI/SAI/RAI change report required; BCM; Selected Connectivity Type. The Prohibit Payload Compression indicates that the SGSN should negotiate no data compression.

In some embodiments, the GGSN returns an indication of the Selected Connectivity Type in order to indicate the type of connectivity (e.g. LIPA, SIPTO, etc.) selected for the current PDP Context.

In signal flows 16-9 and 17-9, the SGSN returns an ACTIVATE PDP CONTEXT ACCEPT message to the MS. The ACTIVATE PDP CONTEXT ACCEPT message may include information such as, but not limited to: PDP Type; PDP Address; TI; QoS Negotiated; Radio Priority; Packet Flow Id; Protocol Configuration Options; Supported Connectivity Type; Selected Connectivity Type; and CSG Applicability Indication.

Successful PDP Context Activation Initiated by the Mobile Station

In some embodiments, the network informs the UE of the type of connectivity supported if the UE is connected to a CSG cell, in order to indicate the type of connectivity (e.g. LIPA, SIPTO, etc.) supported by the current CSG cell. The network informs the UE of the type of connectivity selected (e.g. LIPA, SIPTO, etc.). The network includes an indication of whether the type of connectivity supported applies only to the current CSG cell or to the current CSG ID, if the UE is connected to a CSG cell. The network informs the UE of whether the requested connectivity type is not acceptable for the current APN or for which APNs it is not acceptable if the selected connectivity is different from the connectivity type requested by the UE, if the UE is connected to a CSG cell.

In a UE the types of connectivity as informed by the network supported may be provided to the upper layers.

When the UE is in a CSG cell and receives an ACTIVATE PDP CONTEXT ACCEPT message, and the network informs the UE about the support of specific features, such the types of connectivity supported or selected. These types of connectivity supported and selected may be provided to the upper layers.

Activate PDP Context Accept

An example of an ACTIVATE PDP CONTEXT ACCEPT message will now be described with reference to Table 9. This message is sent by the network to the MS to acknowledge activation of a PDP context. This message may be used in a direction from the network to the UE.

TABLE 9

ACTIVATE PDP CONTEXT ACCEPT message content

| IEI | Information Element | Type/Reference |
|---|---|---|
| | Supported Connectivity Type | Connectivity Type |
| | Selected Connectivity Type | Connectivity Type |
| | APN Applicability Indication | |
| | CSG Applicability Indication | |

Supported Connectivity Type

The network may include this IE if the UE is attaching to a CSG cell, in order to indicate the type of connectivity supported by the current CSG cell.

Selected Connectivity Type

This IE may be included in order to inform the UE of the Connectivity Type selected by the network.

APN Applicability Indication

This IE may be included if the network indicates for what APNs the type of connectivity requested by the UE is not acceptable. If the network includes an indication that one or more APNs are included, this indicates that the type of connectivity requested by the UE is not acceptable for all the APNs provided. If the network includes an indication that the CSG ID is not included, this indicates that the Supported Connectivity Type applies only to the current APN.

CSG Applicability Indication

The network may include this IE if the UE is attaching to a CSG cell and if the network includes the Supported Connectivity Type IE or the Selected Connectivity Type IE. If the network includes an indication that the CSG ID is included, this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the Type/Reference field is that described in Table 8.

The SGSN includes a Supported Connectivity Type if the UE is connecting to a CSG cell, in order to indicate to the UE the type of connectivity (e.g. LIPA, SIPTO, etc.) supported by the current CSG cell.

The SGSN returns an indication of the Selected Connectivity Type if the UE is connecting to a CSG cell in order to indicate the type of connectivity (e.g. LIPA, SIPTO, etc.) supported by the current PDP Context.

The SGSN includes an indication of whether the requested connectivity type is not acceptable for the current APN or for which APNs it is not acceptable if the Selected Connectivity Type is different from the Requested Connectivity Type.

The SGSN includes the CSG Applicability Indication if the indications in the Selected Connectivity Type and/or the Supported Connectivity Type apply only to the current CSG cell or to the current CSG ID.

PDP Context Activation Procedure Alternate Embodiment

In signal flows 16-1 and 17-1, the UE sends an ACTIVATE PDP CONTEXT REQUEST message to the SGSN. The ACTIVATE PDP CONTEXT REQUEST message may include information such as, but not limited to: NSAPI; TI; PDP Type; PDP Address; Access Point Name; QoS Requested; Protocol Configuration Options; Request Type; and Requested Connectivity Type.

Referring once again to FIGS. 16 and 17, in signal flows 16-4 and 17-4, the SGSN validates the Activate PDP Context Request using PDP Type (optional), PDP Address (optional), and APN (optional) and the Requested Connectivity Type (optional) provided by the MS and the PDP context subscription records.

The SGSN validate the UE request considering also the Requested Connectivity Type and the CSG ID of the CSG cell the UE is connected to. The SGSN determines whether the type of connectivity requested by the UE is authorized for the requested APN and the CSG ID based on network settings and the user profile.

If the SGSN decides that the type of connectivity requested by the UE is not acceptable, the SGSN selects an acceptable type of connectivity for the UE for the current APN and the current CSG ID.

The SGSN uses either the Requested Connectivity Type indication or the selected type of connectivity to derive the GGSN address when a CSG Cell is used.

The SGSN sends a CREATE PDP CONTEXT REQUEST message to the affected GGSN. The CREATE PDP CONTEXT REQUEST message may include information such as, but not limited to: PDP Type; PDP Address; Access Point Name; QoS Negotiated; TEID; NSAPI; MSISDN; Selection Mode; Charging Characteristics; Trace Reference; Trace Type; Trigger Id; OMC Identity; Protocol Configuration Options; serving network identity; Maximum APN Restriction IMEISV; CGI/SAI; RAT type; S-CDR CAMEL information; CGI/SAI/RAI change support indication; NRSN, Dual Address Bearer Flag; and Connectivity Type.

The GGSN then returns a CREATE PDP CONTEXT RESPONSE message to the SGSN. The CREATE PDP CONTEXT RESPONSE message may include information such as, but not limited to: TEID; PDP Type; PDP Address; Protocol Configuration Options; QoS Negotiated; Charging Id; Prohibit Payload Compression; APN Restriction; Cause; CGI/SAI/RAI change report required; BCM; and Selected Connectivity Type.

In signal flows 16-9 and 17-9, the SGSN returns an ACTIVATE PDP CONTEXT ACCEPT message to the MS. The ACTIVATE PDP CONTEXT ACCEPT message may include information such as, but not limited to: PDP Type; PDP Address; TI; QoS Negotiated; Radio Priority; Packet Flow Id; Protocol Configuration Options; Supported Connectivity Type; Selected Connectivity Type; and CSG Applicability Indication.

Information Storage

This section describes information storage structures required for GPRS, and the recovery and restoration procedures needed to maintain service if inconsistencies in databases and lost or invalid database information occur.

HLR/HSS

Table 10 shows the GPRS/EPS subscription data contained in the HLR/HSS.

TABLE 10

HLR/HSS GPRS/EPS Subscription Data

| Field | Description |
|---|---|
| IMSI | IMSI is the main reference key. |
| CSG Subscription Data | The CSG Subscription Data is a list of CSG IDs per PLMN and for each CSG ID optionally an associated expiration date which indicates the point in time when the subscription to the CSG ID expires; an absent expiration date indicates unlimited subscription. The CSG Subscription Data contains also an indication of the type of connectivity supported by the UE for CSG cells (LIPA, SIPTO, |

TABLE 10-continued

HLR/HSS GPRS/EPS Subscription Data

| Field | Description |
|---|---|
| | etc.). The information can be provided on a per CSG ID and/or on a per APN basis or on a per UE basis |
| | Each subscription profile may also contain one or more APN configurations: |
| PDP/EPS Bearer Context Identifier | Index of the PDP/EPS Bearer context. |
| PDP Type | PDP type, e.g. PPP or IP (IPv4, IPv6, IPv4v6). |
| PDP Address | PDP address, e.g., an IP address. This field may be empty if dynamic addressing is allowed. |
| Access Point Name | A label according to DNS naming conventions describing the access point to the packet data network. For S4-SGSN the APN to be used as default APN is indicated. |
| Connectivity Type | Specifies the type of connectivity authorized for the subscriber for this PDN subscription (e.g. LIPA, SIPTO, LIPA and SIPTO, etc.) |

SGSN

The SGSN maintains SGSN MM context and PDP/EPS bearer context information for UEs. Table 11 shows the context fields for one UE.

TABLE 11

SGSN MM and PDP/EPS Bearer Contexts

| Field | Description | A/Gb mode | Iu mode |
|---|---|---|---|
| IMSI | IMSI is the main reference key. | X | X |
| CSG Subscription Data | The CSG Subscription Data is a list of CSG IDs for the visiting PLMN and for each CSG ID optionally an associated expiration date which indicates the point in time when the subscription to the CSG ID expires; an absent expiration date indicates unlimited subscription. The CSG Subscription Data contains also an indication of the type of connectivity supported by the UE for CSG cells (LIPA, SIPTO, etc.). The information can be provided on a per CSG ID and/or on a per APN basis or on a per UE basis | | X |
| For each active PDN connection with GGSN (using Gn/Gp) or with S-GW (using S4): | | | |
| APN in Use | The APN currently used. This APN may be composed of the APN Network Identifier and the APN Operator Identifier. | X | X |
| Supported Connectivity Type | Specifies the type of connectivity authorized for the subscriber for this PDN subscription (e.g. LIPA, SIPTO, LIPA and SIPTO, etc.) | X | X |
| Selected Connectivity Type | Specifies the type of connectivity selected for the subscriber for this PDN subscription (e.g. LIPA, SIPTO, or remote connectivity) | X | X |

UE

The UE maintains the following context information. Table 12 shows the context fields.

TABLE 12

MS MM and PDP Contexts

| Field | SIM | Description | A/Gb mode | Iu mode |
|---|---|---|---|---|
| IMSI | G, U | International Mobile Subscriber Identity. | X | X |
| Allowed CSG list | | Allowed CSG list indicates the list of CSG IDs and the associated PLMN where the MS is a member. | | X |
| Connectivity Type | | The Connectivity Type contains information of the type of connectivity supported by the UE for CSG cells. The information is in the form of a list, with the connectivity type supported by each CSG ID. The list can also contain an indication of the connectivity type for specific CSG cells. | | X |
| Each MM context contains zero or more of the following PDP contexts: | | | | |
| PDP Type | | PDP type, e.g. PPP or IP. | X | X |
| PDP Address | | PDP address; e.g. an IP address. | X | X |
| PDP State | | Packet data protocol state, INACTIVE or ACTIVE. | X | X |
| Supported Connectivity Type | | Specifies the type of connectivity authorized for the subscriber for this PDN subscription (e.g. LIPA, SIPTO, etc.) | X | X |
| Selected Connectivity Type | | Specifies the type of connectivity selected for the subscriber for this PDN subscription (e.g. LIPA, SIPTO, etc.) | X | X |

Figure 19:
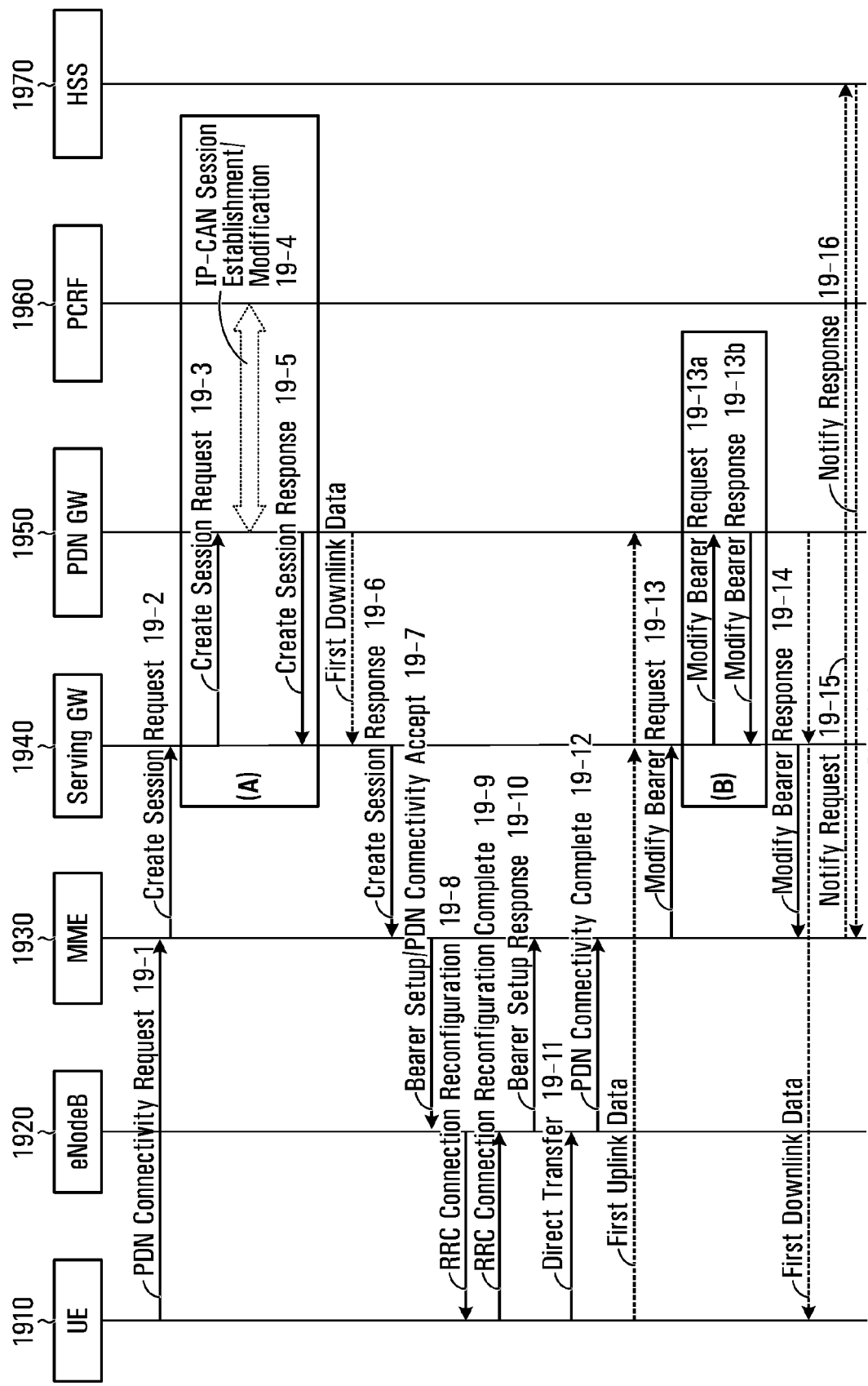
FIG. 19 is a signal flow diagram for an user equipment (UE) request for packet data network connectivity according to an embodiment of the application.

Particular Examples and Message Formats Related to E-ETRAN UE Requested PDN Connectivity The UE requested PDN connectivity procedure for an E-UTRAN is depicted in FIG. 19. Steps that are particularly relevant to the solutions described above are described in detail. Steps of the network attach procedure that are not particularly affected by the solutions described herein and may have known procedures will not be described in detail.

The procedure allows the UE to request for connectivity to a PDN including allocation of a default bearer. The PDN connectivity procedure may trigger one or multiple Dedicated Bearer Establishment procedures to establish dedicated EPS bearer(s) for that UE.

In signal flow 19-1, the UE initiates the UE Requested PDN procedure by the transmission of a PDN CONNECTIVITY REQUEST message. The PDN CONNECTIVITY REQUEST message may include information such as, but not limited to: APN; PDN Type; Protocol Configuration Options; Request Type; and Requested Connectivity Type.

The UE includes the Requested Connectivity Type indication when using a CSG cell in order to indicate the type of connectivity requested for the PDP context (e.g. LIPA, SIPTO, etc.).

PDN Connectivity Request

An example of a PDN CONNECTIVITY REQUEST message will now be described with reference to Table 13. This message is sent by the UE to the network to initiate establishment of a PDN connection. This message may be used in a direction from the UE to the network.

TABLE 13

PDN CONNECTIVITY REQUEST message content

| IEI | Information Element | Type/Reference |
|---|---|---|
| | Requested Connectivity Type | Connectivity Type |

Requested Connectivity Type

This IE may be included in the message if the UE requests a specific type of CSG connectivity (e.g. LIPA) for the PDP Context.

An example of the contents of the Connectivity Type in the Type/Reference field is that described in Table 8.

In signal flow 19-2, the MME validates the UE request considering also the Requested Connectivity Type and the CSG ID of the CSG cell the UE is connected to. The MME determines whether the type of connectivity requested by the UE is authorized for the requested APN and the CSG ID based on network settings and the subscription data.

If the MME decides that the type of connectivity requested by the UE is not acceptable, the MME can reject the attach request including an appropriate error cause. The MME includes the Supported Connectivity Type to indicate the type of CSG connectivity supported. The MME includes an indication of whether the requested connectivity type is not acceptable for the current APN or for which APNs it is not acceptable. The MME includes an indication whether the requested connectivity type is not acceptable in all the cells in the same CSG.

If the MME decides that the type of connectivity requested by the UE is not acceptable, the MME can select an acceptable type of connectivity for the UE for the current APN and the current CSG ID.

If the Request Type indicates "initial request" the MME selects a PDN GW as described above in the PDN GW Selection Function (3GPP accesses) section.

The MME may use the Connectivity Type indication (set to either the Requested Connectivity Type indication or the selected type of connectivity) to derive the PDN GW address when a CSG Cell is used. The MME may select the PDN GW according as described above in the PDN GW Selection Function (3GPP accesses) section.

The MME includes the Connectivity Type (set to either the Requested Connectivity Type indication or the selected type of connectivity) when using a CSG cell in order to indicate the type of connectivity requested for the PDN Connection.

The MME allocates a Bearer Id, and sends a CREATE SESSION REQUEST message to the S-GW. The CREATE SESSION REQUEST message may include information such as, but not limited to: IMSI; MSISDN; MME TEID for control plane; RAT type; PDN GW address; PDN Address; Default EPS Bearer QoS; PDN Type; subscribed APN-AMBR; APN; EPS Bearer Id; Protocol Configuration Options; Handover Indication; ME Identity; User Location Information (ECGI); MS Info Change Reporting support indication; Selection Mode; Charging Characteristics; Trace Reference; Trace Type; Trigger Id; OMC Identity; Maximum APN Restriction; Dual Address Bearer Flag; and Connectivity Type.

The MME may include the Connectivity Type when using a CSG cell in order to indicate the type of connectivity requested for the PDN connection (e.g. LIPA, SIPTO, etc.)

In signal flow 19-3, the Serving GW creates a new entry in its EPS Bearer table and sends a CREATE SESSION REQUEST message to the PDN GW indicated in the PDN GW address received in the previous step. The CREATE SESSION REQUEST message may include information such as, but not limited to: IMSI; MSISDN; Serving GW Address for the user plane; Serving GW TEID of the user plane; Serving GW TEID of the control plane; RAT type; Default EPS Bearer QoS; PDN Type; PDN Address; subscribed APN-AMBR; APN; Bearer Id; Protocol Configuration Options; Handover Indication; ME Identity; User Location Information (ECGI); MS Info Change Reporting support indication; Selection Mode; Charging Characteristics; Trace Reference; Trace Type; Trigger Id; OMC Identity; Maximum APN Restriction; Dual Address Bearer Flag; and Connectivity Type.

In signal flow 19-5, the PDN GW returns a CREATE SESSION RESPONSE message to the S-GW. The CREATE SESSION RESPONSE message may include information such as, but not limited to: PDN GW Address for the user plane; PDN GW TEID of the user plane; PDN GW TEID of the control plane; PDN Type; PDN Address; EPS Bearer Id; EPS Bearer QoS; Protocol Configuration Options; Charging Id; Prohibit Payload Compression; APN Restriction; Cause; MS Info Change Reporting Action (Start) (if the PDN GW decides to receive UE's location information during the session); APN-AMBR; and Selected Connectivity Type.

The PDN GW returns an indication of the Selected Connectivity Type in order to indicate the type of connectivity (e.g. LIPA, SIPTO, etc.) selected for the current PDN connection.

In signal flow 19-6, the S-GW returns a CREATE SESSION RESPONSE message to the MME. The CREATE SESSION RESPONSE message may include information such as, but not limited to: PDN Type; PDN Address; Serving GW address for User Plane; Serving GW TEID for User Plane; Serving GW TEID for control plane; EPS Bearer Id; EPS Bearer QoS; Protocol Configuration Options; Charging Id; Prohibit Payload Compression; APN Restriction; Cause; MS Info Change Reporting Action (Start); APN-AMBR; and Selected Type.

In signal flow 19-7, the MME sends a PDN CONNECTIVITY ACCEPT message to the UE. The PDN CONNECTIVITY ACCEPT message may include information such as, but not limited to: APN; PDN Type; PDN Address; EPS Bearer Id; Session Management Request; and Protocol Configuration Options. In some embodiments, the message is contained in an S1_MME control message Bearer Setup Request to the eNodeB. The S1_MME control message Bearer Setup Request may include information such as, but not limited to: EPS Bearer QoS; UE-AMBR; PDN Connectivity Accept; S1-TEID; Supported Connectivity Type; Selected Connectivity Type; APN Applicability; and CSG Applicability.

The MME includes a Supported Connectivity Type if the UE is attaching to a CSG cell, in order to indicate to the UE the type of connectivity (e.g. LIPA, SIPTO, etc.) supported.

The MME returns an indication of the Selected Connectivity Type in order to indicate the type of connectivity (e.g. LIPA, SIPTO, etc.) selected for the current PDN connection.

The MME includes an indication of whether the requested connectivity type is not acceptable for the current APN or for which APNs it is not acceptable if the Selected Connectivity Type is different from the Requested Connectivity Type.

The MME includes the CSG Applicability Indication if the indications in the Selected Connectivity Type and/or the Supported Connectivity Type apply only to the current CSG cell or to the current CSG ID.

Information Storage

This section describes information storage structures required for the EPS when 3GPP access only is deployed.

HSS

IMSI is the prime key to the data stored in the HSS. The data held in the HSS is defined in Table 13 here below. Table 14 is applicable to E-UTRAN in standalone operation only.

TABLE 14

| | HSS data |
|---|---|
| Field | Description |
| IMSI | IMSI is the main reference key. |
| MSISDN | The basic MSISDN of the UE (Presence of MSISDN is optional). |
| IMEI/IMEISV | International Mobile Equipment Identity - Software Version Number |
| MME Address | The IP address of the MME currently serving this MS. |
| CSG Subscription Data | The CSG Subscription Data is a list of CSG IDs per PLMN and for each CSG ID optionally an associated expiration date which indicates the point in time when the subscription to the CSG ID expires; an absent expiration date indicates unlimited subscription. The CSG Subscription Data contains also an indication of the type of connectivity supported by the UE for CSG cells (LIPA, SIPTO, etc.). The information can be provided on a per CSG ID and/or on a per APN basis or on a per UE basis. |
| Each subscription profile contains one or more PDN subscription contexts: | |
| Context Identifier | Index of the PDN subscription context. |
| PDN Address | Indicates subscribed IP address(es). |
| PDN Type | Indicates the subscribed PDN Type (IPv4, IPv6, IPv4v6) |
| Access Point Name (APN) | A label according to DNS naming conventions describing the access point to the packet data network (or a wildcard). |
| Connectivity Type | Specifies the type of connectivity authorized for the subscriber for this PDN subscription (e.g. LIPA, SIPTO, LIPA and SIPTO, etc.) |

The MME maintains MM context and EPS bearer context information for UEs in the ECM-IDLE, ECM-CONNECTED and EMM-DEREGISTERED states. Table 15 shows the context fields for one UE.

TABLE 15

| | MME MM and EPS bearer Contexts |
|---|---|
| Field | Description |
| IMSI | IMSI (International Mobile Subscriber Identity) is the subscriber's permanent identity. |
| CSG Subscription Data | The CSG Subscription Data is a list of CSG IDs for the visiting PLMN and for each CSG ID optionally an associated expiration date which indicates the point in time when the subscription to the CSG ID expires; an absent expiration date indicates unlimited subscription. The CSG Subscription Data contains also an indication of the type of connectivity supported by the UE for CSG cells (LIPA, SIPTO, etc.). The information can be provided on a per CSG ID and/or on a per APN basis or on a per UE basis. |
| For each active PDN connection: | |
| APN in Use | The APN currently used. This APN may be composed of the APN Network Identifier and the APN Operator Identifier. |
| APN Subscribed | The subscribed APN received from the HSS. |
| PDN Type | IPv4, IPv6 or IPv4v6 |

TABLE 15-continued

| | MME MM and EPS bearer Contexts |
|---|---|
| Field | Description |
| Supported Connectivity Type | Specifies the type of connectivity authorized for the subscriber for this PDN subscription (e.g. LIPA, SIPTO, LIPA and SIPTO, etc.) |
| Selected Connectivity Type | Specifies the type of connectivity selected for the subscriber for this PDN subscription (e.g. LIPA, SIPTO, or remote connectivity) |

UE

The UE maintains the following context information. Table 16 shows the context fields.

TABLE 16

| | UE context |
|---|---|
| Field | Description |
| IMSI | IMSI (International Mobile Subscriber Identity) is the subscriber's permanent identity. |
| Allowed CSG list | Allowed CSG list indicates the list of CSG IDs and the associated PLMN where the UE is a member. |
| Connectivity Type | The Connectivity Type contains information of the type of connectivity supported by the UE for CSG cells. The information is in the form of a list, with the connectivity type supported by each CSG ID. The list can also contain an indication of the connectivity type for specific CSG cells. |
| For each active PDN connection: | |
| APN in Use | The APN currently used. This APN may be composed of the APN Network Identifier and the APN Operator Identifier. |
| APN-AMBR | The maximum aggregated uplink and downlink MBR to be shared across all Non-GBR bearers, which are established for this APN. |
| Assigned PDN Type | The PDN Type assigned by the network (IPv4, IPv6, or IPv4v6). |
| IP Address(es) | IPv4 address and/or IPv6 prefix |
| Supported Connectivity Type | Specifies the type of connectivity authorized for the subscriber for this PDN subscription (e.g. LIPA, SIPTO, etc.) |
| Selected Connectivity Type | Specifies the type of connectivity selected for the subscriber for this PDN subscription (e.g. LIPA, SIPTO, etc.) |

Additional Examples and Message Formats Related to GERAN/UTRAN

Normal and Periodic Routing Area Updating Procedure Accepted by the Network

If a routing area updating request has been accepted by the network, a ROUTING AREA UPDATE ACCEPT message may be sent to the MS.

The network informs the UE of the type of connectivity supported if the UE is attaching to a CSG cell, in order to indicate the type of connectivity (e.g. LIPA, SIPTO, etc.) supported by the current CSG cell. The network includes an indication of whether the type of connectivity supported applies only to the current CSG cell or to the current CSG ID.

In a UE the types of connectivity supported may be provided to the upper layers.

When the UE is in a CSG cell and receives an ROUTING AREA UPDATE ACCEPT message, and the network informs the UE about the support of specific features, such the types of connectivity supported, the types of connectivity supported may be provided to the upper layers.

Routing Area Update Accept

An example of a ROUTING AREA UPDATE ACCEPT message will now be described with reference to Table 17. This message is sent by the network to the MS to provide the MS with GPRS mobility management related data in response to a ROUTING AREA UPDATE REQUEST message. This message may be used in a direction from the network to the UE.

TABLE 17

ROUTING AREA UPDATE ACCEPT message content

| IEI | Information Element | Type/Reference |
|---|---|---|
|  | Supported Connectivity Type | Connectivity Type |
|  | CSG ID |  |

Supported Connectivity Type

The network may include this IE if the UE is attaching to a CSG cell, in order to indicate the type of connectivity supported by the current CSG cell

CSG ID

The network may include this IE if the UE is attaching to a CSG cell and if the network includes the Supported Connectivity Type. If the network includes an indication that the CSG ID is included this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the Type/Reference field is that described in Table 8.

Successful PDP Context Activation Requested by the Network

In order to request a PDP context activation, the network sends a REQUEST PDP CONTEXT ACTIVATION message to the UE and starts timer T3385. The message contains an offered PDP address. If available, the APN may be included in the REQUEST PDP CONTEXT ACTIVATION message.

Upon receipt of a REQUEST PDP CONTEXT ACTIVATION message, the UE may then either initiate the PDP context activation procedure or may reject the activation request by sending a REQUEST PDP CONTEXT ACTIVATION REJECT message. The value of the reject cause IE of the REQUEST PDP CONTEXT ACTIVATION REJECT message may indicate the reason for rejection, e.g. "insufficient resources to activate another context".

An ACTIVATE PDP CONTEXT REQUEST message sent by the UE in order to initiate the PDP context activation procedure may contain the PDP address, PDP Type and APN requested by the network in the REQUEST PDP CONTEXT ACTIVATION message.

Upon receipt of the ACTIVATE PDP CONTEXT REQUEST message, the network may stop timer T3385.

The same procedures then apply as described for UE initiated PDP context activation.

The network informs the UE of the type of connectivity supported if the UE is connected to a CSG cell, in order to indicate the type of connectivity (e.g. LIPA, SIPTO, etc.) supported by the current CSG cell. The network informs the UE of the type of connectivity selected (e.g. LIPA, SIPTO, etc.). The network includes an indication of whether the type of connectivity supported applies only to the current CSG cell or to the current CSG ID, if the UE is connected to a CSG cell. The network informs the UE of whether the requested connectivity type is not acceptable for the current APN or for which APNs it is not acceptable if the selected connectivity is different from the connectivity type requested by the UE, if the UE is connected to a CSG cell.

In a UE the types of connectivity supported may be provided to the upper layers.

When the UE is in a CSG cell and receives a REQUEST PDP CONTEXT ACTIVATION message, and the network informs the UE about the support of specific features, such the types of connectivity supported or selected, the types of connectivity supported and selected may be provided to the upper layers.

Additional GPRS Session Management Messages

Activate PDP Context Reject

An example of an ACTIVATE PDP CONTEXT REJECT message will now be described with reference to Table 18. This message is sent by the network to the MS to reject activation of a PDP context. This message may be used in a direction from the network to the UE.

TABLE 18

ACTIVATE PDP CONTEXT REJECT message content

| IEI | Information Element | Type/Reference |
|---|---|---|
|  | Supported Connectivity Type | Connectivity Type |
|  | APN Applicability Indication |  |
|  | CSG ID |  |

Supported Connectivity Type

This IE may be included if the SGSN rejects the type of CSG connectivity the UE requested, in order to indicate to the UE the connectivity type supported.

APN Applicability Indication

This IE may be included if the network indicates for what APNs the type of connectivity requested by the UE is not acceptable. If the network includes an indication that one or more APNs are included, this indicates that the type of connectivity requested by the UE is not acceptable for all the APNs provided. If the network includes an indication that the CSG ID is not included, this indicates that the Supported Connectivity Type applies only to the current APN.

CSG ID

The network may include this IE if the UE is attaching to a CSG cell and if the network includes the Supported Connectivity Type IE or the Selected Connectivity Type IE. If the network includes an indication that the CSG ID is included, this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the Type/Reference field is that described in Table 8.

Activate PDP Context Reject Alternative Embodiment

Another example of an ACTIVATE PDP CONTEXT REJECT message will now be described with reference to Table 19. This message is sent by the network to the UE to reject activation of a PDP context. This message may be used in a direction from the network to the UE.

TABLE 19

| IEI | ACTIVATE PDP CONTEXT REJECT message content | |
|---|---|---|
| | Information Element | Type/Reference |
| | Supported Connectivity Type | Connectivity Type |
| | APN Indication | |
| | CSG ID | |

Supported Connectivity Type

This IE may be included if the SGSN rejects the type of CSG connectivity the UE requested, in order to indicate to the UE the connectivity type supported.

APN Indication

This IE may be included if the network indicates if the type of connectivity requested by the UE is not acceptable only for the current APN or for all APNs.

If the network includes an indication that an APN is included, this indicates that the type of connectivity requested by the UE is not acceptable only for the included APN. If the network includes an indication that an APN is not included, this indicates that the type of connectivity requested by the UE is not acceptable for any APN.

CSG ID

The network may include this IE if the UE is attaching to a CSG cell and if the network includes the Supported Connectivity Type IE or the Selected Connectivity Type IE. If the network includes an indication that the CSG ID is included, this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the Type/Reference field is that described in Table 8.

Additional Examples and Message Formats Related to E-UTRAN

Normal and Periodic Tracking Area Updating Procedure Accepted by the Network

If the tracking area update request has been accepted by the network, the MME may send a TRACKING AREA UPDATE ACCEPT message to the UE.

The network informs the UE about the support of specific features, such as IMS voice over PS session or emergency bearer services, in the EPS network feature support information element. In a UE with IMS voice over PS capability, the IMS voice over PS session indicator and the emergency bearer services indicator may be provided to the upper layers. In some embodiments, the upper layers take the IMS voice over PS session indicator into account, when selecting the access domain for voice sessions or calls. When initiating an emergency call, the upper layers also take the emergency bearer services indicator into account for the access domain selection.

The network informs the UE of the type of connectivity supported if the UE is attaching to a CSG cell, in order to indicate the type of connectivity (e.g. LIPA, SIPTO, etc.) supported by the current CSG cell. The network includes an indication of whether the type of connectivity supported applies only to the current CSG cell or to the current CSG ID.

When the UE is in a CSG cell and receives a TRACKING AREA UPDATE ACCEPT message, and the network informs the UE about the support of specific features, such the types of connectivity supported, the types of connectivity supported may be provided to the upper layers.

Tracking Area Update Accept

An example of a TRACKING AREA UPDATE ACCEPT message will now be described with reference to Table 20. This message is sent by the network to the UE to provide the UE with EPS mobility management related data in response to a tracking area update request message. The message may be used in a direction from the network to the UE.

TABLE 20

| IEI | TRACKING AREA UPDATE ACCEPT message content | |
|---|---|---|
| | Information Element | Type/Reference |
| | Supported Connectivity Type | Connectivity Type |
| | CSG Applicability Indication | |

Supported Connectivity Type

The network may include this IE if the UE is attaching to a CSG cell, in order to indicate the type of connectivity supported by the current CSG cell.

CSG Applicability Indication

The network may include this IE if the UE is attaching to a CSG cell and if the network includes the Supported Connectivity Type IE or the Selected Connectivity Type IE. If the network includes an indication that the CSG ID is included, this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the Type/Reference field is that described in Table 8.

UE Requested PDN Connectivity Procedure Accepted by the Network

Upon receipt of a PDN CONNECTIVITY REQUEST message, the MME checks whether the ESM information transfer flag is included.

If connectivity with the requested PDN is accepted, but with a restriction of IP version (i.e. both an IPv4 address and an IPv6 prefix is requested, but only one particular IP version, or only single IP version bearers are supported/allowed by the network), ESM cause #50 "PDN type IPv4 only allowed", #51 "PDN type IPv6 only allowed", or #52 "single address bearers only allowed", respectively, may be included in an ACTIVATE DEFAULT EPS BEARER CONTEXT REQUEST message.

The network informs the UE of the type of connectivity supported if the UE is connected to a CSG cell, in order to indicate the type of connectivity (e.g. LIPA, SIPTO, etc.) supported by the current CSG cell. The network informs the UE of the type of connectivity selected (e.g. LIPA, SIPTO, etc.). The network includes an indication of whether the type of connectivity supported applies only to the current CSG cell or to the current CSG ID, if the UE is connected to a CSG cell. The network informs the UE of whether the requested connectivity type is not acceptable for the current APN or for which APNs it is not acceptable if the selected connectivity is different from the connectivity type requested by the UE, if the UE is connected to a CSG cell.

In a UE the types of connectivity supported may be provided to the upper layers.

When the UE is in a CSG cell and receives an ACTIVATE DEFAULT EPS BEARER CONTEXT REQUEST message, and the network informs the UE about the support of specific features, such the types of connectivity supported or selected, the types of connectivity supported and selected may be provided to the upper layers.

Activate Default EPS Bearer Context Request

An example of an ACTIVATE DEFAULT EPS BEARER CONTEXT REQUEST message will now be described with reference to Table 21. This message is sent by the network to the UE to request activation of a default EPS bearer context. This message may be used in a direction from the network to the UE.

TABLE 21

ACTIVATE DEFAULT EPS BEARER CONTEXT REQUEST message content

| IEI | Information Element | Type/Reference |
|---|---|---|
| | Supported Connectivity Type | Connectivity Type |
| | Selected Connectivity Type | Connectivity Type |
| | APN Applicability Indication | |
| | CSG Applicability Indication | |

Supported Connectivity Type

The network may include this IE if the UE is attaching to a CSG cell, in order to indicate the type of connectivity supported by the current CSG cell.

Selected Connectivity Type

This IE may be included in order to inform the UE of the Connectivity Type selected by the network.

APN Applicability Indication

This IE may be included if the network indicates for what APNs the type of connectivity requested by the UE is not acceptable. If the network includes an indication that one or more APNs are included, this indicates that the type of connectivity requested by the UE is not acceptable for all the APNs provided. If the network includes an indication that the CSG ID is not included, this indicates that the Supported Connectivity Type applies only to the current APN.

CSG Applicability Indication

The network may include this IE if the UE is attaching to a CSG cell and if the network includes the Supported Connectivity Type IE or the Selected Connectivity Type IE. If the network includes an indication that the CSG ID is included, this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the Type/Reference field is that described in Table 8.

Attach Reject

An example of an ATTACH REJECT message will now be described with reference to Table 22. This message is sent by the network to the UE to indicate that the corresponding attach request has been rejected. This message may be used in a direction from the network to the UE.

TABLE 22

ATTACH REJECT message content

| IEI | Information Element | Type/Reference |
|---|---|---|
| | Supported Connectivity Type | Connectivity Type |
| | APN Applicability Indication | |
| | CSG ID | |

Supported Connectivity Type

This IE may be included if the SGSN rejects the type of CSG connectivity the UE requested, in order to indicate to the UE the connectivity type supported.

APN Applicability Indication

This IE may be included if the network indicates for what APNs the type of connectivity requested by the UE is not acceptable. If the network includes an indication that one or more APNs are included, this indicates that the type of connectivity requested by the UE is not acceptable for all the APNs provided. If the network includes an indication that the CSG ID is not included, this indicates that the Supported Connectivity Type applies only to the current APN.

CSG ID

The network may include this IE if the UE is attaching to a CSG cell and if the network includes the Supported Connectivity Type IE or the Selected Connectivity Type IE. If the network includes an indication that the CSG ID is included, this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the Type/Reference field is that described in Table 8.

Attach Reject Alternative Embodiment

Another example of an ATTACH REJECT message will now be described with reference to Table 23. This message is sent by the network to the UE to indicate that the corresponding attach request has been rejected. This message may be used in a direction from the network to the UE.

TABLE 23

ATTACH REJECT message content

| IEI | Information Element | Type/Reference |
|---|---|---|
| | Supported Connectivity Type | Connectivity Type |
| | APN Applicability Indication | |
| | CSG ID | |

ESM Message Container

This IE is included to carry a single ESM message.

Supported Connectivity Type

This IE may be included if the SGSN rejects the type of CSG connectivity the UE requested, in order to indicate to the UE the connectivity type supported.

APN Applicability Indication

This IE may be included if the network indicates if the type of connectivity requested by the UE is not acceptable only for the current APN or for all APNs.

If the network includes an indication that an APN is included, this indicates that the type of connectivity requested by the UE is not acceptable only for the included APN. If the network includes an indication that an APN is not included, this indicates that the type of connectivity requested by the UE is not acceptable for any APN.

CSG ID

The network may include this IE if the UE is attaching to a CSG cell and if the network includes the Supported Connectivity Type IE or the Selected Connectivity Type IE. If the network includes an indication that the CSG ID is included, this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the Type/Reference field is that described in Table 8.

PDN Connectivity Reject

An example of a PDN CONNECTIVITY REJECT message will now be described with reference to Table 24. This message is sent by the network to the UE to reject establishment of a PDN connection. This message may be used in a direction from the network to the UE.

TABLE 24

| PDN CONNECTIVITY REJECT message content | | |
|---|---|---|
| IEI | Information Element | Type/Reference |
| | Supported Connectivity Type | Connectivity Type |
| | APN Applicability Indication | |
| | CSG ID | |

Supported Connectivity Type

This IE may be included if the SGSN rejects the type of CSG connectivity the UE requested, in order to indicate to the UE the connectivity type supported.

APN Applicability Indication

This IE may be included if the network indicates for what APNs the type of connectivity requested by the UE is not acceptable. If the network includes an indication that one or more APNs are included, this indicates that the type of connectivity requested by the UE is not acceptable for all the APNs provided. If the network includes an indication that the CSG ID is not included, this indicates that the Supported Connectivity Type applies only to the current APN.

CSG ID

The network may include this IE if the UE is attaching to a CSG cell and if the network includes the Supported Connectivity Type IE or the Selected Connectivity Type IE. If the network includes an indication that the CSG ID is included, this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the Type/Reference field is that described in Table 8.

PDN Connectivity Reject Alternative Embodiment

Another example of a PDN CONNECTIVITY REJECT message will now be described with reference to Table 25. This message is sent by the network to the UE to reject establishment of a PDN connection. This message may be used in a direction from the network to the UE.

TABLE 25

| PDN CONNECTIVITY REJECT message content | | |
|---|---|---|
| IEI | Information Element | Type/Reference |
| | Supported Connectivity Type | Connectivity Type |
| | APN Applicability Indication | |
| | CSG ID | |

Supported Connectivity Type

This IE may be included if the SGSN rejects the type of CSG connectivity the UE requested, in order to indicate to the UE the connectivity type supported.

APN Applicability Indication

This IE may be included if the network indicates if the type of connectivity requested by the UE is not acceptable only for the current APN or for all APNs.

If the network includes an indication that an APN is included, this indicates that the type of connectivity requested by the UE is not acceptable only for the included APN. If the network includes an indication that an APN is not included, this indicates that the type of connectivity requested by the UE is not acceptable for any APN.

CSG ID

The network may include this IE if the UE is attaching to a CSG cell and if the network includes the Supported Connectivity Type IE or the Selected Connectivity Type IE. If the network includes an indication that the CSG ID is included, this indicates that the Supported Connectivity Type applies to any CSG cell with the same value of CSG ID. If the network includes an indication that the CSG ID is not included, this indicates that the Supported Connectivity Type applies only to the current CSG cell.

An example of the contents of the Connectivity Type in the Type/Reference field is that described in Table 8.

An Example Wireless Device

Figure 20:
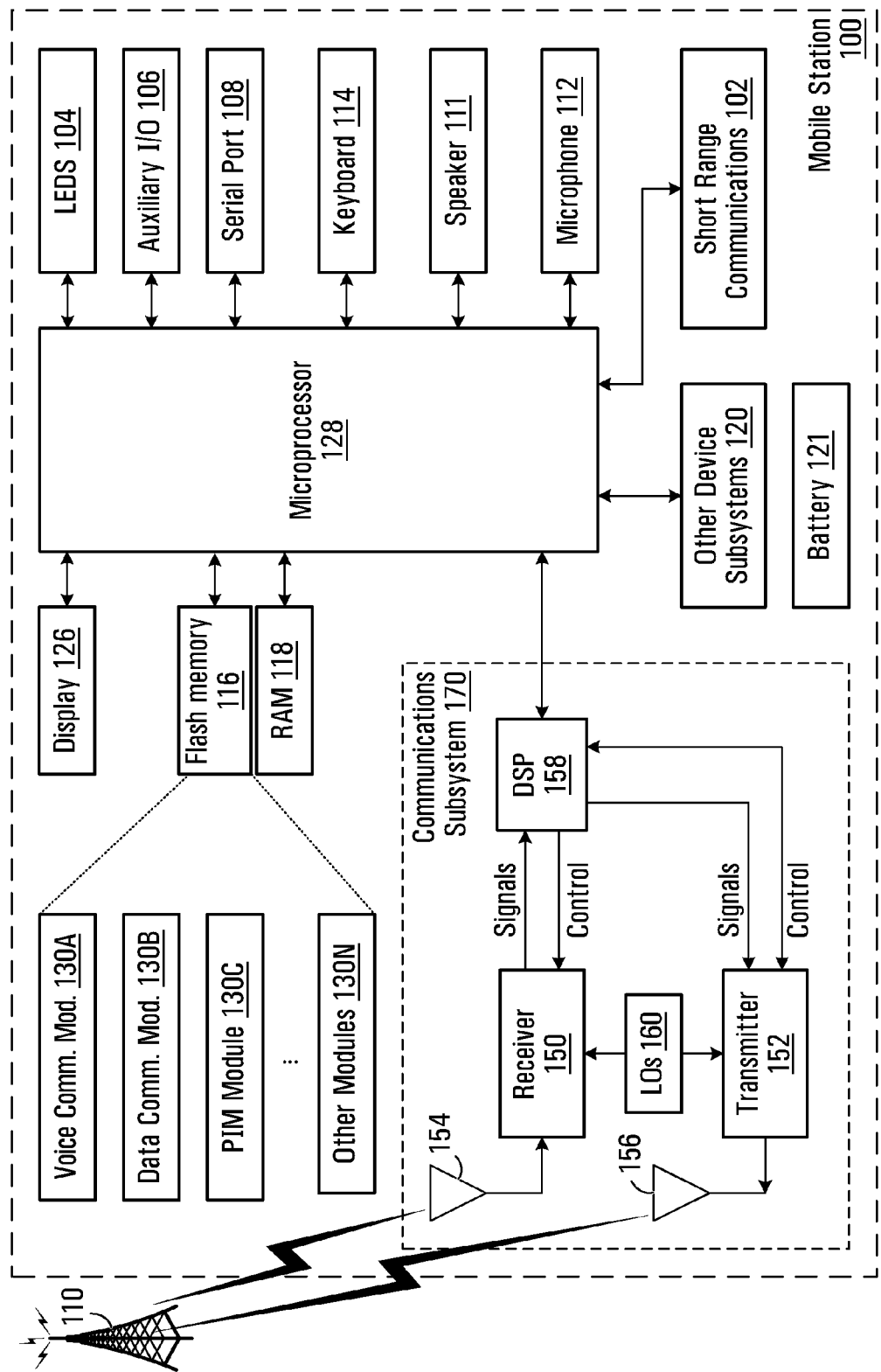
FIG. 20 is a schematic diagram of an example mobile device according to an implementation described herein.

Referring now to FIG. 20, shown is a block diagram of another wireless device 100 that may implement any of the wireless device methods described herein. The wireless device 100 is shown with specific components for implementing features described above. It is to be understood that the wireless device 100 is shown with very specific details for exemplary purposes only.

A processing device (a microprocessor 128) is shown schematically as coupled between a keyboard 114 and a display 126. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATs. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practised otherwise than as specifically described herein.

The invention claimed is:

1. A method for use in a network element comprising:
   providing an indication of a type of connectivity provided in a telecommunication cell, the connectivity defining a connection using a Local Packet Gateway via a nodeB serving the telecommunication cell;
   wherein the indication of the type of connectivity provided indicates one of: local internet protocol access (LIPA) connectivity; selected internet protocol traffic offload (SIPTO) connectivity or remote connectivity;
   wherein providing the indication of a type of connectivity provided occurs in a non-access stratum (NAS) functional layer;

wherein providing the indication of a type of connectivity comprises sending at least one of an ACTIVATE DEFAULT EPS BEARER CONTEXT REQUEST message; or an ACTIVATE PDP CONTEXT ACCEPT message; and wherein providing the indication of a type of connectivity occurs during one of: when responding to a request for an additional packet data protocol (PDP) context; or when responding to a request for a packet data network (PDN) connection.

2. The method of claim 1 wherein the network element is one of a CSG cell; a HeNB; or a HNB.

3. The method of claim 1 wherein providing the indication of a type of connectivity provided includes broadcasting a Supported Connectivity Type indication over a radio channel.

4. The method of claim 1 wherein the network element is one of a Mobility Management Entity (MME) or a Serving GPRS Support Node (SGSN).

5. The method of claim 1 wherein providing the indication includes providing the indication if the UE is attaching to a CSG cell.

6. The method of claim 1 wherein providing an indication of a type of connectivity provided in a telecommunication cell comprises providing an indication of a type of connectivity provided in any one of:
   a GERAN/UTRAN femto cell;
   a GERAN/UTRAN macro cell;
   a GERAN/UTRAN CSG cell;
   an E-UTRAN femto cell;
   an E-UTRAN macro cell;
   an E-UTRAN CSG cell;
   WLAN cells; or
   non-3GPP cells.

7. The method of claim 1 wherein providing an indication comprises providing at least one of:
   an indication of whether specific types of connectivity are provided; or
   an indication of whether specific types of connectivity are not provided.

8. The method claim 1 wherein providing an indication of the type of connectivity provided comprises providing at least one of:
   LIPA connectivity supported;
   LIPA connectivity not supported;
   SIPTO connectivity supported;
   SIPTO connectivity not supported;
   remote connectivity supported; or
   remote connectivity not supported.

9. The method of claim 1 further comprising providing the indication to upper layers.

10. A method for use in a network element comprising:
   providing an indication of a type of connectivity provided in a telecommunication cell, the connectivity defining a connection using a Local Packet Gateway via a nodeB serving the telecommunication cell;
   wherein the indication of the type of connectivity provided indicates one of: local internet protocol access (LIPA) connectivity; selected internet protocol traffic offload (SIPTO) connectivity or remote connectivity;

wherein providing the indication of a type of connectivity provided occurs in a non-access stratum (NAS) functional layer;

wherein providing the indication of a type of connectivity comprises sending at least one of an ACTIVATE DEFAULT EPS BEARER CONTEXT REQUEST message; or an ACTIVATE PDP CONTEXT ACCEPT message; and wherein providing the indication of a type of connectivity occurs during one of: when receiving an additional packet data protocol (PDP) context; or when receiving a packet data network (PDN) connection.

11. The method of claim 10 wherein the network element is one of a CSG cell; a HeNB; or a HNB.

12. The method of claim 10 wherein providing the indication of a type of connectivity provided includes broadcasting a Supported Connectivity Type indication over a radio channel.

13. The method of claim 10 wherein the network element is one of a Mobility Management Entity (MME) or a Serving GPRS Support Node (SGSN).

14. The method of claim 10 wherein providing the indication includes providing the indication if the UE is attaching to a CSG cell.

15. The method of claim 10 wherein providing an indication of a type of connectivity provided in a telecommunication cell comprises providing an indication of a type of connectivity provided in any one of:
   a GERAN/UTRAN femto cell;
   a GERAN/UTRAN macro cell;
   a GERAN/UTRAN CSG cell;
   an E-UTRAN femto cell;
   an E-UTRAN macro cell;
   an E-UTRAN CSG cell;
   WLAN cells; or
   non-3GPP cells.

16. The method of claim 10 wherein providing an indication comprises providing at least one of:
   an indication of whether specific types of connectivity are provided; or
   an indication of whether specific types of connectivity are not provided.

17. The method claim 10 wherein providing an indication of the type of connectivity provided comprises providing at least one of:
   LIPA connectivity supported;
   LIPA connectivity not supported;
   SIPTO connectivity supported;
   SIPTO connectivity not supported;
   remote connectivity supported; or
   remote connectivity not supported.

18. The method of claim 10 further comprising providing the indication to upper layers.

* * * * *